(12) United States Patent
Takigawa et al.

(10) Patent No.: US 11,271,789 B2
(45) Date of Patent: Mar. 8, 2022

(54) TRANSMISSION/RECEPTION METHOD AND TRANSMISSION/RECEPTION SYSTEM

(71) Applicants: Maria Takigawa, Kanagawa (JP);
Keisuke Hara, Kanagawa (JP);
Genichiro Ohta, Kanagawa (JP)

(72) Inventors: Maria Takigawa, Kanagawa (JP);
Keisuke Hara, Kanagawa (JP);
Genichiro Ohta, Kanagawa (JP)

(73) Assignee: Genichiro Ohta, Miura (JP)

( * ) Notice: Subject to any disclaimer, the term of this patent is extended or adjusted under 35 U.S.C. 154(b) by 0 days.

(21) Appl. No.: 17/253,931

(22) PCT Filed: Jun. 18, 2019

(86) PCT No.: PCT/JP2019/024090
§ 371 (c)(1),
(2) Date: Dec. 18, 2020

(87) PCT Pub. No.: WO2019/244885
PCT Pub. Date: Dec. 26, 2019

(65) Prior Publication Data
US 2021/0273839 A1    Sep. 2, 2021

(30) Foreign Application Priority Data
Jun. 21, 2018 (JP) .............................. JP2018-118353

(51) Int. Cl.
*H04L 27/26* (2006.01)
*H04B 14/00* (2006.01)
*H04L 5/00* (2006.01)
*H04L 25/02* (2006.01)

(52) U.S. Cl.
CPC ....... *H04L 27/2695* (2013.01); *H04B 14/008* (2013.01); *H04L 5/0044* (2013.01); *H04L 25/0204* (2013.01); *H04L 27/2626* (2013.01)

(58) Field of Classification Search
CPC ............... H04L 27/2695; H04L 5/0044; H04L 25/0204; H04L 27/2626; H04B 14/008
See application file for complete search history.

(56) References Cited

U.S. PATENT DOCUMENTS

2016/0073368 A1    3/2016 Lyu et al.

FOREIGN PATENT DOCUMENTS

JP    2015122703 A    7/2015
WO   2014/183291 A1   11/2014

OTHER PUBLICATIONS

3GPP Technical Specification; 3GPP TS 36.101V8.5.0 (Mar. 2009), "3rd Generation Partnership Project; Technical Specification Group Radio Access Network; Evolved Universal Terrestrial Radio Access (E-UTRA); User Equipment (UE) radio transmission and reception (Release 8)", Mar. 2009.

(Continued)

*Primary Examiner* — Curtis B Odom
(74) *Attorney, Agent, or Firm* — McCormick, Paulding & Huber PLLC

(57) ABSTRACT

The present invention is a transmission/reception method in which a reception device measures propagation path characteristics of a communication propagation path, a transmission device generates, based on a measurement result of the propagation path characteristics, a plurality of pseudo propagation path characteristics having propagation path characteristics similar to the propagation path characteristics so as to have low mutual correlation, the transmission device generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propa- (Continued)

gation path characteristic information relating to the plurality of pseudo propagation path characteristics and the transmission signal, and the reception device receives the plurality of pseudo propagation path characteristic information transmitted antecedently from the transmission device and a communication signal transmitted subsequently, and individually extracts the plurality of data from the communication signal based on the plurality of pseudo propagation path characteristic information.

14 Claims, 40 Drawing Sheets

(56) References Cited

OTHER PUBLICATIONS

3GPP Technical Specification; 3GPP TS 36.211V8.5.0 (Dec. 2008), "3rd Generation Partnership Project; Technical Specification Group Radio Access Network; Evolved Universal Terrestrial Radio Access (E-UTRA); Physical channels and modulation (Release 8)", Dec. 2008.
Higuchi, Taoka, "Multi-antenna wireless transmission technology", NTT DoCoMo Technical Journal vol. 14, No. 1 (Apr. 2006) with a brief description in English.
Takigawa, Maria et al., Study of Modulation System for 6th-Generation Mobile Communication: Proposal for the MARIA (MIMO Applied Resourceblock Interleaving Access) System, Proceedings of IEICE Society Conference, Information System Society Special Project, Student Poster Session, Mar. 21, 2018.
Kobayashi, Kenichi et al., MIMO system with Relative Phase Difference Time-Shift Modulation for Rician Fading Environment, IEICE Transaction on Communication, vol. E 91-B, No. 2, Feb. 2008, pp. 459-465.
Zeng, Jie et al., Pattern Division Multiple Access (PDMA) for Cellular Future Radio Access, 2015 International Conference on Wireless communication & signal processing, Oct. 17, 2015.
International Search Report for PCT Serial No. PCT/JP2019/024090 dated Jul. 16, 2019.

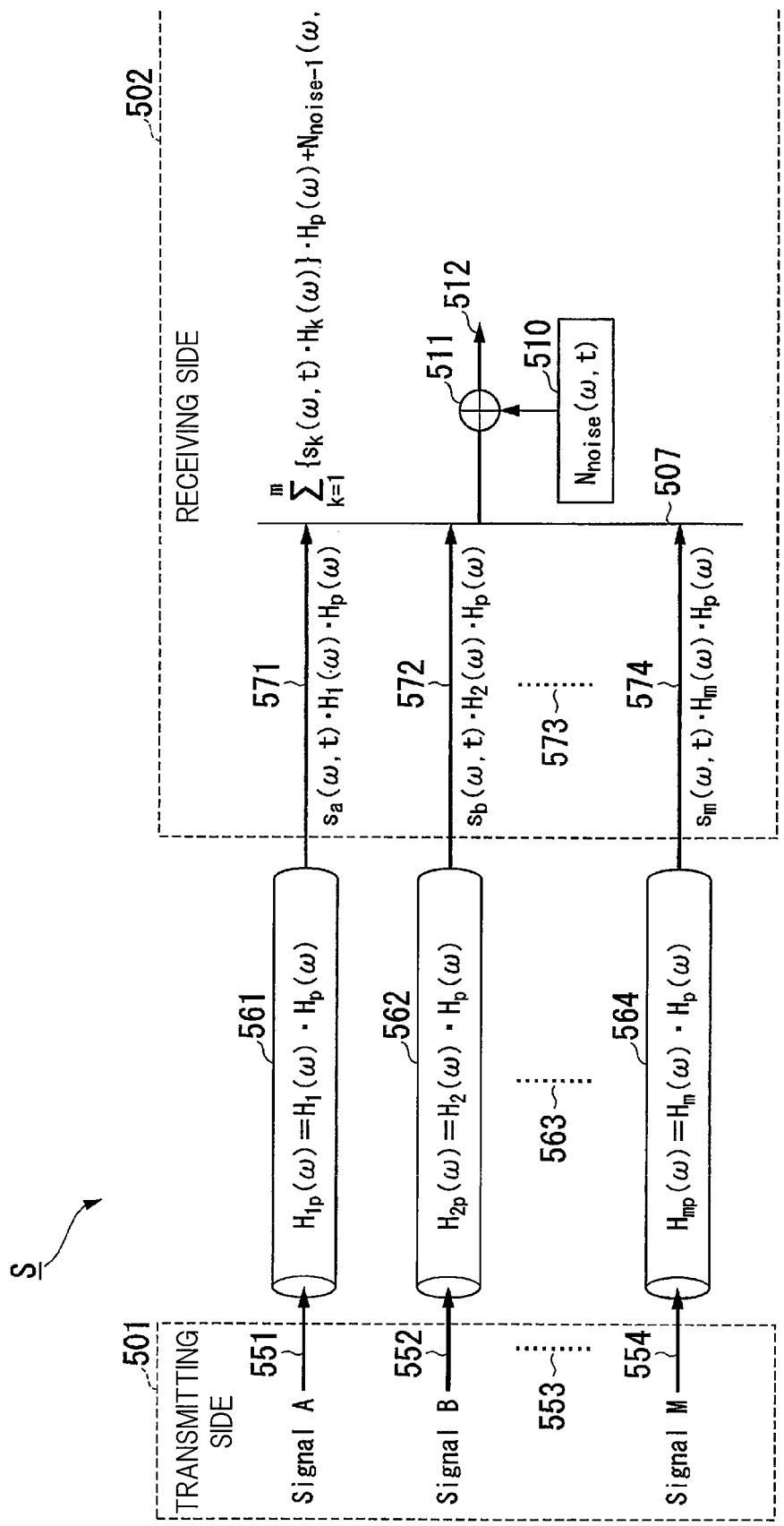

FIG. 16B
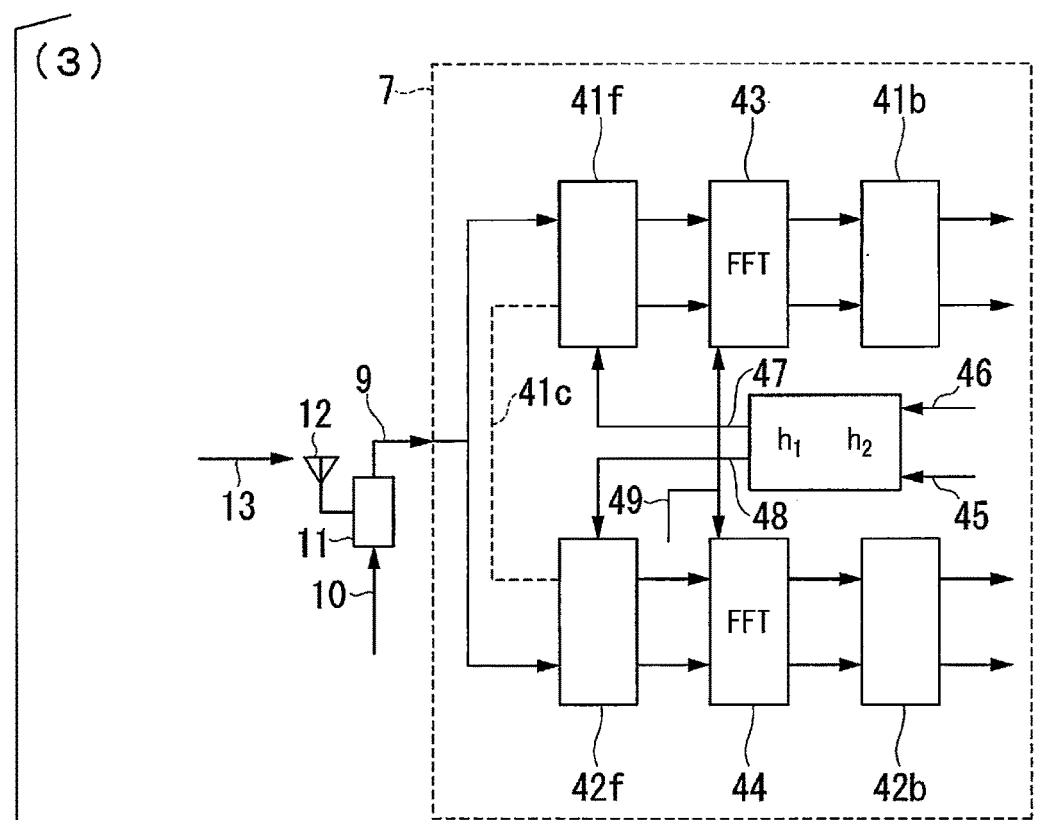
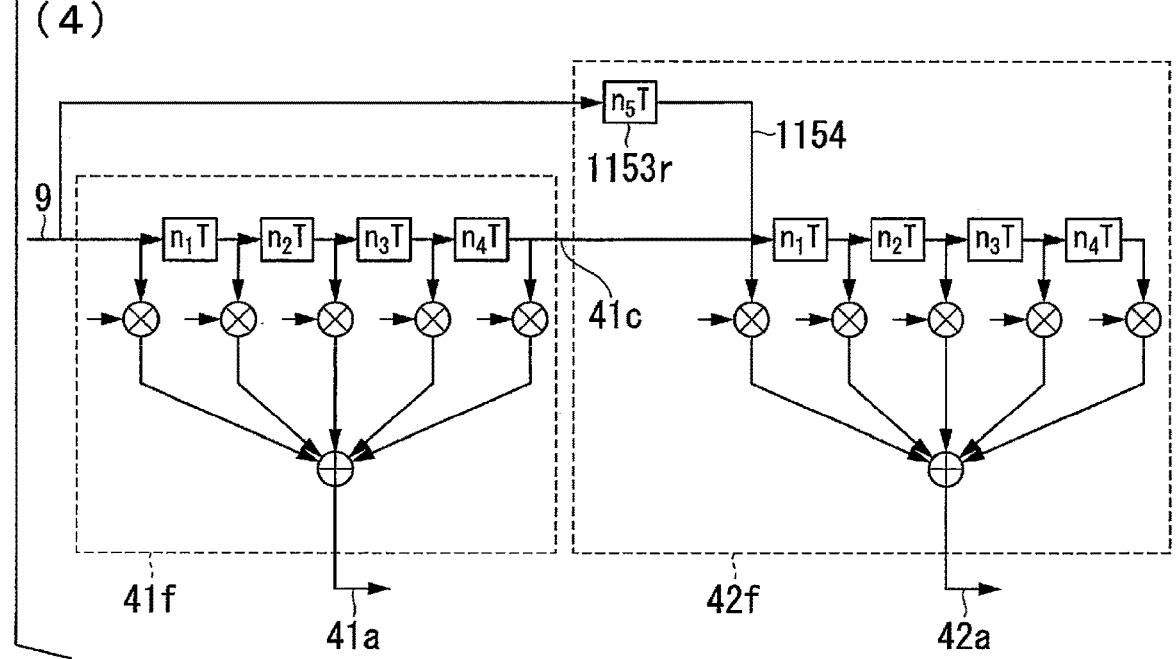

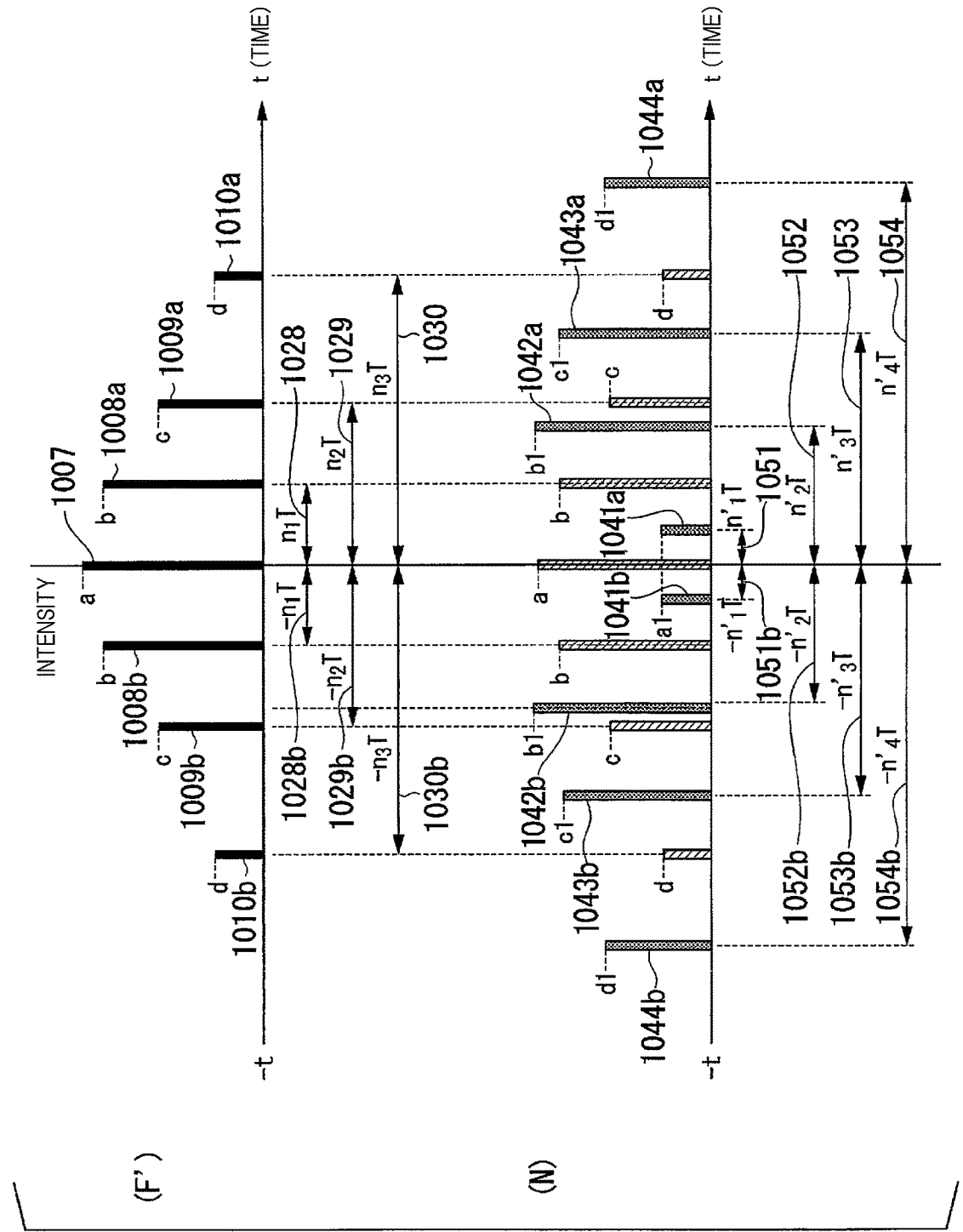

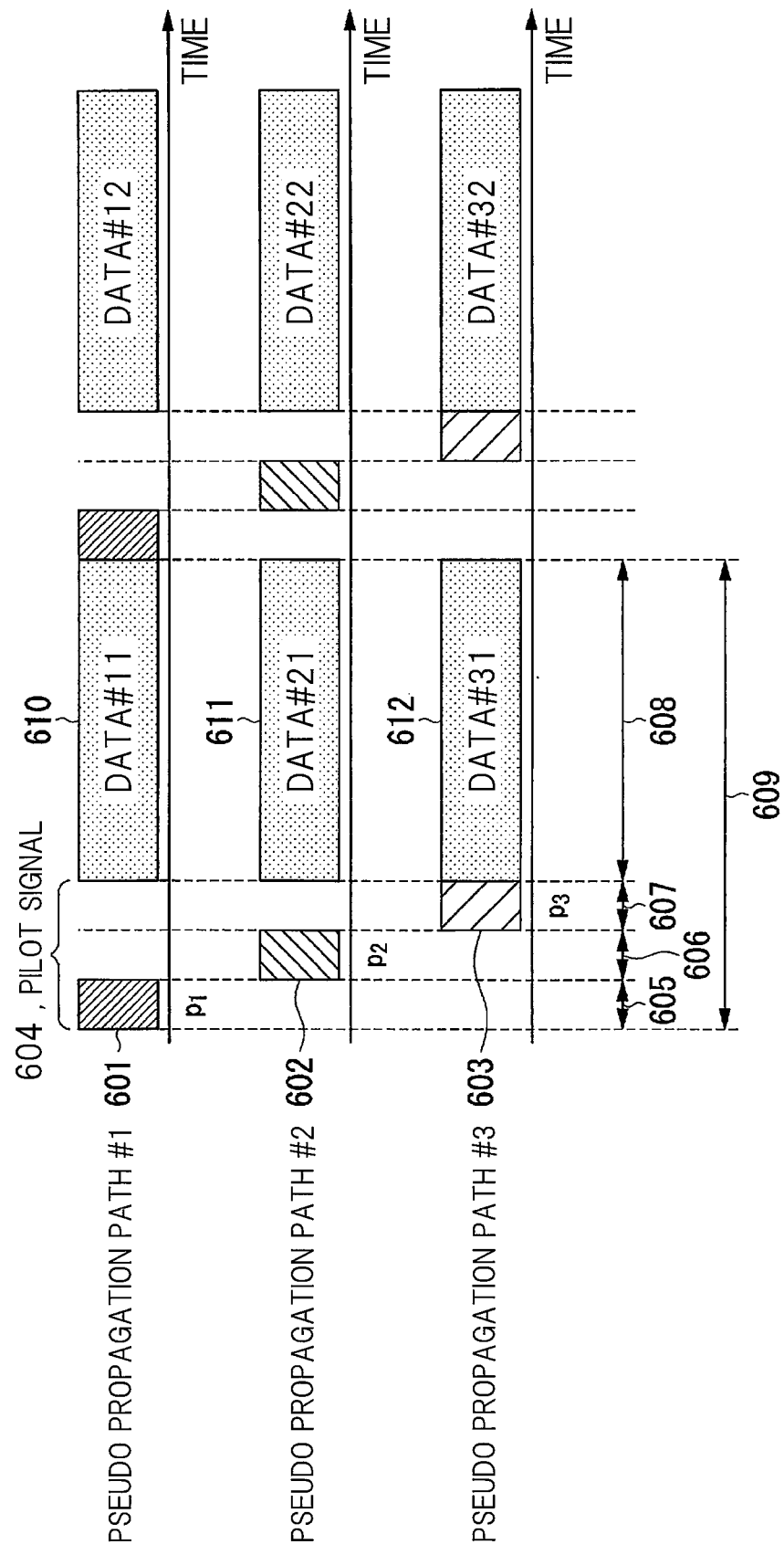

TRANSMISSION/RECEPTION METHOD AND TRANSMISSION/RECEPTION SYSTEM

CROSS-REFERENCE TO RELATED APPLICATIONS

This application is a National Stage application of International Patent Application No. PCT/JP2019/024090, filed on Jun. 18, 2019, which claims priority to Japanese Patent Application No. 2018-118353 filed on Jun. 21, 2018, each of which is hereby incorporated by reference in its entirety.

TECHNICAL FIELD

The present invention relates to a transmission/reception method and a transmission/reception system using a multiplexing scheme directed to a system that requires the improvement in spectral efficiency in the field of using electromagnetic waves such as wireless communication and optical communication. This application claims priority from Japanese Patent Application No. 2018-118353, filed on Jun. 21, 2018, the content of which is hereby incorporated by reference into this application.

BACKGROUND

In FIG. 27, a wireless base station 101 performs communication using a radio frequency band 102 having a predetermined bandwidth. In the fourth-generation mobile communication, the width of the radio frequency band 102 is specified to be a wide band of several MHz or more. If a reflection object A 104 exists in a propagation environment when the radio frequency band 102 is transmitted to a subscriber terminal A 103, the subscriber terminal A 103 receives a combined wave 108 of a direct wave 105 that propagates directly and a reflected wave 107 generated by reflecting an incident wave 106 that is incident on the reflection object A 104.

The reflected wave 107 geometrically has a propagation path longer than that of the direct wave 105, and is thus delayed in terms of time. Further, since phase rotation and orthogonality change occur between the incident wave 106 and the reflected wave 107 due to the material and structure of the reflection object A 104, the signal amplitude of the combined wave 108 becomes uneven depending on the frequency. As described above, since the frequency width of the radio frequency band 102 is sufficiently wide, this frequency-dependent phenomenon causes a power difference of more than 1:10,000 between crests and troughs. This is referred to as the frequency selective multipath fading.

At this time, it is assumed that there is a subscriber terminal B 109 with which the same wireless base station 101 supports communication. A geometric distance 110 between the subscriber terminal A 103 and the subscriber terminal B 109 is assumed to be longer than the wavelength of the frequency band used for the radio frequency band 102. The radio frequency band 102 is transmitted also to the subscriber terminal B 109. If a reflection object B 111 exists in a propagation environment between the wireless base station 101 and the subscriber terminal B 109, the subscriber terminal B 109 receives a combined wave 115 of a direct wave 112 that propagates directly and a reflected wave 114 generated by reflecting a radio wave 113 that is incident on the reflection object B 111.

The reflected wave 114 also geometrically has a propagation path longer than that of the direct wave 112 and is thus delayed in terms of time, and since phase rotation and orthogonality change occur due to the material and structure of the reflection object B 104, the signal amplitude of the combined wave 115 becomes uneven depending on the frequency. However, since the positions of the subscriber terminal A 103 and the subscriber terminal B 109 are different, the above-mentioned propagation characteristics are different in principle.

As described above, the frequency distortion of received radio waves caused by the frequency selective multipath fading, that is, the power difference for each frequency may reach a level at which communication cannot be maintained in some cases. In the fourth-generation mobile communication, in order to prevent the frequency distortion from being directly incurred, the band is subdivided into frequency elements referred to as frequency components or subcarriers. Since the subcarriers provided in the fourth-generation mobile communication have an extremely narrow bandwidth of 15 [kHz] or 7.5 [kHz], it is possible to sufficiently clear the spacing of 100 [kHz] of the frequency selective multipath fading in, for example, the 2 GHz band which is the main operating band, and the subcarrier itself rarely suffers the frequency distortion. However, it is impossible to prevent the difference in magnitude of received power due to the frequency selective multipath fading, and some subcarriers that cannot stand for the communication are generated.

Therefore, in the fourth-generation mobile communication, an access scheme is provided, in which about 12 subcarriers are grouped into one block and are allocated in consideration of the individual frequency blocks and the propagation path characteristics between the wireless base station and the subscribers. This is the OFDMA (Orthogonal Frequency Division Multiple Access).

Here, the work procedure of propagation path characteristic measurement and frequency resource allocation in the fourth-generation mobile communication will be described. FIG. 28 is a block diagram of a wireless access system for the fourth-generation mobile communication. In FIG. 28, a wireless base station eNB 201 includes an eNB transmission system 202 and an eNB reception system 203. A subscriber terminal UE 204 includes a UE reception system 205 and a UE transmission system 206.

The wireless base station eNB 201 has a base station antenna 207 and controls a transmitting/receiving antenna control unit 208 to switch between the transmission of a transmission signal 209 from the eNB transmission system 202 and the reception of a reception signal 210 to the eNB reception system 203. The eNB transmission system 202 uses a transmission information signal Data A 211 to be transmitted as one of input signals. The eNB reception system 203 uses a received information signal Data B' 212 as one of output signals.

A channel coding unit 221 encodes the transmission information signal 211. A quadrature modulation mapping 222 disposes the encoded transmission information signal 211 in the quadrature space and generates a plurality of symbols. A space-time coding unit 223 assigns the plurality of generated symbols in communication frames. A resource allocation unit 224 allocates the communication frames to resource blocks.

An inverse Fourier transformer (IFFT: Inverse Fast Fourier Transform) 225 transforms the data allocated to the resource block from the frequency dimension to the time dimension. A CP (Cyclic Prefix) insertion unit 226 inserts the CP into the frame. Thereafter, a DAC (digital-to-analog converter) 227 converts the data into which the CP is inserted into an analog signal, and generates a high-frequency transmission signal 209 by performing frequency conversion.

The transmitting/receiving antenna control unit 208 transmits the generated transmission signal 209 to the subscriber terminal 204 via the base station antenna 207. In the subscriber terminal 204, basically, the process reverse to each process executed in the wireless base station eNB 201 is executed to take out the data. The subscriber terminal 204 receives the transmission signal 209 through a wireless propagation path 213 via an antenna 214. A transmitting/receiving antenna control unit 215 of the subscriber terminal 204 causes the received data to input to the UE reception system 205.

In the UE reception system 205, a high frequency unit/ADC unit 231 performs amplification of the reception signal, frequency conversion, and analog-digital conversion, thereby obtaining a digital signal. A frame signal without CP is obtained from the digital signal in a CP removing unit 232. The frame signal is transformed from time series data to frequency series data by a fast Fourier transformer (FFT) 233. A resource block information extraction unit 234 extracts data of a desired resource block from the transformed frequency series data.

A MMSE equalizer 236 performs frequency equalization on the data of the extracted resource block. A soft decision unit 237 performs data decision and correction on the data on which the frequency equalization has been performed. A HARQ combiner 238 performs error correction by retransmission control on the corrected data, and then channel code decoding is performed to generate reception information 218.

Here, the wireless base station 201 emits a frequency synchronization signal group, and the subscriber terminal 204 emits a radio wave having a constant amplitude by fixing the phase of all subcarriers in the band, such as a pilot signal SRS (Sounding Reference Signal). These radio waves reach the subscriber terminal 204 and the wireless base station 201 through the wireless propagation path 213, respectively, but arrive while being affected by the frequency selective multipath fading that acts during the propagation.

The amplitude change and the phase change of each subcarrier due to the frequency selective multipath fading are detected by the fast Fourier transformer 233 in the subscriber terminal 204 and examined by a propagation path characteristic estimator 235. Measurement information 240 thereof is sent from the transmission system 206 of the subscriber terminal 204 to the eNB reception system 203 of the wireless base station eNB 201 via the UE antenna 214, is further sent to the space-time coding unit 223 and the resource allocation unit 224 as information 243 for selecting the resource block, that is, as a Rank and Precoding Index, and is then used for reallocation to the resource block. Similarly, the SRS signal emitted by the subscriber terminal 204 is used to learn the state of the frequency selective multipath fading on the wireless propagation path 213 in the wireless base station 201.

Note that the case of frequency division duplex (FDD), that is, the case where the frequencies of the downlink and the uplink are different has been described above, but in the case of time division duplex (TDD), the frequencies of the downlink and the uplink are the same, and thus the measurement of the state of frequency selective multipath fading basically only needs to be performed by the wireless base station. Therefore, it is not necessary in the time division duplex that the subscriber terminal measures the characteristics of the propagation path and replies to the wireless base station.

FIG. 29 shows the resource block of the OFDMA. Now, one OFDMA frequency band emitted by the wireless base station is referred to as a system bandwidth 301. When this radio wave reaches the subscriber terminal, it suffers the multipath fading, and subcarriers 302 constituting the system bandwidth 301 individually have differences in power. In the example of FIG. 29, when the wireless base station obtains the measurement result of this state, it determines that the propagation state is good at the lower end of the frequency, and allocates the resource block corresponding to this to the target subscriber. The size of a resource block is made up of a resource block frequency bandwidth 303 corresponding to 12 subcarriers and a slot 304 with a unit of 0.5 ms, and a collection of the two sections thereof in the time axis direction is referred to as a subframe 305 and is used as a unit of communication.

Namely, a resource block group 306 represented by a rectangle is provided for communication to a subscriber terminal for the system bandwidth 301 of FIG. 29. Other resource blocks are allocated to other subscriber terminals, or a plurality of resource blocks are allocated to the subscriber terminal if there are other parts with good wireless propagation path quality. Such allocation is repeatedly performed for each subframe while constantly ensuring the communication quality of each subscriber terminal. A whole resource block 307 is always used with high utilization efficiency, which leads to the improvement in spectral efficiency as access efficiency.

However, the resource block is independently allocated to each subscriber terminal and frequency multiplexing in the third-generation mobile communication is not performed. Namely, a certain subscriber terminal is supposed to occupy the allocated resource block in the limited time domain/frequency domain. For this reason, the MIMO (Multiple Input Multiple Output) method using a plurality of propagation paths with different propagation path characteristics is exclusively used for the further increase in the transmission rate, and the sophistication thereof is in progress.

However, in the case of the multiplexing of propagation path, as the number of multiplexes increases, the communication capacity and communication quality decrease due to instability that occurs in the propagation path and the non-orthogonality between propagation path profiles. In addition, there is a significant problem in the structural design due to the multiple antennas.

On the other hand, in the fifth-generation mobile communication, various methods of improving spectral efficiency referred to as non-orthogonal multiplexing technology NOMA (Non-Orthogonal Multiple Access) have been under study. A major example is shown in FIG. 30. In FIG. 30, a subscriber terminal 402 located near is connected to a wireless base station 401 by a wireless propagation path 403, and a subscriber terminal 404 located far is connected to the wireless base station 401 by a wireless propagation path 405. In this situation, the case where the two subscriber terminals 402 and 404 simultaneously transmit radio waves to the wireless base station 401 with the same transmission power will be considered.

Since the distance attenuation amount of the radio wave from the subscriber terminal 402 located at a close distance 406 is smaller than that of the radio wave from the subscriber terminal 404 located at a far distance 408, the wireless base station 401 receives the radio wave with much higher power from the subscriber terminal 402 than that from the subscriber terminal 404. This means that the reception signal is approximately occupied by the information of the subscriber terminal 402 located near. By utilizing this state, the wireless base station 401 can easily extract the reception signal from the subscriber terminal 402 located near.

The wireless base station 401 removes the reception signal of the subscriber terminal 402 located near from the reception signal with the use of the extracted reception signal of the subscriber terminal 402 located near. The output obtained thereby is a signal of the subscriber terminal 404 located far. In this manner, it is possible to simultaneously connect and communicate with the two subscriber terminals located near and far with the same resource block.

FIG. 31 is a diagram for describing the NOMA scheme shown in FIG. 30 in the time/frequency domain, in which two Layers are provided in the time/frequency domain and one of them is Layer 1 and the other is Layer 2. In the time/frequency situation in which a certain resource block on Layer 1 is preferred to be selected on the delay profile of the two subscriber terminals located near and far, a radio wave 411 of the subscriber terminal located near reaches the wireless base station with high reception power (see FIG. 15). On the other hand, a radio wave 412 from the subscriber terminal located far is subjected to greater distance attenuation effect and reaches the wireless base station with low reception power.

It is obvious that, in the state where the two signals are mixed, the radio wave 411 of the subscriber terminal with higher power can be easily extracted. However, if the two subscriber terminals have a sufficient distance difference, a sufficient power difference can be obtained, but if they exist at a close distance, the separation of the signals becomes difficult. In addition, when trying to communicate with a subscriber terminal at an intermediate distance, sufficient discrimination cannot be made, and there is a problem that the spectral efficiency is double at the maximum and is only about 1.3 times on average.

FIG. 32 shows a diagram for considering the possibility of multiplex communication in the form of 2×1 MISO (Multiple Input Single Output) in the MIMO scheme of the existing technology. The case where multiple pieces of information are sent using the same frequency in the same space will be considered. Whether or not two different types of information transmitted from two antennas to one antenna can be discriminated based on the difference of spatial propagation path characteristics will be considered. It is assumed that a wireless base station 501 now transmits independent information from a first transmission facility 505 and a second transmission facility 506 to a subscriber terminal 502 with the use of a first antenna 503 (transmitting antenna) and a second antenna 504 (transmitting antenna). A wireless propagation path 508 connecting the first antenna 503 and a receiving side antenna 507 and a wireless propagation path 509 connecting the second antenna 504 and the receiving side antenna 507 are provided between the wireless base station 501 and the subscriber terminal 502.

When independent information is transmitted from the first antenna 503 and the second antenna 504 using the same frequency, an interference state occurs in the UE antenna 507 of the subscriber terminal 502 as a matter of course. However, when the propagation characteristics of the first wireless propagation path 508 and the second wireless propagation path 509 have independence, the independent information from the first transmission facility 505 and the second transmission facility 506 received in the interference state can be separated and extracted based on the propagation path characteristic data.

The principle thereof will be described. The reception wave, which the subscriber terminal 502 has received by the UE antenna 507 and includes frequency distortion received through the wireless propagation path 508 and the wireless propagation path 509 from the first antenna 503 and the second antenna 504 of the wireless base station 501, receives a so-called white noise from natural noise sources. Since noise receives vector addition in a receiver 510, it is depicted in addition to an adder 511. The reception signal added with the noise enters a signal discriminator 512 with the help of a channel estimator 513. Further, error correction is performed in maximum likelihood detectors 514 and 515, and two types of transmitted information are separated and extracted.

Here, in order to extract information, it is indispensable to distinguish between the wireless propagation path 508 and the wireless propagation path 509 that use the same frequency. When the propagation path characteristics of the wireless propagation path 508 are $h_1$ and the propagation path characteristics of the wireless propagation path 509 are $h_2$, and these have physically high independence, that is, high orthogonality, information $d_1$ and information $d_2$ from the first antenna 503 and the second antenna 504 of the wireless base station 501 can be calculated by a correlation calculation based on the inner product of a reception signal r by the receiving side antenna 507 and the propagation path characteristics, and can be represented as in equations (1) and (2).

$$d_1 = \int r \cdot h_1 dt \tag{1}$$

$$d_2 = \int r \cdot h_2 dt \tag{2}$$

However, in general, when the number of receiving antennas is one, it is difficult to always obtain physically independent propagation path characteristics $h_1$ and propagation path characteristics $h_2$, and it is thus difficult to separate and extract the information $d_1$ and $d_2$, and a plurality of antennas are provided on the receiving side. Here, a MIMO (Multiple Input Multiple Output) algorithm for learning the propagation path characteristics $h_1$ and the propagation path characteristics $h_2$ will be described.

FIG. 33 shows a communication frame for 2×2 MIMO that enables the time/space communication multiplexing. 601 denotes a communication frame transmitted from the first antenna of the wireless base station. 602 denotes a communication frame transmitted from the second antenna of the wireless base station. Both communication frames are synchronized and are managed by a communication frame 603 having a predetermined length. A pilot signal section 604 is provided at the head of the communication frame, and is composed of slots 605 and 606 in two sections.

The wireless base station transmits, in the slot 605 of the time $t=t_1$, a symbol signal $S_1$ from the first antenna of wireless base station and a symbol signal $S_2$ from the second antenna of wireless base station. Next, it transmits, in the slot 606 of the time $t=t_2$, a negative conjugate signal of the symbol signal $S_2$ from the first antenna of wireless base station and a conjugate signal of the symbol signal $S_1$ from the second antenna of wireless base station. When the reception signal of the subscriber terminal for the slot at the first time $t=t_1$ is $r_1(t=t_1)$ and the reception signal of the subscriber terminal for the slot at the next time $t=t_2$ is $r_2(t=t_2)$, equation (3) and equation (4) are obtained.

$$r_1(t=t_1) = h_1 S_1 + h_2 S_2 + w_1 \tag{3}$$

$$r_2(t=t_2) = -h_1 \overline{S}_2 + h_2 \overline{S}_1 + w_2 \tag{4}$$

Here, $S_i^-$ represents a conjugate complex number of $S_i$. The method of transmitting/receiving complex number information is quadrature modulation and quadrature demodulation. When the transmission power is sufficiently large, the propagation path distance is small, and the reception power is sufficiently large, the noises $w_1$ and $w_2$ can be ignored, so that $h_1$ and $h_2$ can be obtained by equation (5) and equation (6) from equation (3) and equation (4).

$$h_1 = \frac{\tilde{r}_1 \tilde{S}_1 - \tilde{r}_2 S_2}{|S_1|^2 + |S_2|^2} \quad (5)$$

$$h_2 = \frac{\tilde{r}_1 \tilde{S}_2 + \tilde{r}_2 S_1}{|S_1|^2 + |S_2|^2} \quad (6)$$

Here, $r_1^\sim$ and $r_2^\sim$ are the averages of the value of the slot at time $t=t_1$ and the value of the slot at time $t=t_2$. Now, if the following conditions are satisfied when comparing equations (5) and (6), $h_1$ and $h_2$ are uncorrelated, and independence is maintained. Namely, it is the case where the inner product of equation (7) or the inner product of equation (8) holds.

$$h_1 \cdot h_2 = 0 \quad (7T)$$

$$(\tilde{r}_1 \tilde{S}_1 - \tilde{r}_2 S_2) \cdot (\tilde{r}_1 \tilde{S}_2 + \tilde{r}_2 S_1) = 0 \quad (8)$$

Equation (8) is satisfied with:

$$\tilde{r}_1 \tilde{S}_1 - \tilde{r}_2 S_2 = 0$$

or $$\tilde{r}_1 \tilde{S}_2 - \tilde{r}_2 S_1 = 0$$

and thus, equation (9) is obtained and equation (10) is obtained.

$$\text{From } \tilde{r}_1 \tilde{S}_1 - \tilde{r}_2 \tilde{S}_2 = 0, \quad \overline{S}_1 = \frac{\tilde{r}_2}{\tilde{r}_1} S_2 \quad (9)$$

$$\text{From } \tilde{r}_1 \tilde{S}_2 + \tilde{r}_2 \tilde{S}_1 = 0, \quad S_1 = -\frac{\tilde{r}_1}{\tilde{r}_2} S_2 \quad (10)$$

The fact that equations (9) and (10) hold at the same time means that the product thereof holds, that is, it is the case where the following equation (11) holds.

$$S_1 \overline{S}_1 = \frac{\tilde{r}_1 \tilde{r}_2}{\tilde{r}_1 \tilde{r}_2} S_2 \overline{S}_2 = -S_2 \overline{S}_2 \text{ i.e., } |S_1|^2 = -|S_2|^2 \quad (11)$$

This means that the following equation (12) holds.

$$S_1 = \pm j S_2 = e^{\pm j \frac{\pi}{2}} \cdot S_2 \quad (12)$$

Equation (12) becomes equation (13) when represented by inner product.

$$S_1 \cdot S_2 = 0 \quad (13)$$

Namely, it is the case where the absolute values or norms of the signals $S_1$ and $S_2$ are equal and the inner product is 0. Further, when equations (11) and (13) have a spread in terms of frequency or time, it is necessary to consider in a subspace of frequency or time, and the condition can be shown by the total of the frequency space or time space occupied by data 608 or data 609, that is, by performing integration. This is shown in the following equations (14) and (15).

$$\begin{cases} \int |S_1| dp = \int |S_2| dp & (14) \\ \int (S_1 \cdot S_2) dp = 0 & (15) \end{cases}$$

When such a condition is satisfied, equations (5) and (6) are obtained, and independent data 608 and data 609 sent in a data transmission section 607 can be separated and extracted from a reception signal $r_d$ received by one antenna with the use of the following equation, but equation (11) causes a situation where the denominators of equations (5) and (6) are zero. This means that a sufficient number of equations as multiple simultaneous equation have not been obtained. Namely, it means that, in transmitting data from two antennas to one antenna with different propagation path characteristics $h_1$ and $h_2$, sufficient information for clarifying the propagation path characteristics cannot be obtained.

Actually, in the current 2×2-MIMO system, sufficient information for clarifying the propagation path characteristics is acquired by installing equal number of antennas, that is, two antennas on both the receiving side and the transmitting side. If the propagation path characteristics $h_1$ and $h_2$ are clarified, the information $d_1$ of the data 608 and the information $d_2$ of the data 609 can be extracted on the receiving side as equation (16) and equation (17).

$$\begin{cases} d_1 = \frac{r_d - w_d}{h_1} & (16) \\ d_2 = \frac{r_d - w_d}{h_2} & (17) \end{cases}$$

Here, $w_d$ represents noise.

FIG. 34 shows a concept of LTE communication by the conventional 2×2 MIMO. In the LTE communication, communication is performed between a transmitting side 501a and a receiving side 502a. In the 2×2 MIMO communication, the transmitting side 501a is provided with transmitting antennas 701 and 702, and the receiving side 502a is provided with receiving antennas 703 and 704.

A wireless propagation path 705 exists between the transmitting antenna 701 and the receiving antenna 703. A wireless propagation path 706 exists between the transmitting antenna 701 and the receiving antenna 704. A wireless propagation path 707 exists between the transmitting antenna 702 and the receiving antenna 704. A wireless propagation path 708 exists between the transmitting antenna 702 and the receiving antenna 703. On the transmitting side 501a, transmission signals 711 and 712 are supplied to the transmitting antennas 701 and 702 from antenna transmission/reception control units 709 and 710, respectively. The antenna transmission/reception control units 709 and 710 supply reception signals also to reception signal paths 713 and 714, respectively.

Two systems are prepared for transmission data, and first transmission data 715 is encoded, mapped, and modulated by a modulation unit 717. Then, an insertion of a guard section, that is, a CP portion (Cyclic prefix) into its digital output 719, digital-analog conversion thereof, and a process of mounting it on a carrier wave are performed by a high frequency unit 721. Similarly, second transmission data 716 is encoded, mapped, and modulated by a modulation unit 718, and an insertion of a guard section, that is, a CP portion (Cyclic prefix) into its digital output 720, digital-analog conversion thereof, and a process of mounting it on a carrier wave are performed by a high frequency unit 722.

On the receiving side 502a, after the reception signal of the receiving antenna 703 becomes a reception signal 725 through an antenna transmission/reception control unit 723, a conversion from a high frequency signal to a baseband signal, removal of the guard section, and a conversion into a digital signal are performed by an analog processor 729, FFT processing (Fast Fourier Transform) is performed by a FFT unit 741, and then discrimination into data group on each subcarrier is performed by the time domain-frequency domain transform. For the output thereof, the mapping is returned to its original by a demapping processor 751, the accuracy is enhanced in a MMSE (minimum mean square error) unit 755 until the error of the modulation symbol vector becomes the minimum average, and the modulation point on the I-Q constellation of the output 757 is obtained by a MLD (maximum likelihood detector) unit 759, thereby detecting the transmitted data.

Similarly, in the second system of the receiving antenna 704, after the reception signal of the receiving antenna 704 becomes a reception signal 726 through an antenna transmission/reception control unit 724, a conversion from a high frequency signal to a baseband signal, removal of the guard section, and a conversion into a digital signal are performed by an analog processor 730, FFT processing (Fast Fourier Transform) is performed by a FFT unit 742, and then discrimination into data group on each subcarrier is performed by the time domain-frequency domain transform.

For the output thereof, the mapping is returned to its original by a demapping processor 752, the accuracy is enhanced in a MMSE (minimum mean square error) unit 756 until the error of the modulation symbol vector becomes the minimum average, and the modulation point on the I-Q constellation of the output 758 is obtained by a MLD (maximum likelihood detector) unit 760, thereby detecting the transmitted data. The result of learning of the propagation path characteristics of MIMO transmission by the transmission of pilot signals is used at the time of this data detection.

FIG. 35 shows the functions of the MMSE unit and the MLD unit in FIG. 34. 771 in FIG. 35 denotes an output of 751 and 752 for performing demapping and the like in FIGS. 34, and 772 denotes a MMSE unit corresponding to 751 and 752. A propagation path characteristic estimation value is supplied to the MMSE unit 772 from a channel estimation unit 773 that has received a reception signal group 771 in parallel.

For an output 774 extracted by the MMSE unit 772 by the MMSE equalization, a squared Euclidean distance calculation is performed by 775 in order to obtain a modulation point on the constellation of each symbol vector, an error of the result is calculated as a log likelihood ratio LLR by 776, and the decoding is performed by a soft decision channel decoder 777, thereby completing the decoding of the transmitted data.

By the process above, even if the difference in the propagation path characteristics between the wireless propagation paths 705, 706, 707, and 708 does not have sufficient orthogonality, only the transmission data propagated through the desired propagation path can be extracted and taken out by estimating the propagation path characteristics.

SUMMARY

In the fourth-generation mobile communication, there is the problem that the spectral efficiency of the resource block of OFDMA (Orthogonal Frequency Division Multiple Access), which is the core technology of the fourth-generation mobile communication, cannot be improved, which hinders the development and expansion of the communication business.

The present invention provides a transmission/reception method and a transmission/reception system for improving spectral efficiency in a resource block.

In order to solve the problem above, an aspect of the present invention is a transmission/reception method in a transmission/reception system in which a transmission device and a reception device communicate with each other, wherein the reception device measures propagation path characteristics of a communication propagation path,
wherein the transmission device generates, based on a measurement result of the propagation path characteristics, a plurality of pseudo propagation path characteristics having propagation path characteristics similar to the propagation path characteristics to an extent that frequency characteristics can be approximated,
wherein, for pseudo propagation path characteristics determined to have high mutual correlation among the plurality of pseudo propagation path characteristics, the transmission device generates the pseudo propagation path characteristics again so as to have low mutual correlation, thereby generating the plurality of pseudo propagation path characteristics having low mutual correlation,
wherein the transmission device generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal,
and wherein the reception device receives the plurality of pseudo propagation path characteristic information transmitted antecedently from the transmission device and a communication signal transmitted subsequently, and individually extracts the plurality of data from the communication signal based on the plurality of pseudo propagation path characteristic information.

In order to solve the problem above, an aspect of the present invention is a transmission/reception system in which a transmission device and a reception device communicate with each other, wherein the transmission device includes:
a generation unit which generates, based on a measurement result of propagation path characteristics of a communication propagation path measured by the reception device, a plurality of pseudo propagation path characteristics having propagation path characteristics similar to the propagation path characteristics to an extent that frequency characteristics can be approximated, and for pseudo propagation path characteristics determined to have high mutual correlation among the plurality of pseudo propagation path characteristics, generates the pseudo propagation path characteristics again so as to have low mutual correlation, thereby generating the plurality of pseudo propagation path characteristics having low mutual correlation; and a transmission unit which generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal, and wherein the reception device includes:

a measurement unit which measures the propagation path characteristics of the communication propagation path;

a reception unit which receives the plurality of pseudo propagation path characteristic information transmitted antecedently from the transmission device and a communication signal transmitted subsequently; and a data decoding unit which individually extracts the plurality of data from the communication signal based on the plurality of pseudo propagation path characteristic information.

In order to solve the problem above, an aspect of the present invention is a transmission/reception method in a transmission/reception system in which a transmission device and a reception device communicate with each other, wherein the transmission device measures propagation path characteristics of a communication propagation path and generates, based on a measurement result of the propagation path characteristics, a plurality of pseudo propagation path characteristics having propagation path characteristics similar to the propagation path characteristics to an extent that frequency characteristics can be approximated, wherein, for pseudo propagation path characteristics determined to have high mutual correlation among the plurality of pseudo propagation path characteristics, the transmission device generates the pseudo propagation path characteristics again so as to have low mutual correlation, thereby generating the plurality of pseudo propagation path characteristics having low mutual correlation, wherein the transmission device generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal, and wherein the reception device receives the plurality of pseudo propagation path characteristic information transmitted antecedently from the transmission device and a communication signal transmitted subsequently, and individually extracts the plurality of data from the communication signal based on the plurality of pseudo propagation path characteristic information.

In order to solve the problem above, an aspect of the present invention is a transmission/reception system in which a transmission device and a reception device communicate with each other, wherein the transmission device measures propagation path characteristics of a communication propagation path and generates, based on a measurement result of the propagation path characteristics, a plurality of pseudo propagation path characteristics having propagation path characteristics similar to the propagation path characteristics to an extent that frequency characteristics can be approximated, wherein, for pseudo propagation path characteristics determined to have high mutual correlation among the plurality of pseudo propagation path characteristics, the transmission device generates the pseudo propagation path characteristics again so as to have low mutual correlation, thereby generating the plurality of pseudo propagation path characteristics having low mutual correlation, wherein the transmission device generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal, and wherein the reception device receives the plurality of pseudo propagation path characteristic information transmitted antecedently from the transmission device and a communication signal transmitted subsequently, and individually extracts the plurality of data from the communication signal based on the plurality of pseudo propagation path characteristic information.

It is possible to improve the spectral efficiency in a resource block in a wireless or wired communication method.

BRIEF DESCRIPTIONS OF THE DRAWINGS

FIG. 2C is a diagram in which M independent signals are transmitted on a single frequency with the use of a plurality of (M) pieces of pseudo propagation path characteristic information;

FIG. 16B is a diagram showing an example of a configuration that extracts pseudo propagation path characteristics on a receiving side;

FIG. 17B is a diagram showing an example of a delay profile of pseudo propagation path characteristics;

Figure 19:
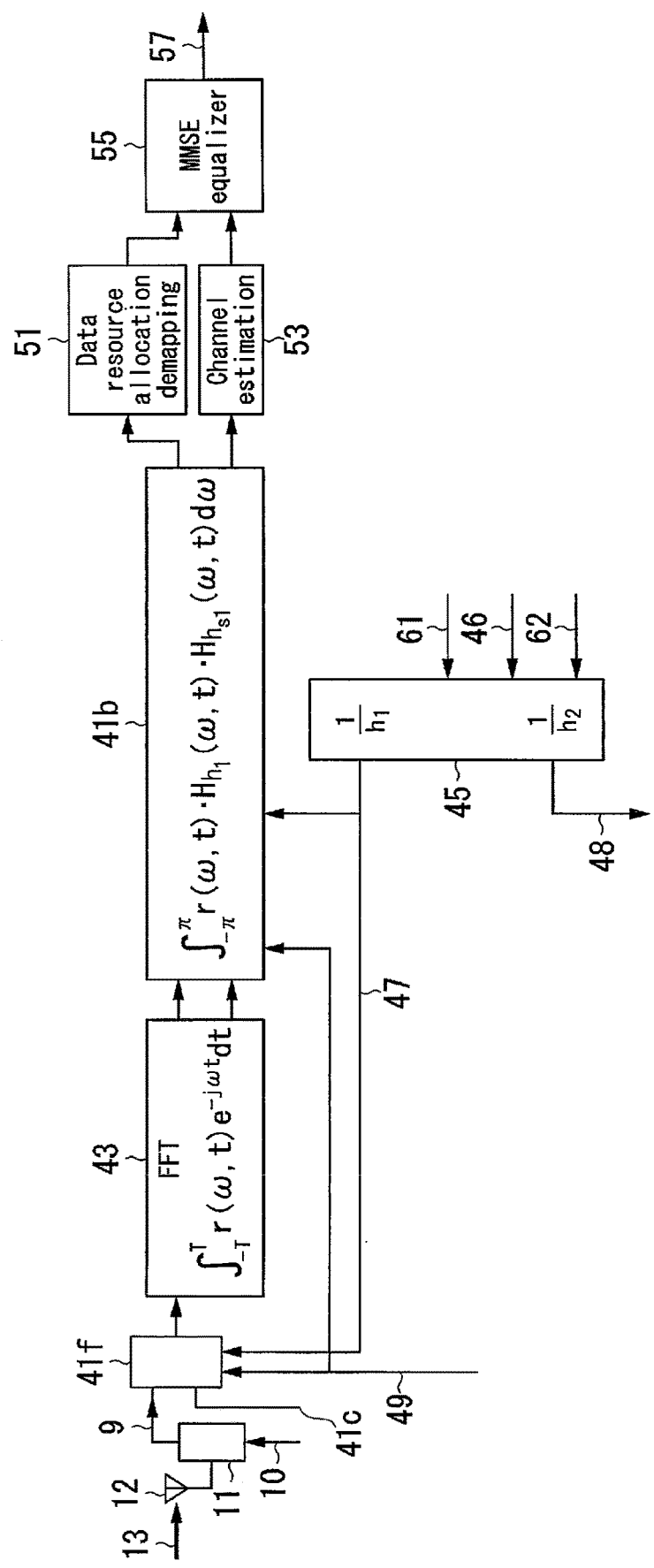
Figure 20:
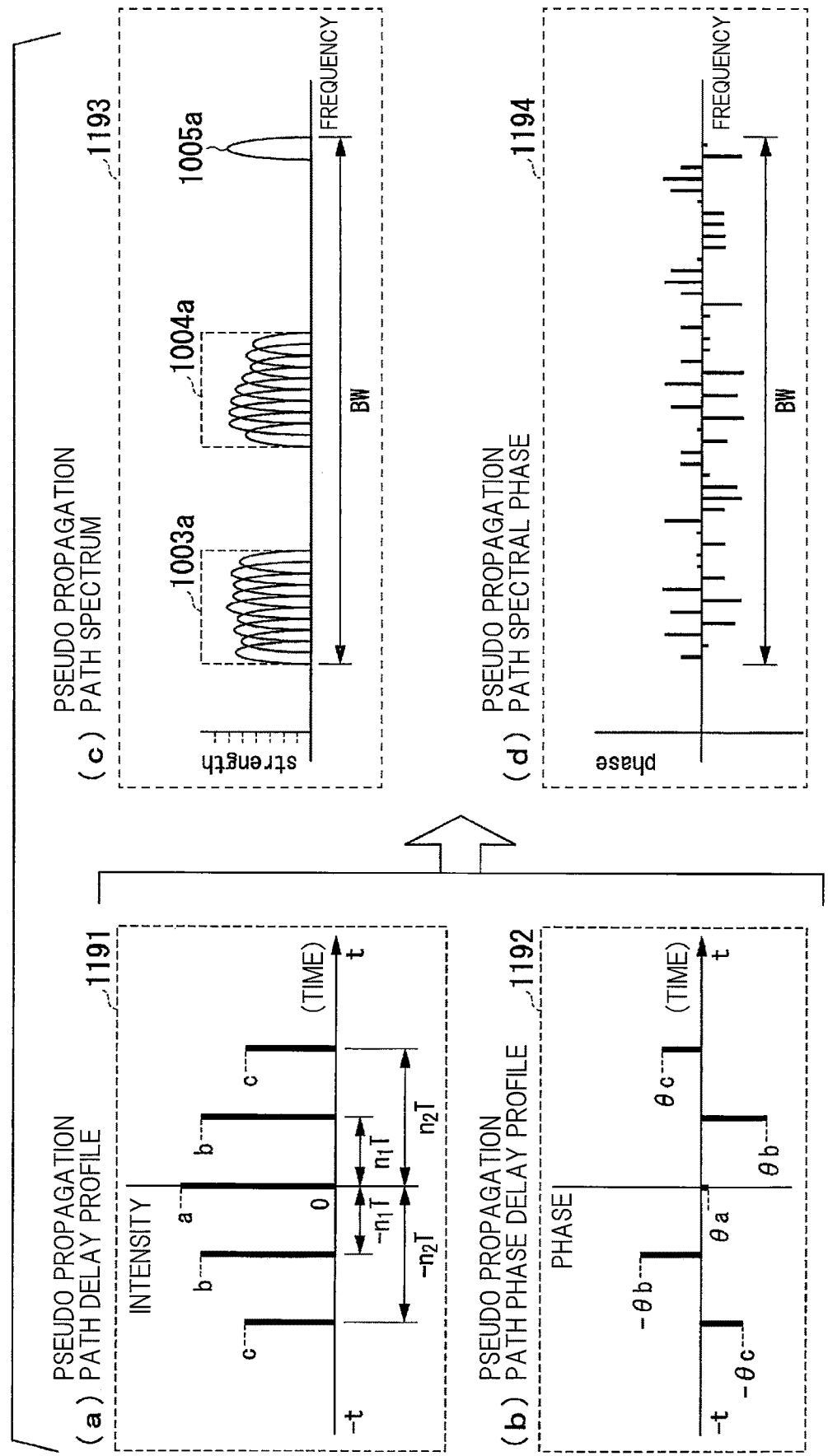
Figure 21:
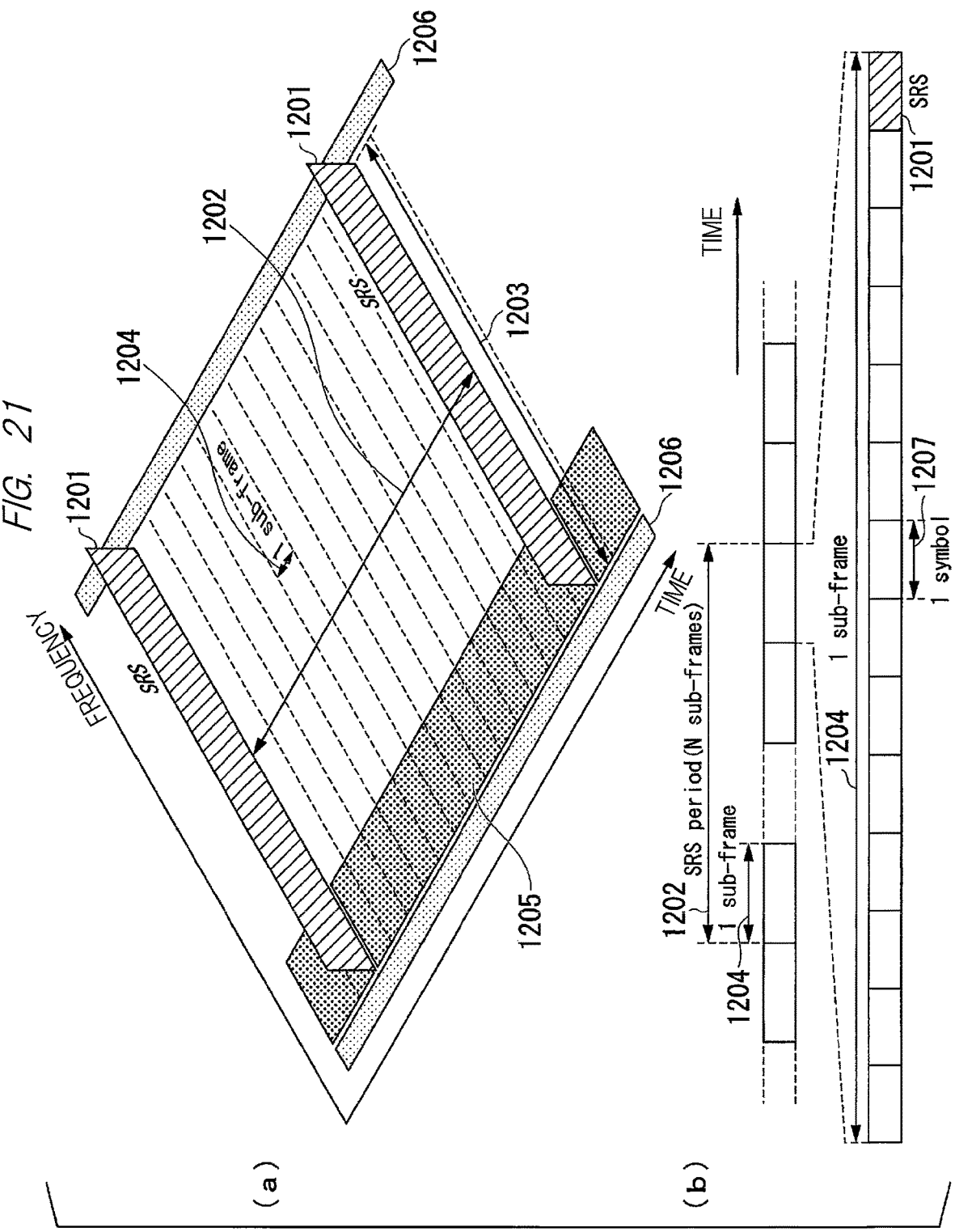
Figure 22:
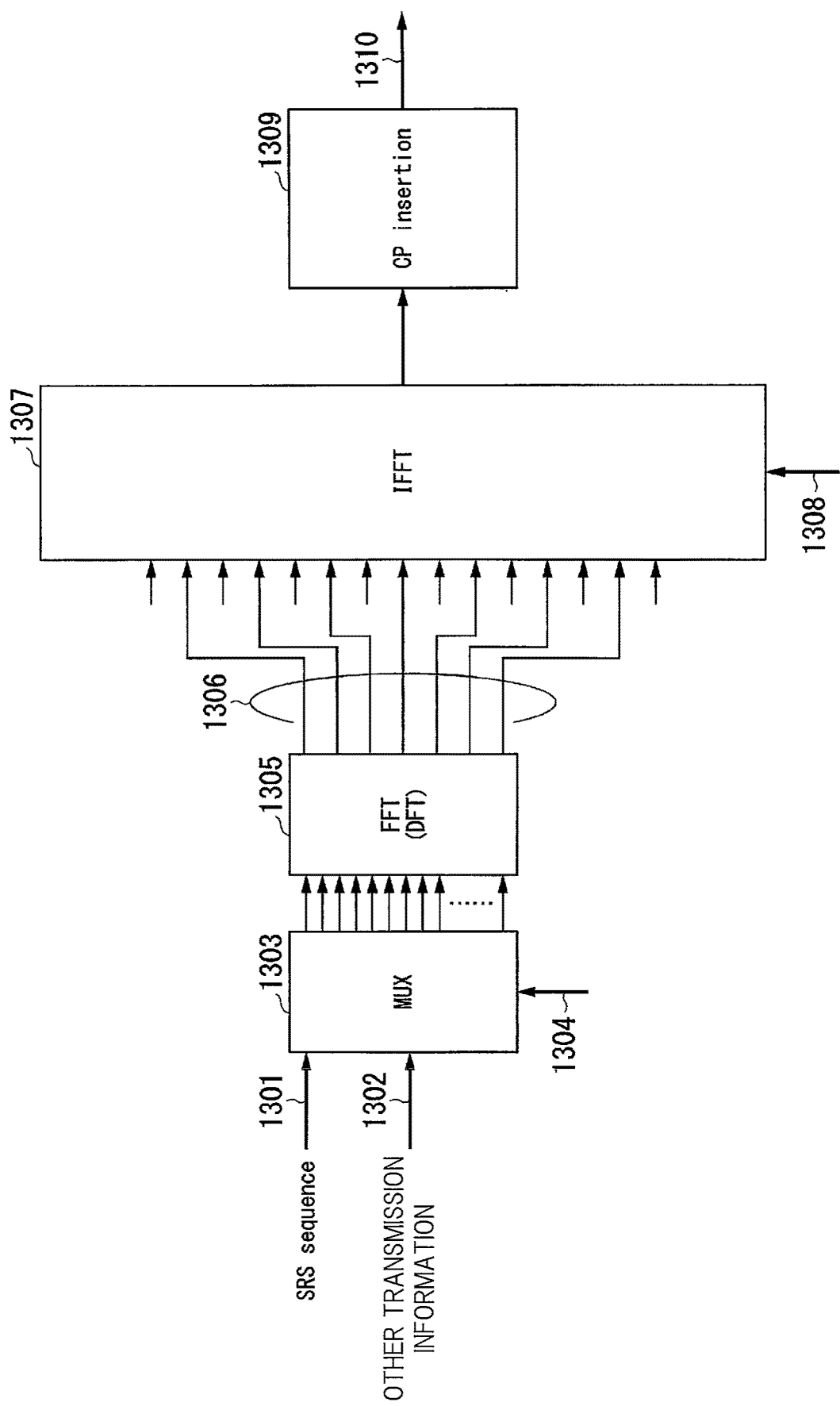
Figure 23:
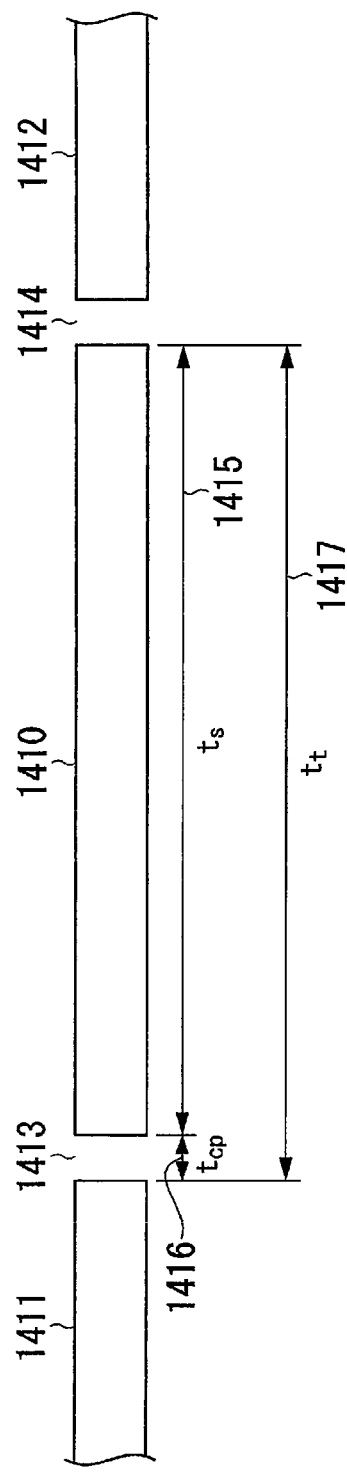
Figure 24:
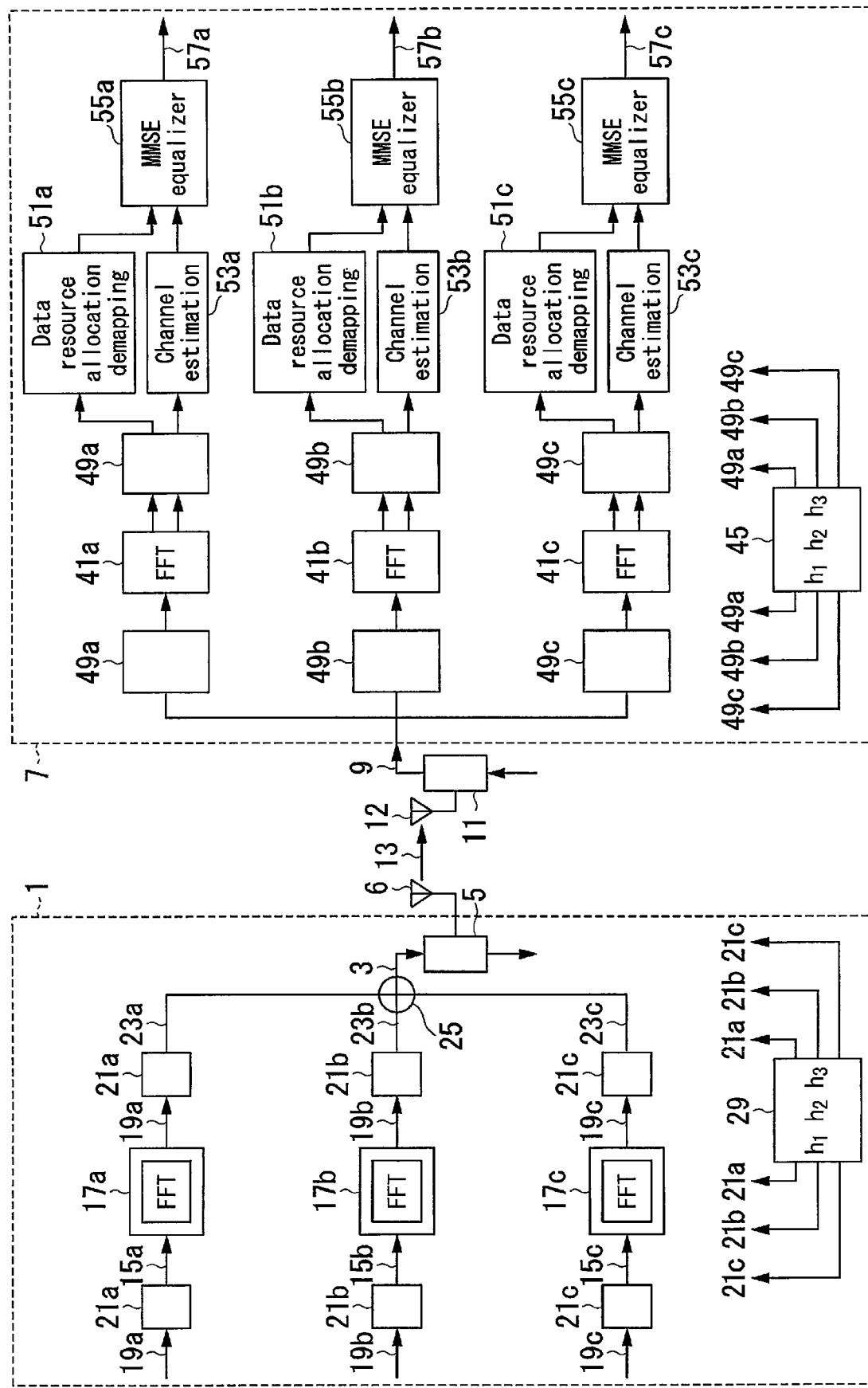
Figure 26A:
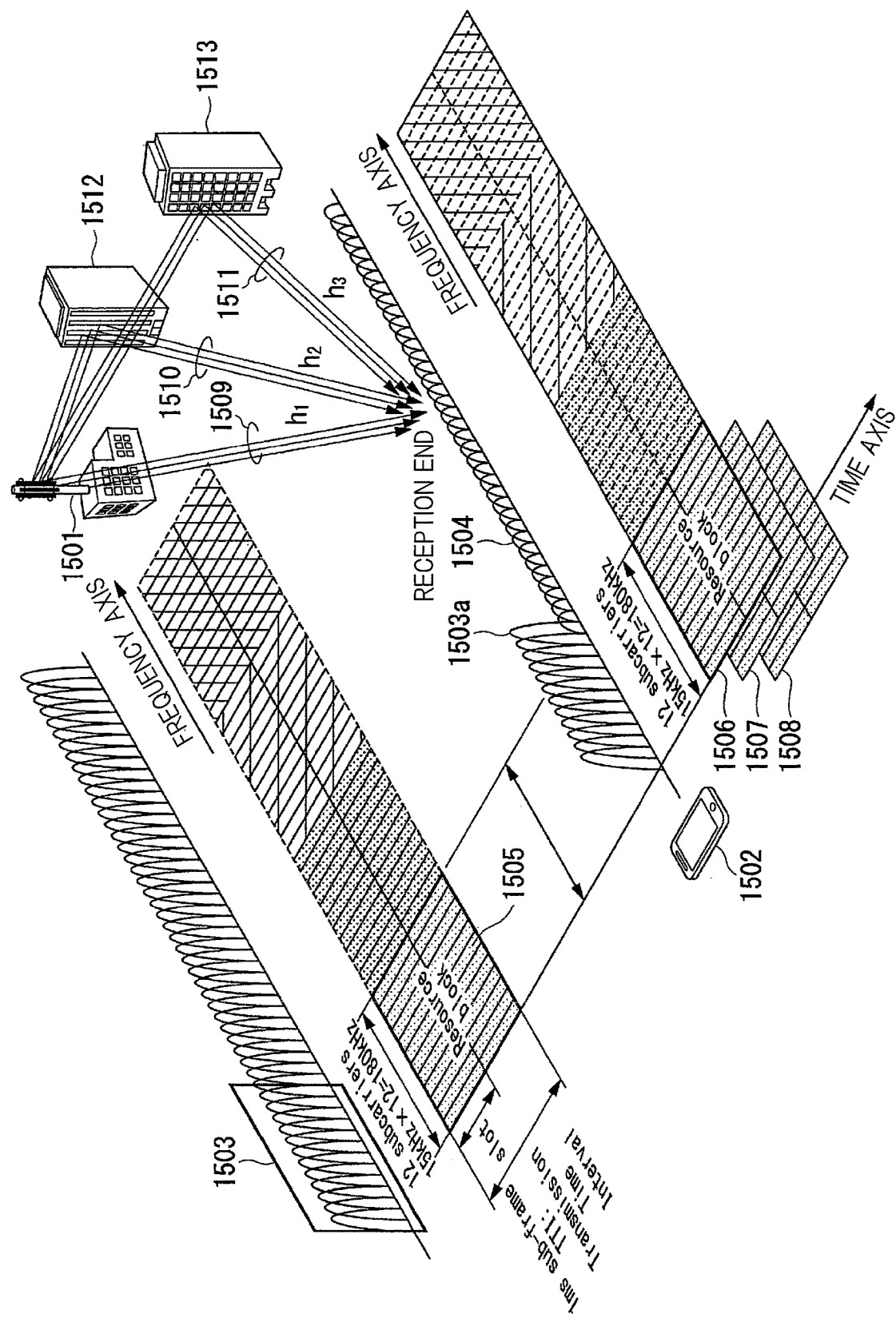
Figure 26B:
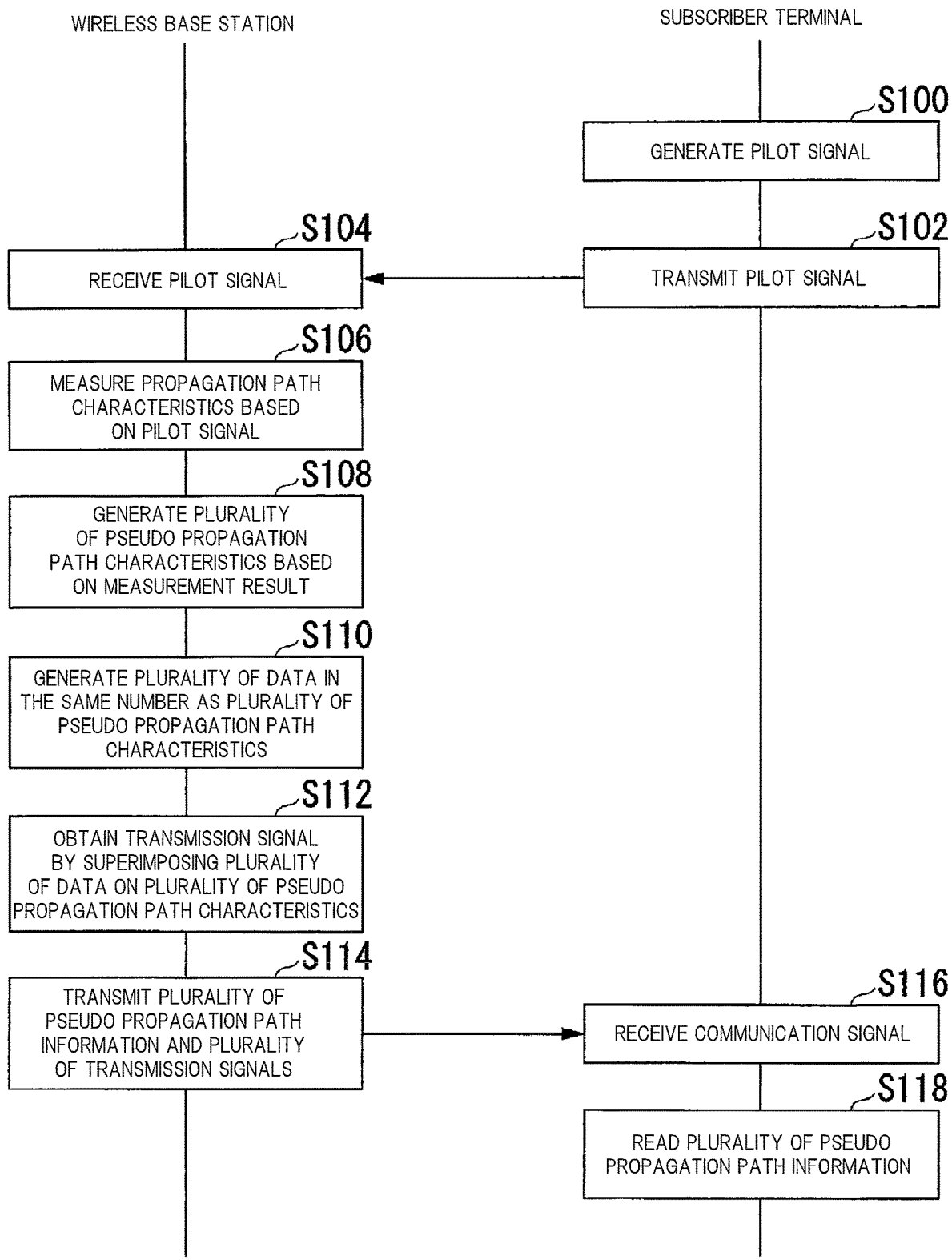
Figure 27:
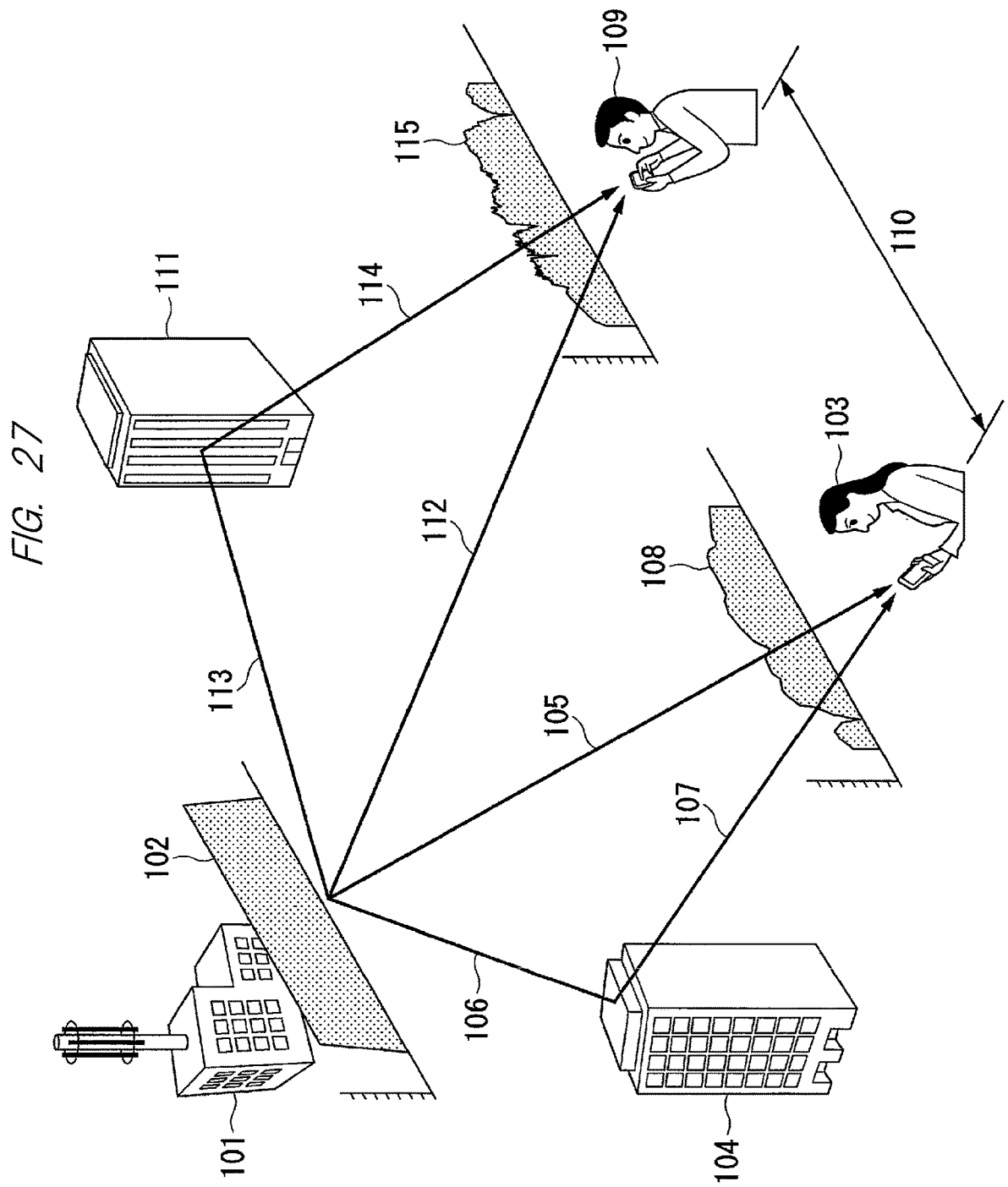
Figure 28:
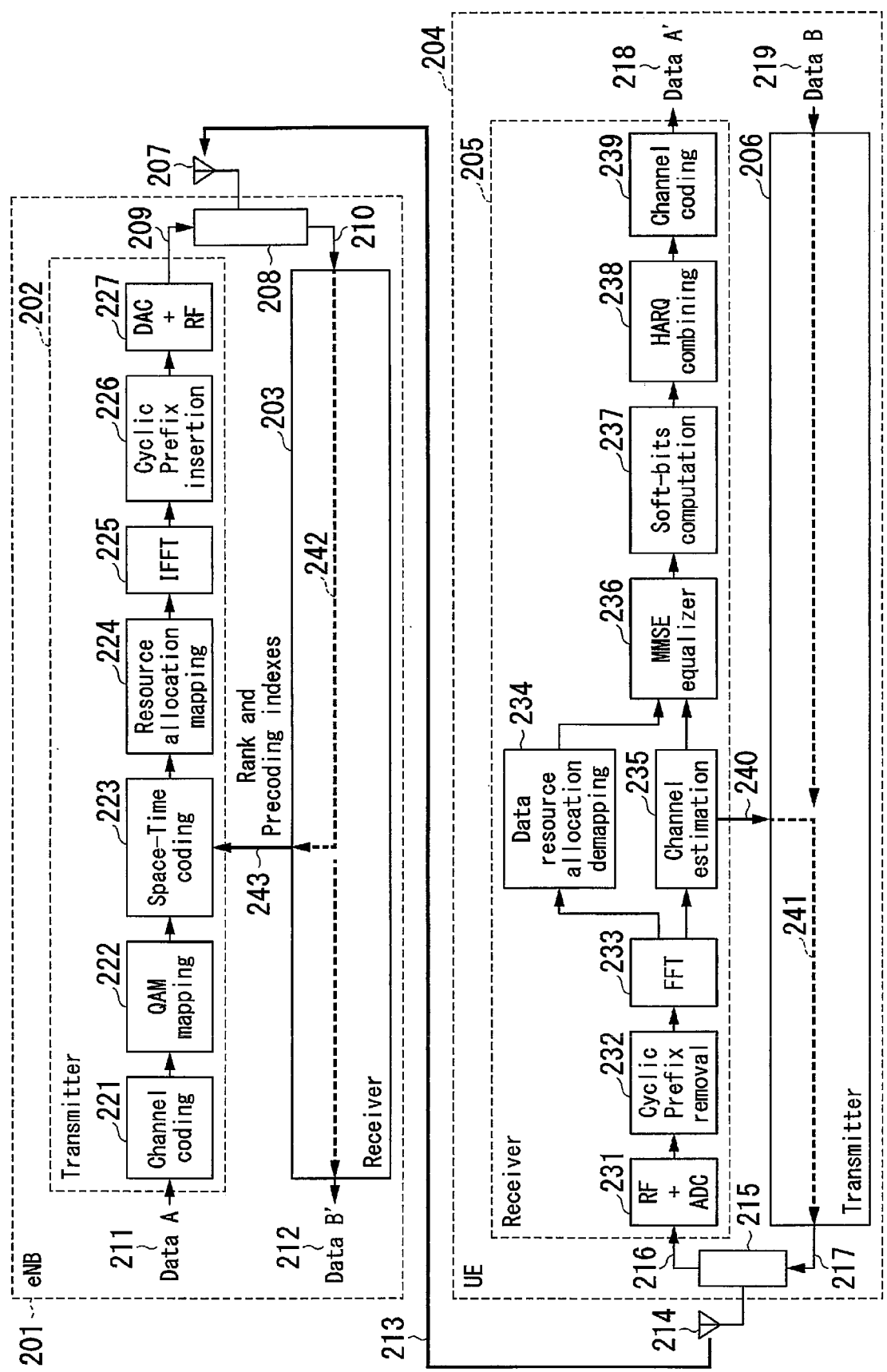
Figure 29:
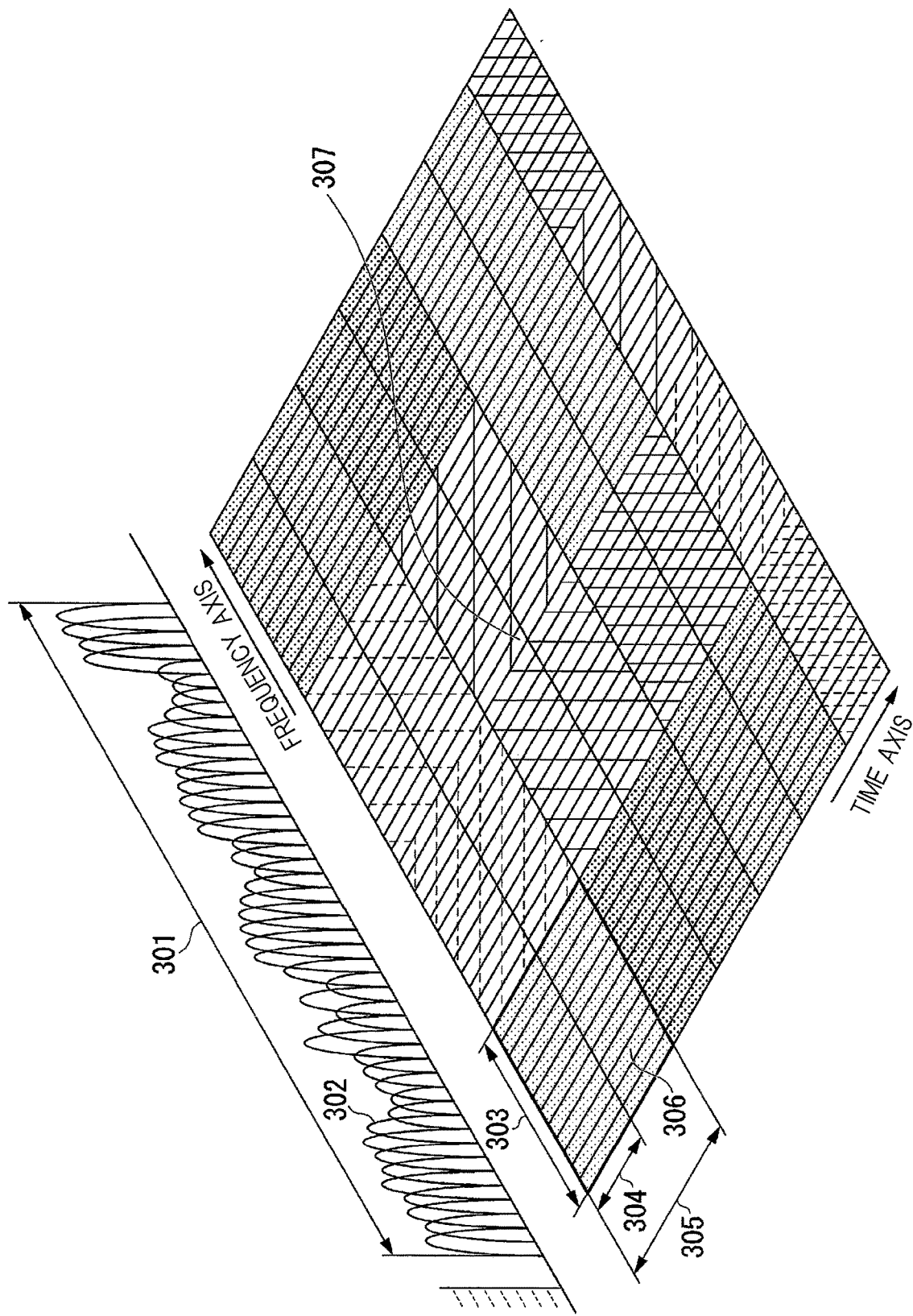
Figure 30:
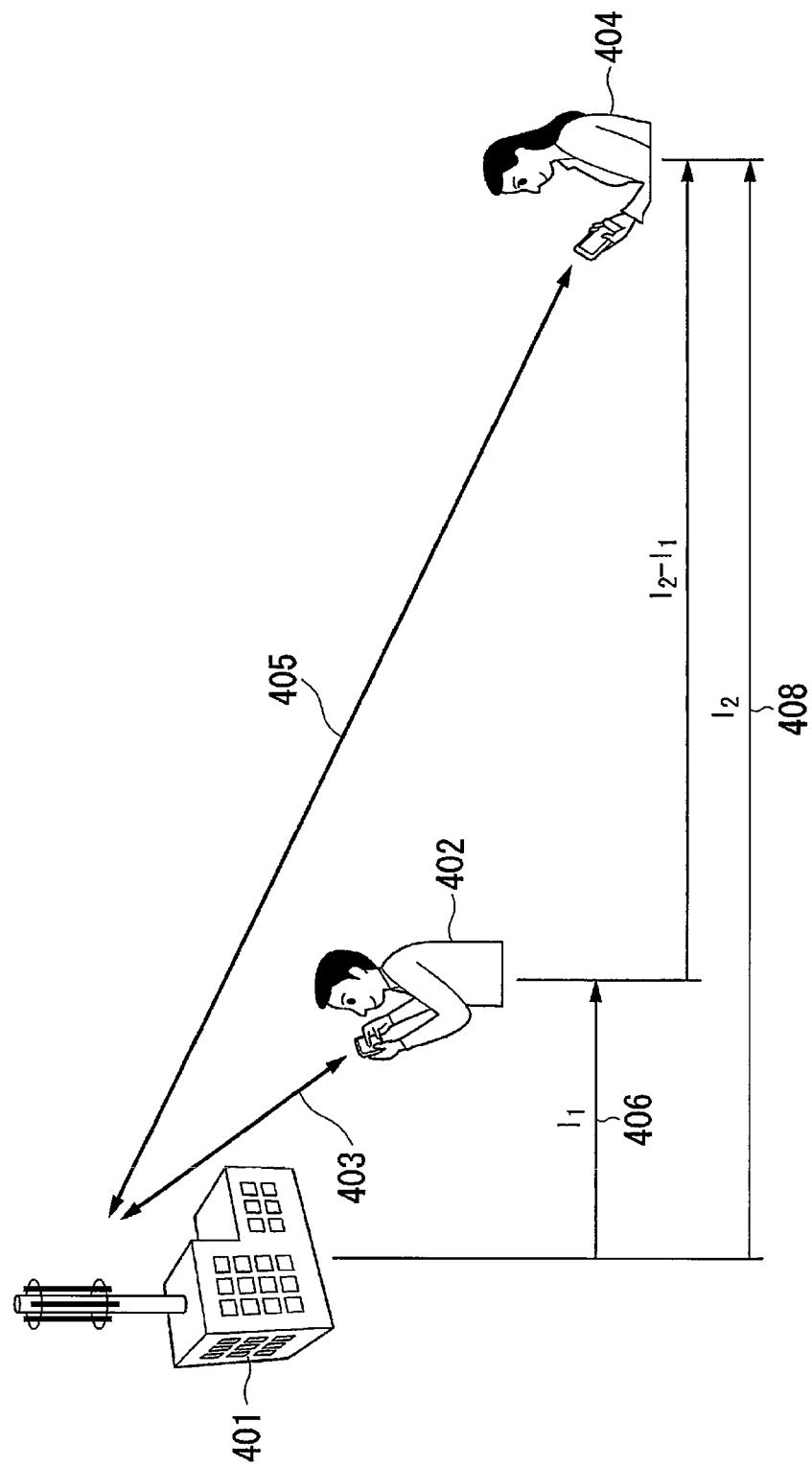
Figure 31:
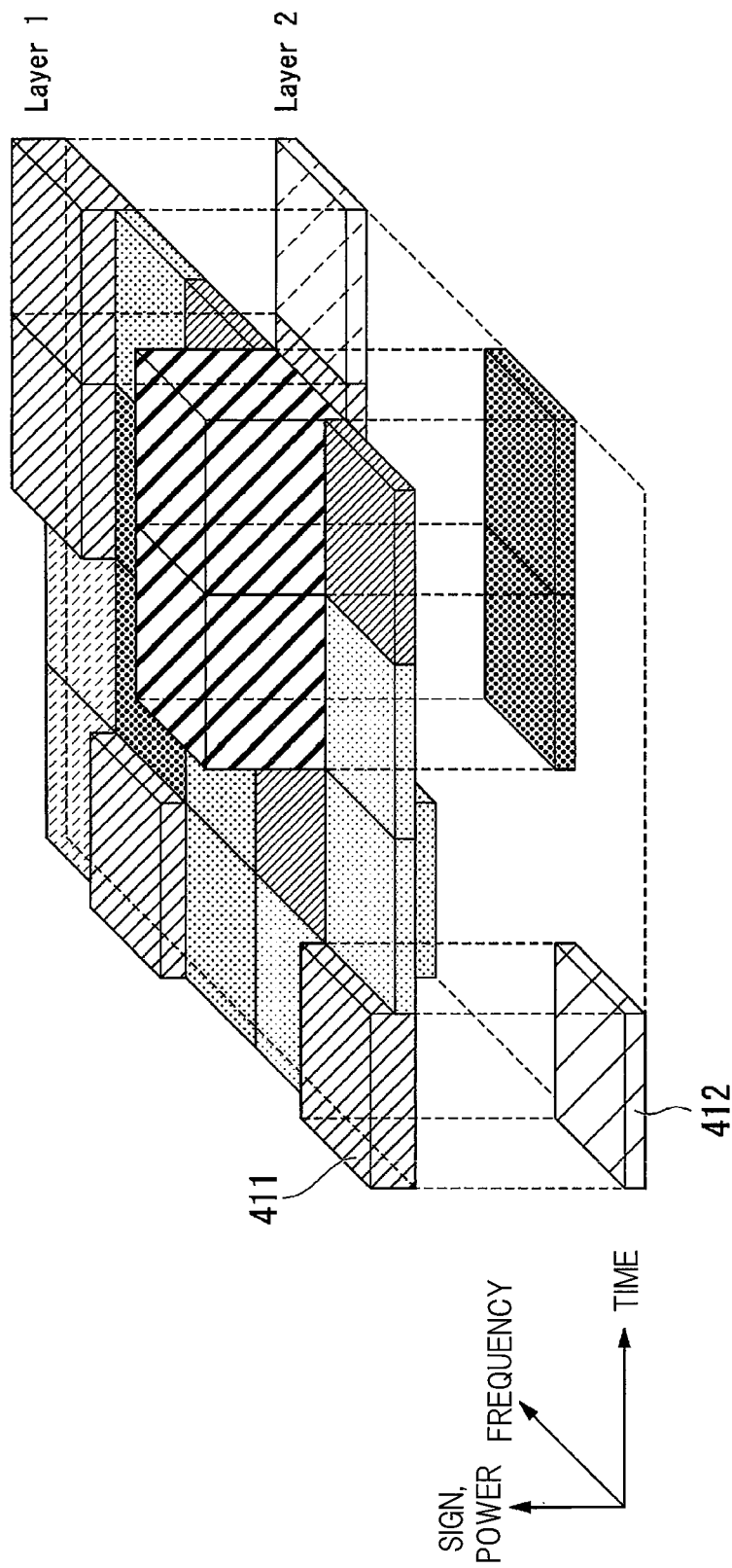
Figure 32:
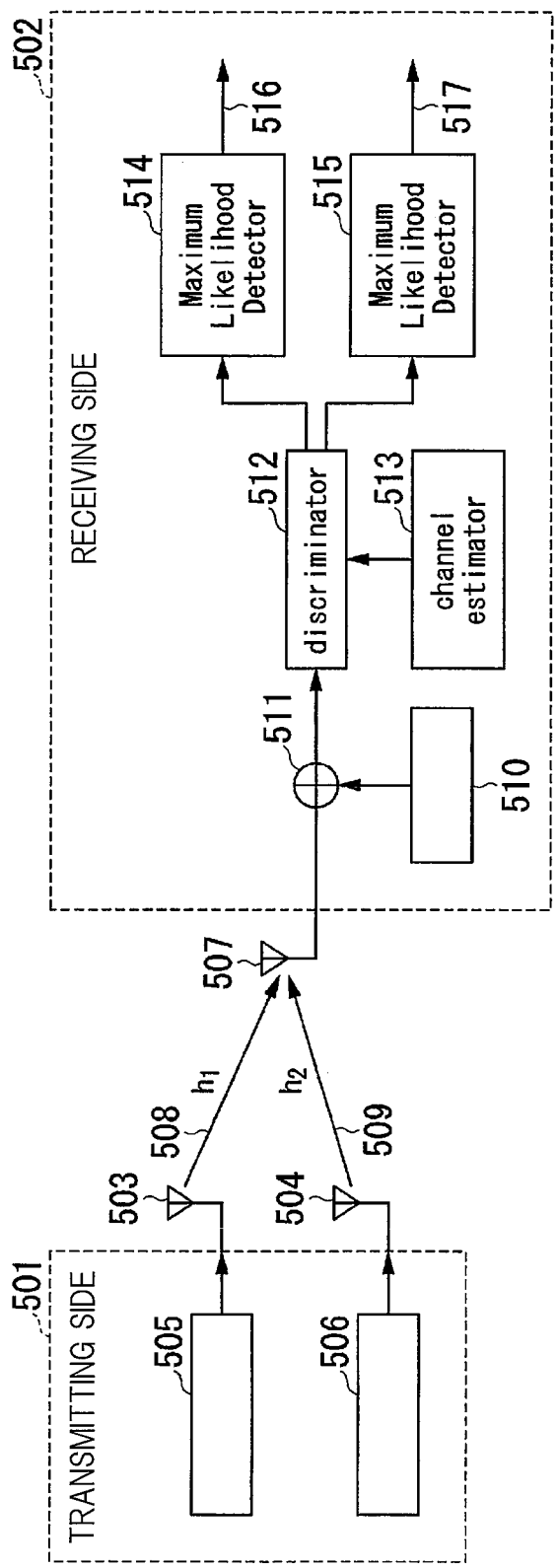
Figure 33:
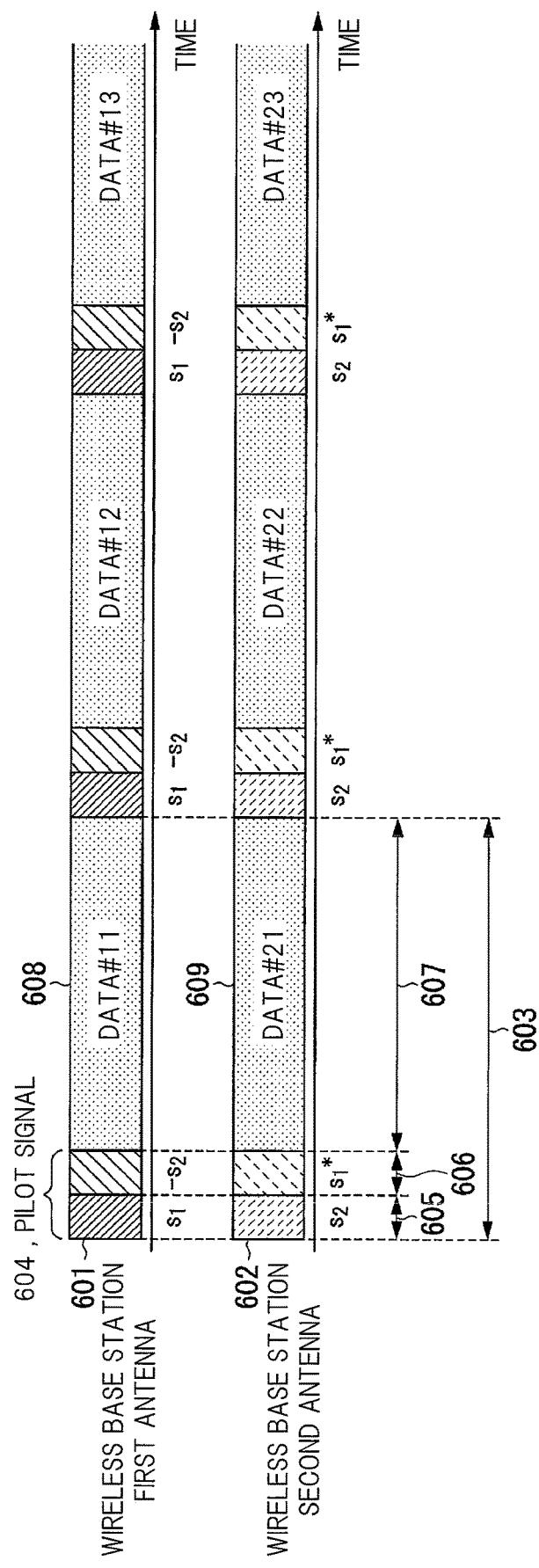
Figure 34:
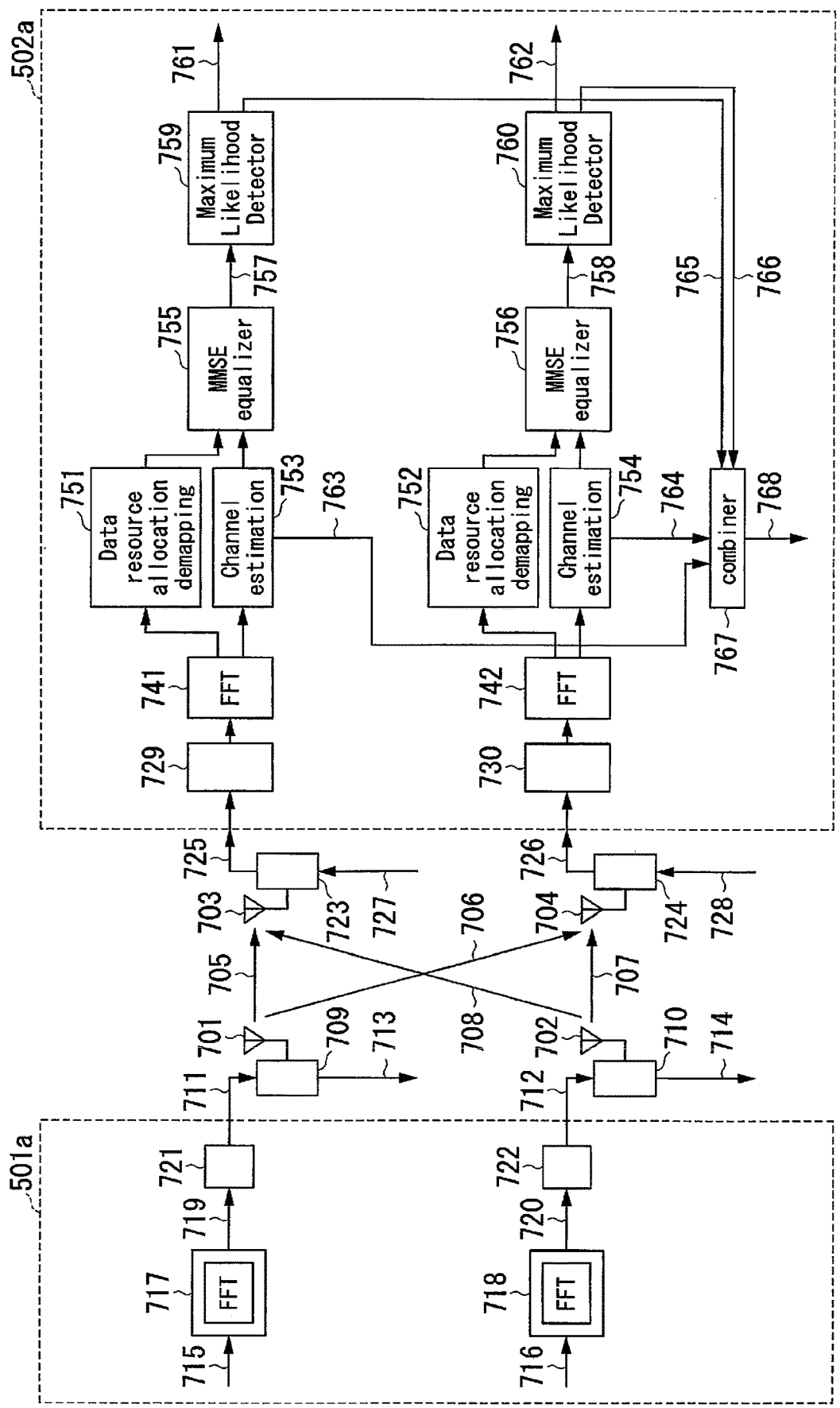
Figure 35:
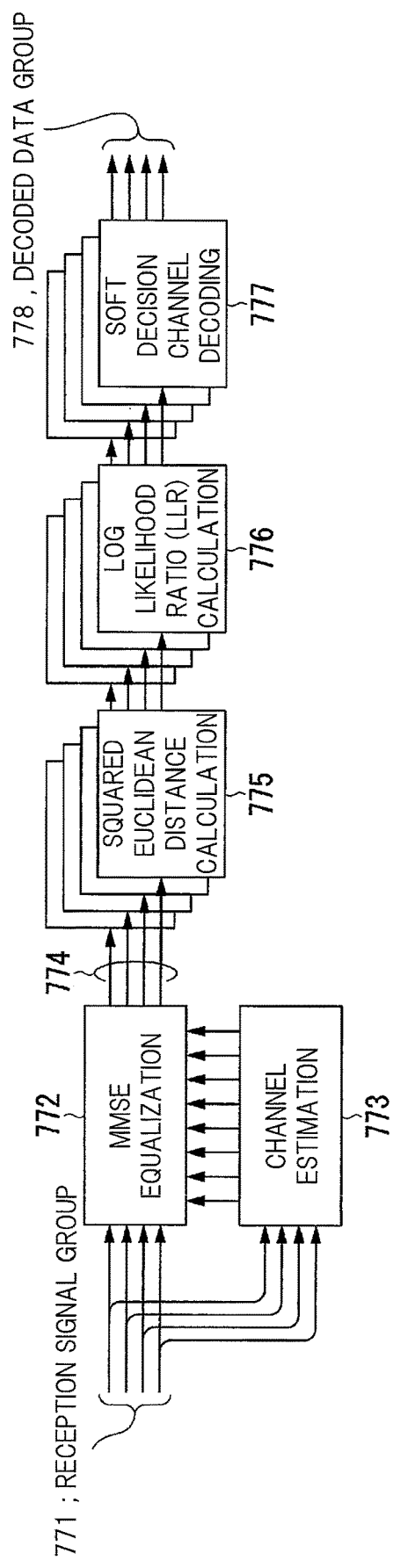

FIG. 19 is a diagram showing an example of a configuration of a FFT unit 41 and a correlation calculation unit 41f of a reception system 7 of a subscriber terminal;

FIG. 20 is a diagram showing an example of a concept of calculation for generating a resource block in the FFT unit 41 of the reception system 7 of the subscriber terminal;

FIG. 21 is an explanatory diagram of SRS for the propagation path characteristic measurement according to the frequency width of OFDMA;

FIG. 22 is a diagram showing an example of a configuration for generating SRS;

FIG. 23 is a diagram showing an example of a configuration of an OFDMA frame;

FIG. 24 is a diagram showing an example of a wireless communication system using three types of pseudo propagation path models;

FIG. 25 is a diagram showing an example of an OFDMA frame using three types of pseudo propagation path models;

FIG. 26A is a conceptual diagram of performing data transmission using three types of pseudo propagation path characteristics;

FIG. 26B is a sequence diagram showing an example of a process flow of the transmission/reception system S;

FIG. 27 is a diagram showing an outline of a conventional wireless communication;

FIG. 28 is a block diagram of a wireless access system of the fourth-generation mobile communication;

FIG. 29 is a diagram showing a resource block of the conventional OFDMA;

FIG. 30 is a diagram showing an example of NOMA of transmission power control type;

FIG. 31 is a diagram showing multilayering of a resource block of NOMA of transmission power control type;

FIG. 32 is a diagram for considering the possibility of multiplex communication in the form of 2×1 MISO in the MIMO scheme of the existing technology;

FIG. 33 is a diagram showing a communication frame in the MIMO communication;

FIG. 34 is a diagram showing a concept of LTE communication by the conventional 2×2 MIMO; and FIG. 35 is a diagram showing functions of a MMSE unit and a MLD unit in the LTE communication by the conventional MIMO.

DETAILED DESCRIPTION

Embodiments of a transmission/reception system according to the present invention will be described below with reference to the drawings. An object of the present invention is to improve the transmission rate in an OFDMA system. Specifically, it is to realize the multiplexing on a frequency in a resource block. The means thereof is to provide a plurality of pseudo propagation path characteristics that are approximate to the characteristics of the frequency domain of the resource block determined by the radio wave propagation path characteristics.

Figure 1:
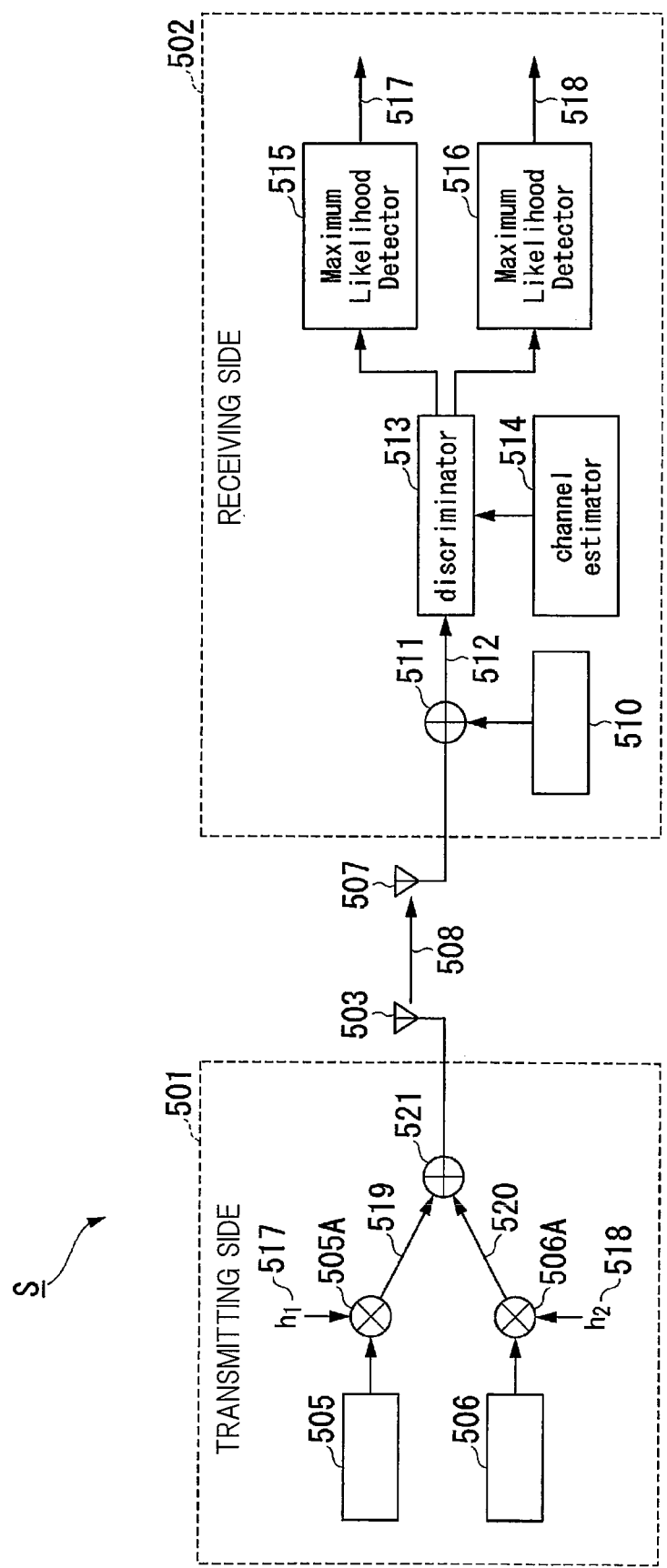
FIG. 1 is a diagram showing an example of a configuration of a transmission/reception system S according to the present invention.

At this time, the respective pseudo propagation path characteristics are generated so as to ensure low mutual correlation and reduce the degree of mutual interference. FIG. 1 is a diagram showing an example of a configuration of a transmission/reception system S according to the present invention. FIG. 1 is based on FIG. 32 used to describe the conventional MIMO scheme. In FIG. 1, the same names and reference characters (names may be changed as appropriate) are used for the same components as those in FIG. 32, and redundant description will be omitted as appropriate. The transmission/reception system S includes a transmitting side 501 (transmission device) and a receiving side 502 (reception device).

In FIG. 32, there are two antennas on a transmitting side, and two transmission systems are connected to the respective antennas. The wireless propagation paths 508 and 509 have radio wave propagation path characteristics $h_1$ and $h_2$, and these characteristics are superimposed on the transmission radio waves. In FIG. 32, by transmitting two types of pilot signals and the conjugate signals thereof in two slots, the propagation path characteristics $h_1$ and the propagation path characteristics $h_2$ are decoded on the receiving side and are used as the separating means from the interference in the subsequent data communication.

In the transmission/reception system S of FIG. 1, the propagation path characteristics $h_1$ and the propagation path characteristics $h_2$ held on the transmitting side 501 are multiplied on the respective transmission outputs of the two systems, and the outputs are added to each other, whereby almost the same radio wave as that of FIG. 32 can be received on the receiving side even though there is only one antenna, and the transmission signals of the two systems can be separated and extracted with the use of the propagation path characteristics $h_1$ and the propagation path characteristics $h_2$ identified in advance.

Also in FIG. 32, the propagation path characteristics $h_1$ and the propagation path characteristics $h_2$ are basically measured by the reception system, but it is premised that large change does not occur in the numerical value in a short time, and if this state is utilized, it is possible to generate pseudo propagation path characteristics pursuant to the actual propagation path characteristics $h_1$ and propagation path characteristics $h_2$ and to transmit the transmission signals of two systems at the same time with the use of the pseudo propagation path characteristics. Now, when the transmission data and quadrature modulation in one symbol section are represented by equation, equation (18) is obtained.

$$y(\omega_c, t) = v(t=t_1) e^{a+j(\omega_c t + \theta)} \tag{18}$$

Here, $\omega_c$: carrier wave frequency, t: time, $\theta$: phase, $y(\omega_c, t)$: transmission wave signal, $v(t=t_1)$: transmission symbol signal at time $t_1$, and a: carrier wave amplitude.

When the symbol signal is constant in the symbol section, it can be expressed as follows.

$$y(\omega_c, t) = e^{b+j(\omega_c t + \theta)} \tag{19}$$

The radio wave propagation path characteristics $\Gamma_t(\omega_c,t)$ can also be represented as follows if expressed in polar coordinates.

$$\Gamma_t(\omega_c,t)=e^{c+j\theta_t} \quad (20)$$

Here, c: propagation attenuation and $\theta_t$: propagation path phase change. Since the reception wave reaching the receiving antenna has the synergistic result of these, equation (21) is obtained.

$$r_{t=t1}(\omega_c,t)=e^{b+j(\omega_c t+\theta)}e^{c+j\theta_t} \quad (21)$$

When this reception wave is multiplied by the reciprocal of the propagation path characteristics, equation (22) is obtained, and the transmitted wave on the transmitting side can be reproduced.

$$r_{t=t1}(\omega_c, t) \times \frac{1}{h_1} = e^{b+j(\omega_c t+\theta)}e^{c+j\theta_t} \times \frac{1}{e^{c+j\theta_t}} = e^{b+j(\omega_c t+\theta)} = y(\omega_c, \theta) \quad (22)$$

Further, by multiplying the carrier wave signal by the FFT, equation (23) is obtained.

$$y(\omega_c,t) \times e^{-j\omega_c t}=e^{b+j(\omega_c t+\theta)} \times e^{-j\omega_c t}=e^{b+j\theta}=v(t=t_1)e^{a+j\theta} \quad (23)$$

Here, if $e^a=A$ is set, $e^{a+j\theta}$ is then $e^{a+j\theta}=A(\cos\theta+j\sin\theta)$, and it indicates the wave by the amplitude A and the phase $\theta$ on the orthogonal plane of quadrature detection.

Figure 2A:
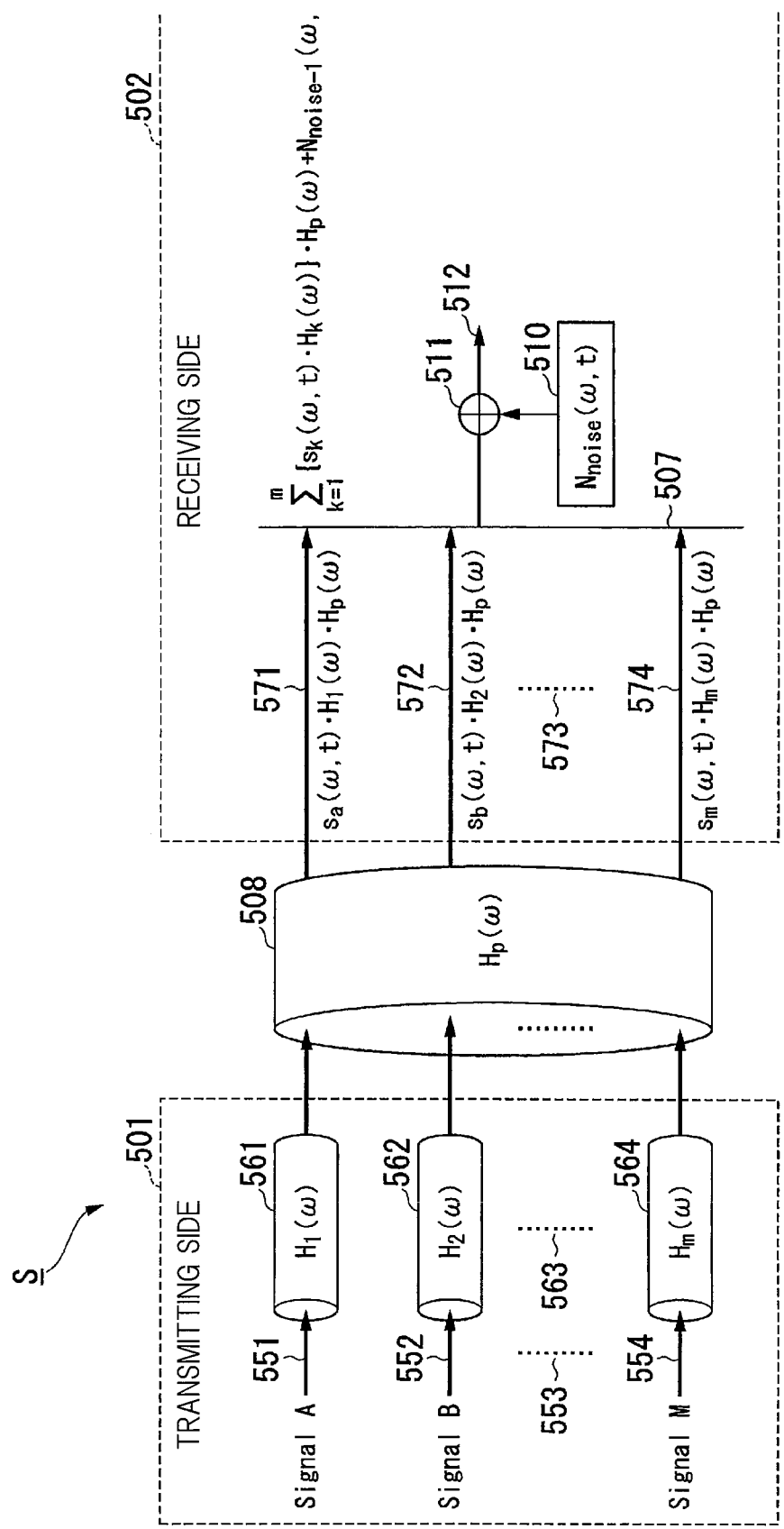
FIG. 2A is a diagram in which M independent signals are transmitted on a single frequency with the use of a plurality of (M) pieces of pseudo propagation path characteristic information.
Figure 2B:
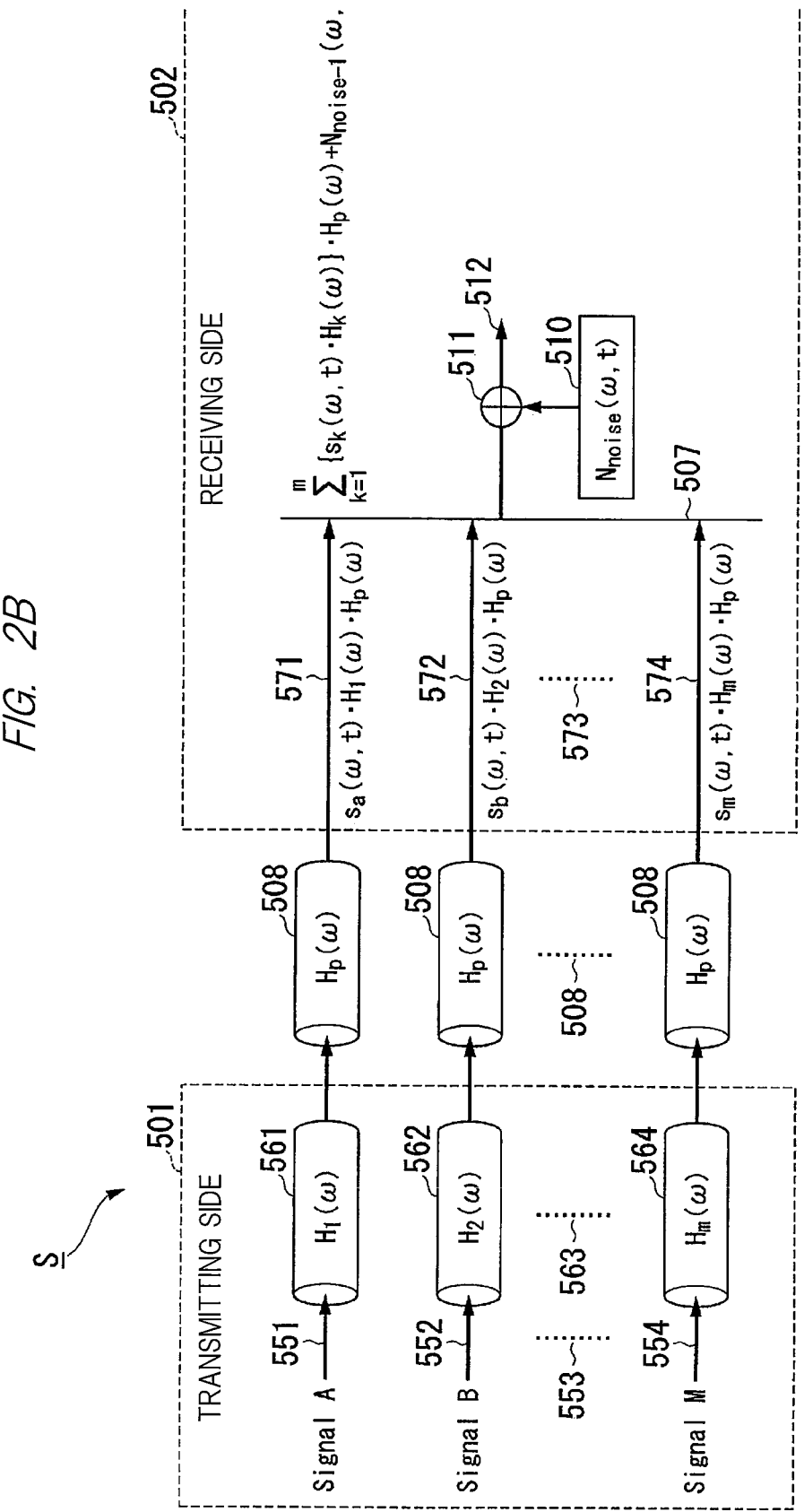
FIG. 2B is a diagram in which M independent signals are transmitted on a single frequency with the use of a plurality of (M) pieces of pseudo propagation path characteristic information.

In FIG. 2A, FIG. 2B, and FIG. 2C (hereinafter, collectively referred to also as FIG. 2), the fact that a plurality of (M) data can be transmitted by preparing a plurality of (M) pseudo propagation path characteristics based on the above idea is represented by mathematical expressions.

As shown in FIGS. 1 and 2, on the transmitting side 501, a carrier processing unit 505A superimposes pseudo propagation path characteristic information 561 indicated by $H_1(\omega)$ on a first transmission signal 551. In parallel, a carrier processing unit 506A superimposes pseudo propagation path characteristic information 562 indicated by $H_2(\omega)$ on a second transmission signal 552. A synthesizer 521 synthesizes an output of the carrier processing unit 505A and an output of the carrier processing unit 506A. The synthesized transmission signal is sent from the transmitting side antenna 503 to the wireless propagation path 508.

The wireless propagation path 508 is a path through which signals propagate between the transmitting side antenna 503 and the receiving side antenna 507. The propagation path characteristics of the wireless propagation path 508 are represented by $H_p(\omega)$. The characteristics of the first transmission signal 551 after modulation are defined as $s_1(\omega,t)$, and the characteristics of the second transmission signal 552 after modulation are defined as $s_2(\omega,t)$. When the respective signals input to the antenna 507 on the receiving side 502 are represented by mathematical expressions, the first transmission signal 551 becomes expression (24) because it is affected by the propagation path characteristics $H_p(\omega)$.

$$s_a(\omega,t)H_1(\omega)H_p(\omega) \quad (24)$$

Since the pseudo propagation path characteristics $H_1(\omega)$ and the wireless propagation path characteristics $H_p(\omega)$ can be synthesized as the frequency characteristics, they can be represented by equation (25).

$$H_1(\omega)H_p(\omega)=H_{p1}(\omega) \quad (25)$$

When expression (24) is represented by using the synthesized propagation path characteristics $H_{p1}(\omega)$, equation (26) is obtained.

$$s_a(\omega,t)H_1(\omega)H_p(\omega)=s_a(\omega,t)H_{p1}(\omega) \quad (26)$$

According to equation (26), it is possible to treat as if the transmission signal $s_1(\omega,t)$ passes through the wireless propagation path characteristics $H_{p1}(\omega)$.

However, when the frequency characteristics of the pseudo propagation path characteristics $H_1(\omega)$ and the wireless propagation path characteristics $H_p(\omega)$ are not approximate to each other, $H_{p1}(\omega)$ which is the result of equation (26) exhibits poor spectrum, and poses a problem for the communication in the frequency band given to the resource block. Therefore, when generating the pseudo propagation path characteristics, the pseudo propagation path characteristics similar to the actual propagation path characteristics are generated. The same can be applied to the second transmission signal $s_2(\omega,t)$, and when the synthesized propagation path characteristics are represented by $H_{p2}(\omega)$, equation (27) is obtained.

$$s_b(\omega,t)H_2(\omega)H_p(\omega)=s_b(\omega,t)H_{p2}(\omega) \quad (27)$$

Since the reception circuit is single in the subscriber terminal 502, the noise to be mixed is also only one type, and when this noise is represented by $N_{noise}(\omega,t)$, the signal $r(\omega,t)$ in the reception circuit can be represented by following equation (28).

$$r(\omega,t)=s_a(\omega,t)H_1(\omega)H_p(\omega)+s_b(\omega,t)H_2(\omega)H_p(\omega)+N_{noise}(\omega,t) \quad (28)$$

Equation (28) indicates that different information data can be independently transmitted through a plurality of propagation paths even though there is only one system of the wireless propagation path in this application. FIG. 2B physically represents equation (28).

Furthermore, when the respective propagation characteristics of equation (28) are synthesized, equation (28a) is obtained.

$$\begin{aligned}r(\omega, t) &= s_o(\omega, t)H_1(\omega)H_p(\omega) + \\ &\quad s_b(\omega, t)H_2(\omega)H_p(\omega) + N_{noise}(\omega, t) \\ &= s_a(\omega, t)H_{p1}(\omega) + s_b(\omega, t)H_{p2}(\omega) + N_{noise}(\omega, t)\end{aligned} \quad (28a)$$

FIG. 2C physically represents equation (28a). FIG. 2C shows the possibility that independent information is transmitted and received as if a plurality of wireless propagation paths having propagation path characteristics that are independent of each other are used according to the idea of this application.

Equation (29) below indicates that, based on this idea, when m different pseudo propagation path characteristics $H_k(\omega)$: k=1, ..., m can be provided, a plurality of (m) pieces of independent transmission information can be sent through a single wireless propagation path with the use of the synthesized propagation path characteristics $H_{pk}(\omega)$: k=1, ..., m.

$$r(\omega, t) = \sum_{k=1}^{M} \{s_k(\omega, t)H_k(\omega)\} \cdot H_p(\omega) + N_{noise}(\omega, t) = \quad (29)$$

$$\sum_{k=1}^{M} \{s_k(\omega, t) H_{pk}(\omega)\} + N_{noise}(\omega, t)$$

From the above, it is apparent that if a plurality of pseudo propagation path characteristics can be prepared, a plurality of transmission signals can be simultaneously transmitted without providing a plurality of spatial propagation paths. In order to realize it, it is necessary to embody the function construction of the transmission system and the reception system and the method of generating the pseudo propagation path characteristic data. Specific methods and means will be shown below as a plurality of embodiments.

Figure 3:
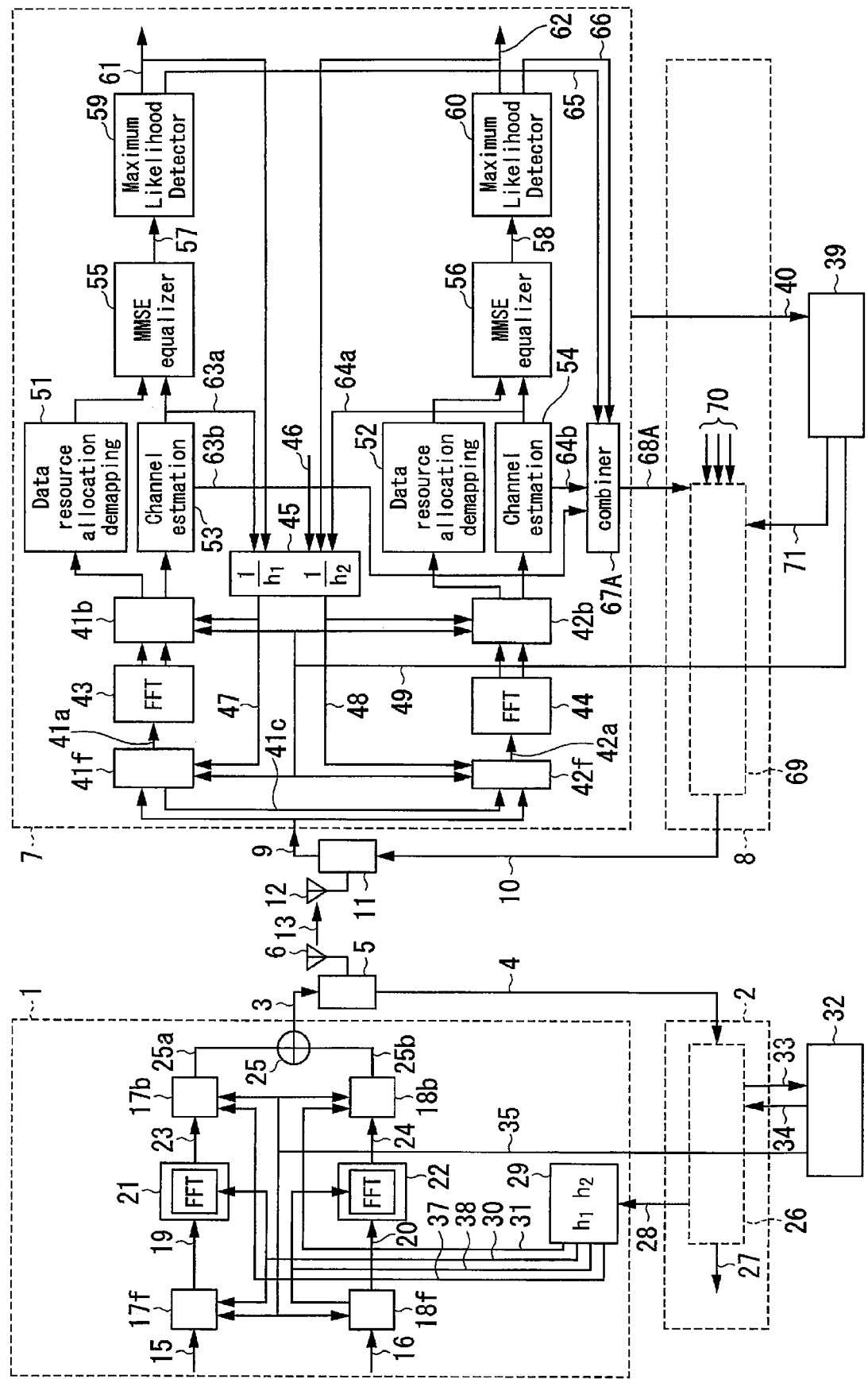
FIG. 3 is a diagram showing an example of a detailed configuration of the transmission/reception system S according to the present invention.

In FIG. 3, 1 denotes a transmission system of a wireless base station, 2 denotes a reception system of the wireless base station, 3 denotes an output signal of the wireless base station transmission system 1, 4 denotes an input signal to the wireless base station reception system, 5 denotes a connection management unit between the output signal 3 of the wireless base station transmission system and an antenna of the input signal 4 of the wireless base station reception system, and 6 denotes an antenna of the wireless base station connected to the connection management unit 5.

Further, in FIG. 3, 7 denotes a reception system of a subscriber terminal, 8 denotes a transmission system of the subscriber terminal, 9 denotes an input signal of the subscriber terminal reception system 7, 10 denotes an output signal of the subscriber terminal transmission system 8, 11 denotes a connection management unit between the input signal 9 of the subscriber terminal reception system and an antenna of the transmission signal 10 of the subscriber terminal transmission system, and 12 denotes an antenna of the subscriber terminal connected to the connection management unit 11.

13 denotes a wireless propagation path between the wireless base station antenna 6 and the subscriber terminal antenna 12. In the wireless base station transmission system 1, 15 denotes first transmission information. 16 denotes second transmission information. 17f denotes a carrier processing unit in a frequency domain based on a first pseudo propagation path parameter, and 18f denotes a carrier processing unit in a frequency domain based on a second pseudo propagation path parameter. 21 denotes a first modulation circuit, and 22 denotes a second modulation circuit. 23 denotes an output of the first modulation circuit 21. 24 denotes an output of the second modulation circuit 22.

17b denotes a carrier processing unit in a time domain based on the first pseudo propagation path parameter. 18b denotes a carrier processing unit in a time domain based on the second pseudo propagation path parameter. 25a denotes an output of the carrier processing unit 17b in the time domain based on the first pseudo propagation path parameter. 25b denotes an output of the carrier processing unit 18b in the time domain based on the second pseudo propagation path parameter. 25 denotes addition of the output 25a and the output 25b.

26 denotes a reception circuit of the wireless base station reception system 2. 27 denotes a first output of the base station reception unit 26. 28 denotes wireless propagation path information of a second output of the base station reception unit 26. 29 denotes a propagation path parameter management unit. 30 denotes a first pseudo propagation path parameter $h_1$ and a control signal from the propagation path parameter management unit 29. 31 denotes a second pseudo propagation path parameter $h_2$ and a control signal from the propagation path parameter management unit 29. 32 denotes a scheduler of the wireless base station. 33 denotes a frame reference signal from the base station reception unit 26. 34 denotes a signal processing timing signal to the base station reception unit 26. 35 denotes a signal processing timing signal to the first modulation circuit 21 based on the first pseudo propagation path parameter and the second modulation circuit 22 based on the second pseudo propagation path parameter.

In the subscriber terminal reception system 7, 9 denotes a reception signal. 10 denotes a transmission signal. 11 denotes a control unit that switches between the reception signal 9 and the transmission signal 10. 12 denotes an antenna of the subscriber terminal. 13 denotes a radio wave propagation path between the wireless base station antenna 6 and the subscriber terminal antenna 12. 37 denotes a resource allocation control signal to the first FFT unit 21 output from the propagation path parameter management unit 29. Similarly, 38 denotes a resource allocation control signal to the second FFT unit 22 output from the propagation path parameter management unit 29.

39 denotes a scheduler of the subscriber terminal. 40 denotes a timing signal from the subscriber terminal reception system 7 to the subscriber terminal scheduler 39. 41f denotes a correlation calculation unit in a first time domain that receives the input signal 9 of the subscriber terminal reception system. 42f denotes a correlation calculation unit in a second time domain that receives the input signal 9 of the subscriber terminal reception system. 43 denotes a first FFT unit that receives an output 41a of the correlation calculation unit 41f in the first time domain.

44 denotes a second FFT unit that receives an output 42a of the correlation calculation unit 42f in the second time domain. 41b denotes a correlation calculation unit in a first frequency domain. 42b denotes a correlation calculation unit in a second frequency domain. 41c denotes means for providing a part of the output of the correlation calculation unit 41f in the first time domain to the correlation calculation unit 42f in the second time domain. 45 denotes a management unit of pseudo propagation path characteristics. 46 denotes a control signal group. 47 denotes a signal path for supplying first pseudo propagation path characteristics to the first correlation calculation unit 41f. 48 denotes a signal path for supplying second pseudo propagation path characteristics to the second correlation calculation unit 42b. 49 denotes a timing signal from the subscriber terminal scheduler 39.

50 denotes a second FFT (fast Fourier transform) that receives a subscriber transmission unit extraction output 48 from the subscriber terminal scheduler 39. 51 denotes a signal extraction unit from a first resource block that receives a first output of a first FFT 49. 52 denotes a signal extraction unit from a second resource block that receives a first output of the second FFT 50. 53 denotes a first propagation path characteristic estimation unit that receives a second output of the first FFT 49. 54 denotes a second propagation path characteristic estimation unit that receives a second output of the second FFT 50.

55 denotes a first MMSE (Minimum Mean Square Error) error correction unit. 56 denotes a second MMSE (Minimum Mean Square Error) error correction unit. 57 denotes a corrected output of the first MMSE error correction unit 55. 58 denotes a corrected output of the second MMSE error correction unit 55. 59 denotes a first maximum likelihood estimation unit that obtains the corrected output 57 of the first MMSE error correction unit 55 and reproduces the first transmission information 15. 60 denotes a second maximum likelihood estimation unit that obtains the corrected output 58 of the second MMSE error correction unit 56 and reproduces the second transmission information 16.

61 denotes an output of the first maximum likelihood estimation unit 59. 62 denotes an output of the second maximum likelihood estimation unit 60. 63a and 63b denote first actual propagation path characteristic estimation information. 64a and 64b denote second actual propagation path characteristic estimation information. 65 denotes first equalized propagation path characteristics obtained by the first maximum likelihood estimation unit 59. 66 denotes second equalized propagation path characteristics obtained by the second maximum likelihood estimation unit 60.

67A denotes an information combining unit that receives the actual propagation path characteristic estimation information 63b and 64b and the equalized propagation path characteristics 65 and 66 as inputs. 68A denotes an output of the information combining unit 67A. 69 denotes a transmission unit of the subscriber terminal. 70 denotes a transmission signal group of the subscriber terminal transmission unit 69. 71 denotes a timing signal from the subscriber terminal scheduler 39 to the subscriber terminal transmission unit 69. In FIG. 3, the high frequency unit is omitted in both the transmission system and the reception system.

The operation of the first embodiment of this application in FIG. 3 will be described. Since most of FIG. 3 is the same as the current OFDMA system, operations other than the purpose of this application will be omitted. In the wireless base station transmission system 1, the first transmission information 15 and the second transmission information 16 are respectively supplied to the carrier processing unit 17f in the first frequency domain and the carrier processing unit 18f in the second frequency domain of the transmission units of the two systems. When the pseudo propagation path characteristic information from the propagation path parameter management unit 29 instructs to perform the processing in the frequency domain, the carrier processing is performed here.

An output 19 of the carrier processing unit 17f and an output 20 of the carrier processing unit 18f are input to the first modulation circuit 21 and the second modulation circuit 22, respectively. At the same time, the propagation path parameter management unit 29 receives the wireless propagation path information 28 from the base station reception unit 26, appropriately selects suitable resource blocks based on the wireless propagation path information 28, generates the resource allocation control signals 37 and 38 and the pseudo propagation path characteristics $h_1$ and $h_2$, and then causes the first modulation circuit 21 and the second modulation circuit 22 to generate the resource blocks to be used.

The first modulation circuit 21 and the second modulation circuit 22 supply their outputs to the carrier processing unit 17b in the time domain based on the first pseudo propagation path parameter and the carrier processing unit 18b in the time domain based on the second pseudo propagation path parameter, respectively. The outputs 25a and 25b thereof are synthesized by the synthesizer 25 to be the transmission output 3 (transmission signal). The transmission output 3 is connected to the wireless propagation path 13 via the wireless base station antenna 6 and is received by the subscriber terminal antenna 12.

The reception signal 9 is input to the correlation calculation unit 41f in the first time domain and the correlation calculation unit 42f in the second time domain via the antenna connection management unit 11, and the desired carrier wave is taken out at this stage if the pseudo propagation path characteristic model is a time domain model. Whether or not the pseudo propagation path characteristic model is a time domain model is determined by an instruction from the pseudo propagation path characteristic management unit 45. The output 41a of the correlation calculation unit 41f in the first time domain and the output 42a of the correlation calculation unit 42f in the second time domain are transformed into frequency domain information by the first FFT unit 43 and the second FFT unit 44.

The modulation waves on the subcarrier group in the OFDM system are extracted here. The outputs of these two FFT units are input to the correlation calculation unit 41b in the first frequency domain and the correlation calculation unit 42b in the second frequency domain, and the desired carrier wave is taken out at the stage if the pseudo propagation path characteristic model is a frequency domain model. Whether or not the pseudo propagation path characteristic model is a frequency domain model is determined by an instruction from the pseudo propagation path characteristic management unit 45.

With these processes, the subsequent signal processing is the same as that of the reception system of the MIMO scheme shown in FIG. 34. The signals are sent to the first demapping unit 51 and the second demapping unit 52, and are demapped to be the first transmission information and the second transmission information although they are in a state of containing errors. The first transmission information and the second transmission information are subjected to the error correction by the first MMSE (Minimum Mean Square Error) error correction unit 55 and the second MMSE error correction unit 56 to be corrected outputs 57 and 58.

Further, the corrected outputs 57 and 58 are decoded by the first maximum likelihood estimation unit 59 and the second maximum likelihood estimation unit 60, respectively, to obtain the reception information output 61 and the reception information output 62 with less errors. The reception information output 61 and the reception information output 62 also include the wireless propagation path characteristic information obtained by receiving a pilot signal (Scattering Pilot signal) that specifies the wireless propagation path characteristics sent from the wireless base station 1, and they are provided to the pseudo propagation path characteristic management unit 45.

At the same time, the reception information output 61 and the reception information output 62 are sent to the information combining unit 67A, and the propagation path estimation information 63a and the propagation path estimation information 64a from the first propagation path characteristic estimator 53 and the second propagation path characteristic estimator 54 are combined to be the information 68A. The information 68A is supplied to the subscriber terminal transmission unit 69 and the transmission signal 10 is wirelessly transmitted from the subscriber terminal antenna 12 to the wireless base station antenna 6. As described above, the first propagation path characteristic estimator 53 and the second propagation path characteristic estimator 54 are configured to estimate the wireless propagation path characteristics obtained by the pilot signal (Scattering Pilot signal) emitted by the wireless base station transmission system 1. The first pseudo propagation path characteristics $h_1$ and the second pseudo propagation path characteristic $h_2$ used by the wireless base station transmission system 1 are generated by the propagation path parameter management unit 29 of the wireless base station transmission system 1.

Figure 4:
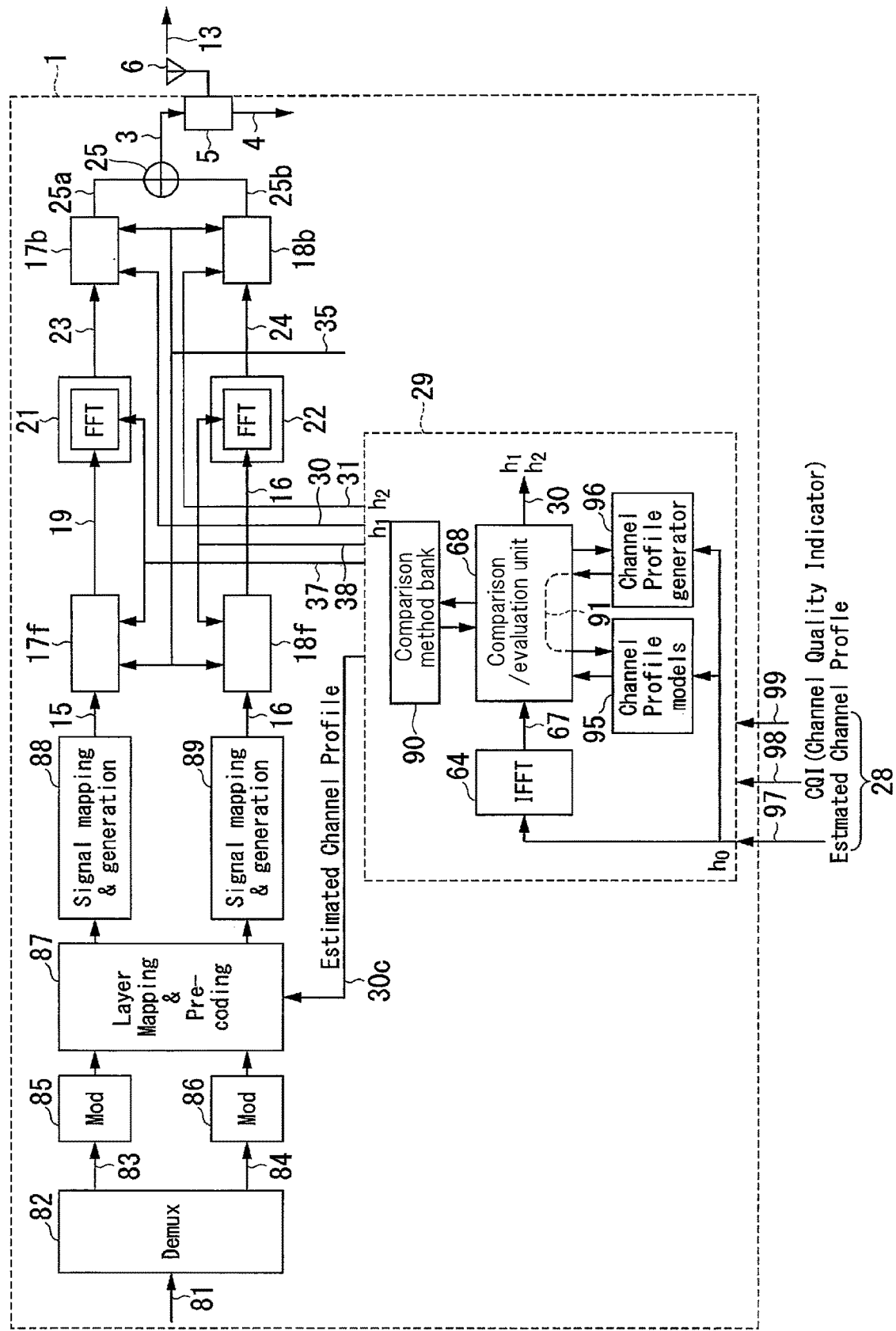
FIG. 4 is a diagram showing an example of a detailed configuration of a propagation path parameter management unit 29.

FIG. 4 is a diagram showing an example of a detailed configuration of the propagation path parameter management unit 29 of FIG. 3. In FIG. 4, the input 28 to the propagation path parameter management unit 29 that generates the delay profile information of FIG. 3 includes propagation path characteristic estimation information 97, channel quality indicator 98, and resource block selection information 99. The propagation path characteristic estimation information 97 becomes frequency characteristic data 67 via an IFFT unit 64. On the other hand, propagation path model information by a propagation path model selection unit 95 based on the propagation path characteristic estimation information 97 and propagation path model information by a new propagation path model generation unit 96 are transmitted to a comparison/evaluation unit 68.

The comparison/evaluation unit 68 selects the pseudo propagation path characteristics 30 required by the transmission system also with reference to the propagation path characteristic estimation information 97 from the reception system. The comparison/evaluation unit 68 selects appropriate pseudo propagation path characteristics 30 from a comparison method bank 90 based on the propagation state and service type. Pseudo propagation path characteristics 30a and 30b thus selected are supplied to the first modulation circuit 21 and the second modulation circuit 22. Further, propagation path characteristic estimation information (delay profile estimation information) 30c is supplied to a layer mapping unit 87 and used for selecting the resource block.

Figure 5:
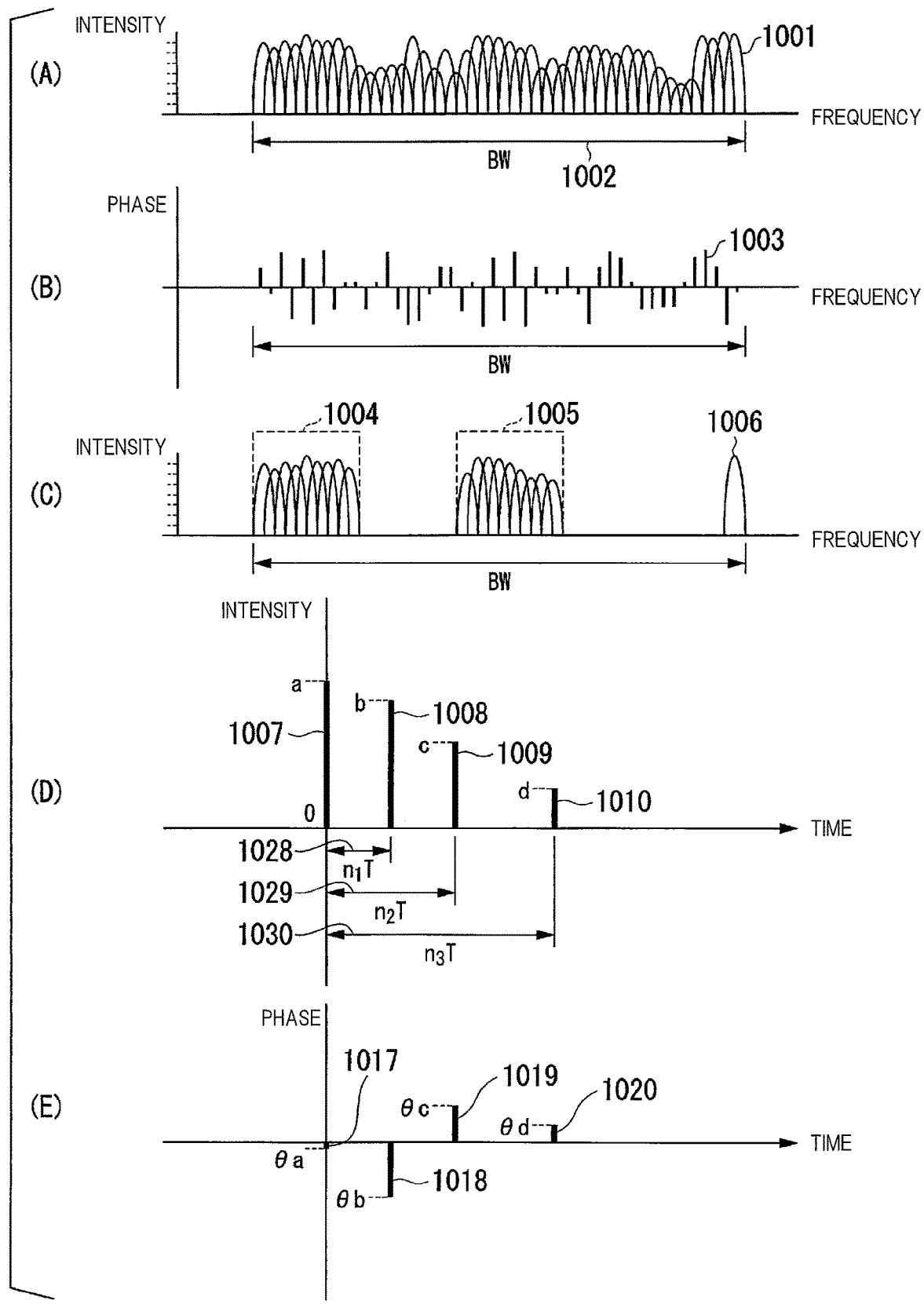
FIG. 5 is a diagram showing an example of a process of calculating pseudo propagation path characteristics.

In FIG. 5, the process of calculating (A) and (B) of FIG. 5 from the parameters of (C) of FIG. 5 is shown below. In the first embodiment of this application shown in FIG. 3, the first propagation path characteristic estimator 53 and the second propagation path characteristic estimator 54 obtain the frequency characteristics in a system band 1002 corresponding to the delay profile of the wireless propagation path 13 as shown by 1001 in FIG. 5(A) from the time-frequency transform action by the FFT units 43 and 44 placed on the former stage. Since the FFT units 43 and 44 perform the complex analysis, the wireless propagation path characteristics (phase-frequency characteristics) 1003 physically corresponding to FIG. 5(B) can be obtained. In the LTE system, the resource block 1004 or 1005 to be used by the subscriber terminal as shown in FIG. 5(C) is selected from the wireless propagation path characteristics.

A frequency component 1006 is a control signal (PUCCH) attached to an outer edge of the system band. In the first embodiment of this application shown in FIG. 3, these processes are performed in the FFT units 21 and 22 of the wireless base station transmission system 1 that have received the resource allocation control signals 37 and 38 from the propagation path parameter management unit 29 on the side of the wireless base station transmission system 1 that has obtained the wireless propagation path characteristic information learned by the subscriber terminal through the subscriber terminal transmission system 8.

When the IFFT processing is applied to these wireless propagation path characteristics 1001 and 1003, the delay profile characteristics shown by the intensity-time characteristics of FIG. 5(D) and the phase-time characteristics of FIG. 5(E) are obtained. In particular, the phase-time characteristics shown in FIG. 5(E) are important data for generating the pseudo propagation path model. Namely, if (A) and (B) in FIG. 5 are known, the propagation path parameter of the propagation path model orthogonal or with low mutual correlation can be obtained, and a new delay profile can be found by tracing back the above procedure.

In FIG. 5(D), 1007 denotes the first wave which arrives earliest and is usually a direct wave, and the intensity thereof is represented by a. 1008 which arrives next is the first delay wave and is usually the first reflected wave, and the intensity thereof is represented by b. 1009 which arrives next is the second delay wave and is usually the second reflected wave, and the intensity thereof is represented by c. 1010 which arrives next is the third delay wave and is usually the third reflected wave, and the intensity thereof is represented by d.

As to the delay time of each delay wave from the first wave, the first delay time 1028 is represented by $n_1 T$, the second delay time 1029 is represented by $n_2 T$, and the third delay time 1030 is represented by $n_3 T$. Here, $n_1$, $n_2$, and $n_3$ indicate integer values, and T indicates time resolution. The time resolution is given by the reciprocal of the system bandwidth as described later. Also, FIG. 5(E) shows the phase of the delay profile, the phase 1017 of the first wave is represented by θa, the phase 1018 of the first delay wave is represented by θb, the phase 1019 of the second delay wave is represented by θc, and the phase 1020 of the third delay wave is represented by θd. Now, the parameters of FIG. 5(D) are assumed as in the following equation (30), and are defined as the model 1.

$$\left.\begin{array}{l} a = 1 \\ b = 0.5 \\ c = 0.25 \\ d = e = 0 \\ n_1 T = T \\ n_2 T = 2T \\ n_3 T = n_4 T = 0 \end{array}\right\} \quad (30)$$

Figure 6:
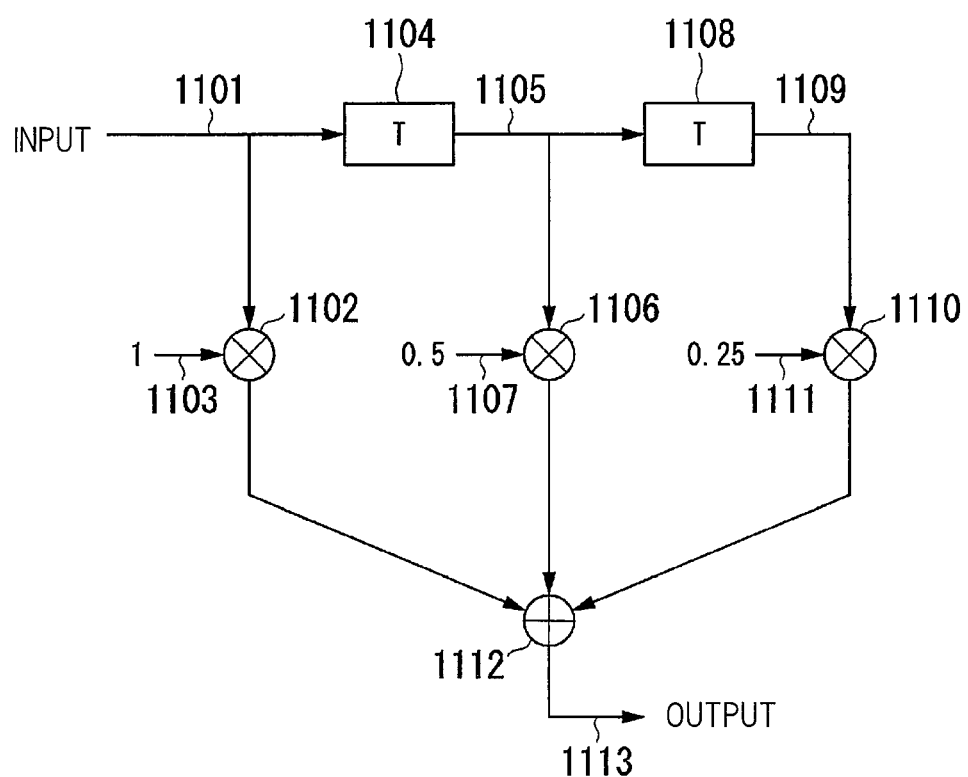
FIG. 6 is a diagram showing an example of a circuit which implements a process of equation (22)

At this time, FIG. 5(D) becomes the circuit of FIG. 6 in the form of FIR (finite impulse response) filter. This can be represented by the equation (31) using Z-transform.

In FIG. 6, an input 1101 is multiplied by a first coefficient input 1103 in a first multiplier 1102. At the same time, the input 1101 is delayed by a first delay device 1104 to be the first delay signal 1105, and the first delay signal 1105 is multiplied by a second coefficient input 1107 in a second multiplier 1106. At the same time, the first delay signal 1105 is delayed by a second delay device 1108 to be the second delay signal 1109, and the second delay signal 1109 is multiplied by a third coefficient input 1111 in a third multiplier 1110. The outputs of all multipliers are added by an adder 1112 to be an output 1113.

In the Z-transform equation (31), the first term represents the first wave, the second term represents the second wave, and the third term represents the third wave.

$$H(z) = 1 + \frac{1}{2z} + \frac{1}{4z^2} \quad (31)$$

However, H(z) is propagation path characteristic function, z is represented by equation (32), T is a unit delay time, and ω is an angular frequency.

$$z = e^{j\omega T} \quad (32)$$

FIG. 6 shows a filter corresponding to a pseudo propagation path that is applied in advance on the transmitting side. By transforming equation (31), equation (33) is obtained.

$$H(z) = 1 + 0.5z^{-1} + 0.25z^{-2} \qquad (33)$$

$$\therefore H(e^{j\omega T}) = \left(1 + \frac{-1+\sqrt{3}\,j}{4}e^{-j\omega T}\right)\left(1 + \frac{-1-\sqrt{3}\,j}{4}e^{-j\omega T}\right) =$$

$$1 + \frac{1}{4}e^{-j\omega T} + e^{-2j\omega T} =$$

$$1 + \frac{1}{4}\cos\omega T + \cos 2\omega T - j\left(\frac{1}{4}\sin\omega T + \sin 2\omega T\right)$$

$H(e^{j\omega T})$ as a complex space can be represented by the sum of the real part $R(\omega)$ and the imaginary part $X(\omega)$ as shown in equation (34).

$$H(e^{j\omega T}) = R(\omega) + jX(\omega) \qquad (34)$$

The real part $R(\omega)$ and the imaginary part $X(\omega)$ are equal to equation (35).

$$R(\omega) = 1 + \tfrac{1}{4}\cos\omega T + \cos 2\omega T$$

$$X(\omega) = -\tfrac{1}{4}\sin\omega T - \sin 2\omega T \qquad (35)$$

Figure 7:
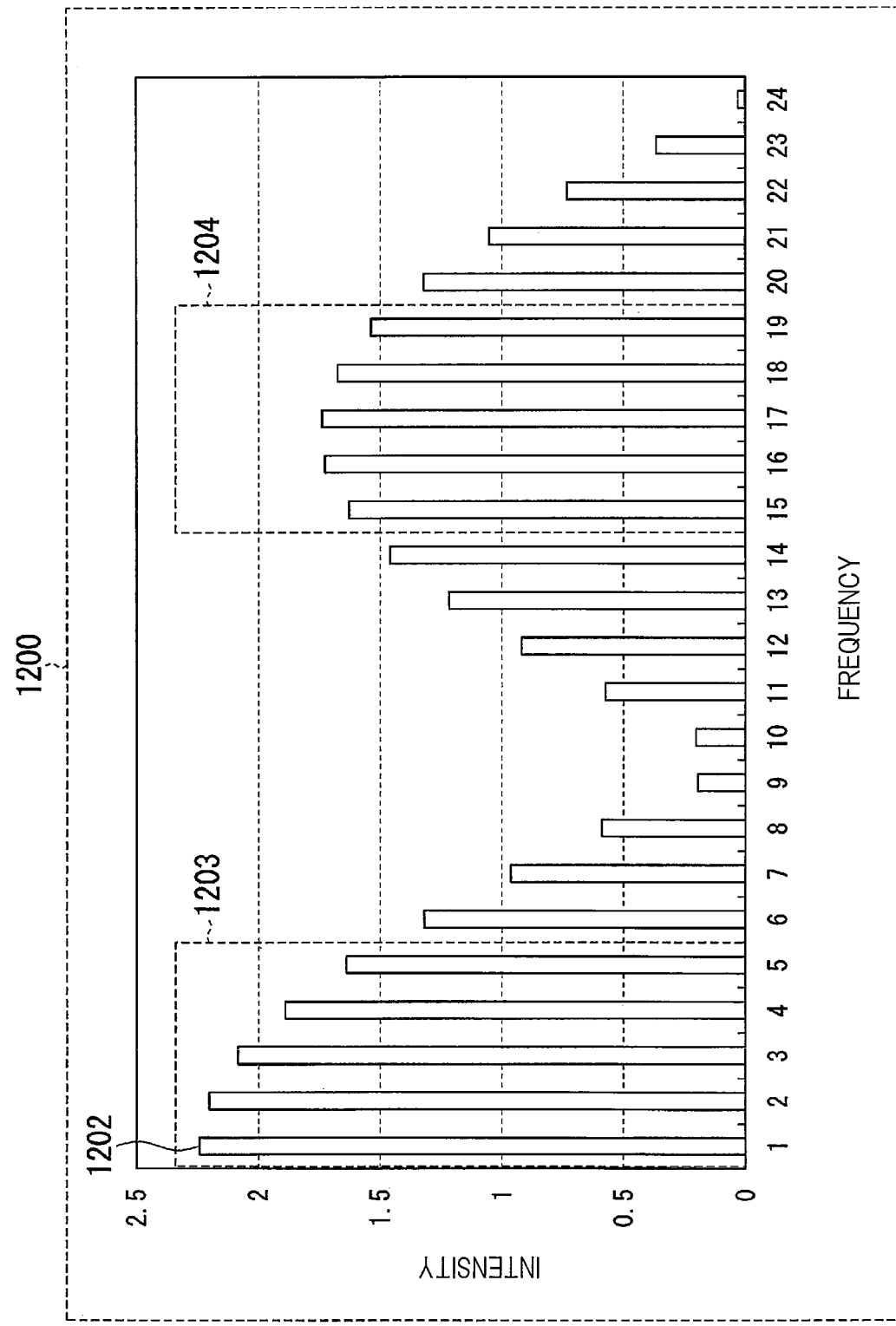
FIG. 7 is a diagram showing frequency characteristics of a spectral intensity on a frequency axis obtained from equation (37)

Equation (35) represents the spectral intensity and phase for each frequency component on the frequency axis and the time axis. FIG. 7 shows a graph of the spectral intensity on the frequency axis according to equation (35). In FIG. 7, 1200 denotes the entire propagation path characteristics, and intensity is represented by subcarriers 1202. The resource block selected based on the propagation path characteristics 1200 is depicted as 1203 or 1204.

Figure 8:
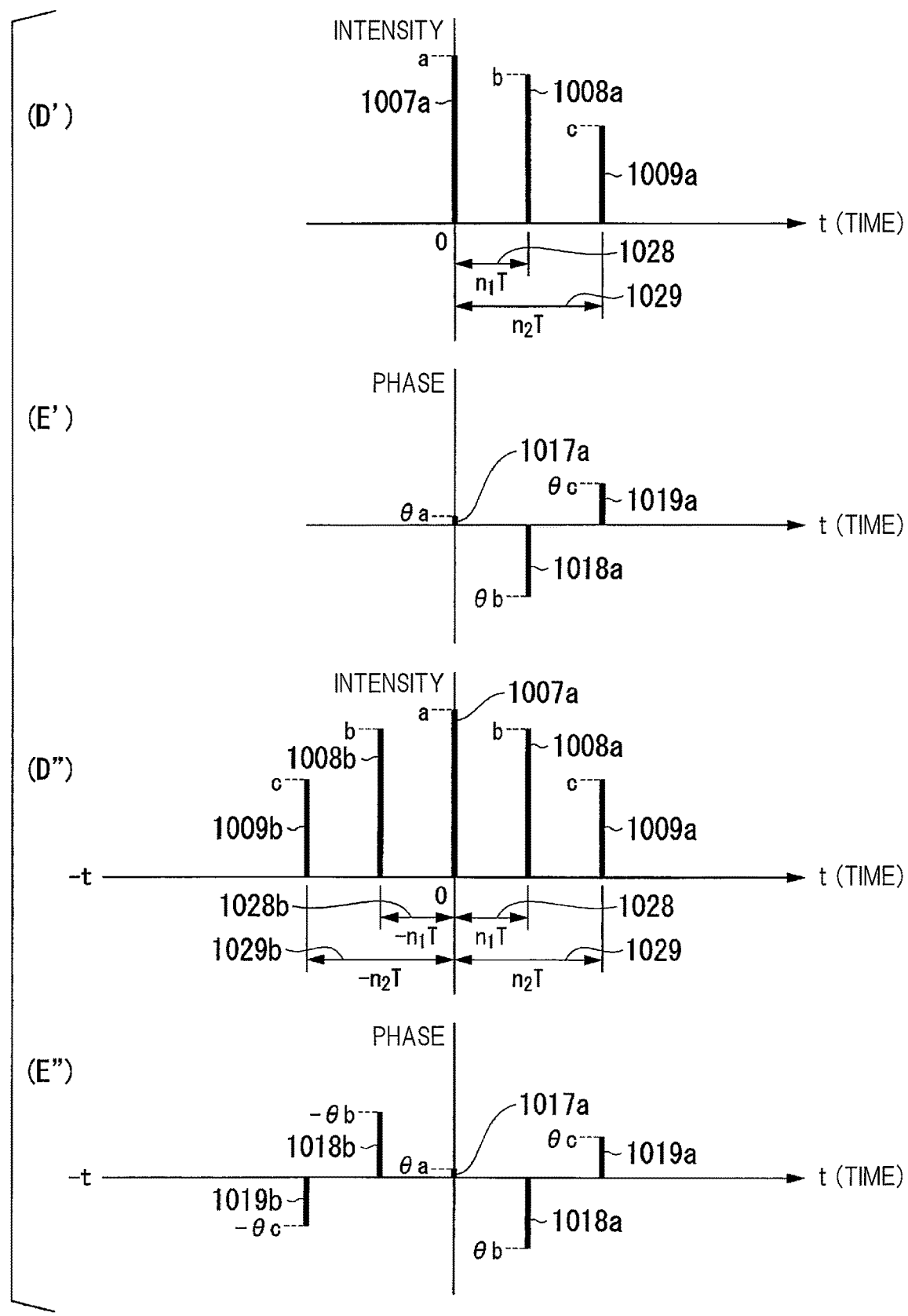
FIG. 8 is a diagram showing an example of calculating the pseudo propagation path characteristics.

An expression representing the phase characteristics appears in equation (35). This is a result of performing Z-transform by unilateral Z-transform. Originally, the unilateral Z-transform is expressed by positive and negative time axes in the form of taking the bilateral Z-transform into account as shown in FIG. 8(D"). Note that (D') and (E') of FIG. 8 are obtained by applying the conditional equation (30) to (D) and (E) of FIG. 5. The reference numbers in FIG. 8 are the same as the reference numbers in FIG. 5, but are added with a suffix a for referring to the conditional equation (30).

The generation of the pseudo propagation path characteristics in this application is based on the concept of a configuration of a non-circular filter as shown in FIG. 6. The filter corresponding thereto is realized by the method of Z-transform. It is necessary to consider within a finite range on both the time axis and the frequency axis and the form of the filter is considered as the FIR type, but since the pole of the transfer function is generated at the origin in the FIR filter, it tends to have steep characteristics at the boundary of the range.

Therefore, both positive and negative sides are taken into account when considering FIG. 5(D) and FIG. 5(E). For other reasons, as will be described later, when the desired signal is extracted on the receiving side by the pseudo propagation path characteristics, the correlation calculation on the frequency axis is performed together with the equalization calculation. At this time, the absolute time that the unilateral Z-transform has cannot be applied. Therefore, the time difference is ensured by securing the time position information of the start position by the bilateral Z-transform. In addition, the bilateral Z-transform makes it possible to provide stable and complete linear-phase characteristics, and the even symmetry and odd symmetry of the characteristics become clear. In FIG. 8, FIG. 8(D') shows the unilateral Z-transform and FIG. 8(D") shows the bilateral Z-transform. FIG. 8(E') shows the phase characteristics in the unilateral Z-transform, and FIG. 8(E") shows the phase characteristics in the bilateral Z-transform.

The spectral intensity is shown in FIG. 8(D"), and the spectral phase is shown in FIG. 8(E"). As shown by equation (33), the spectral intensity is represented by a cosine wave and the polarity is the same in a positive part and a negative part on the axis, thus forming even symmetry. On the other hand, the imaginary part is represented by a sine wave and the polarity is inverted between a positive part and a negative part on the axis, thus forming odd symmetry. The phase angle θ is usually considered as arctangent (tan−1(sin θ)/(cos θ)). Therefore, the phase angle θ is odd symmetry.

In the diagram corresponding to the bilateral Z-transform shown in FIG. 8(D"), a first delay wave 1008b is shown with the intensity b and a second delay wave 1009b is shown with the intensity c in the even symmetry in the negative polarity region of the time t, and a negative first delay time 1028 between the first delay wave 1008b and the first wave is represented by $(-n_1 T)$ and a negative second delay time 1029 between the second delay wave 1009b and the first wave is represented by $(-n_2 T)$ as delay time. In the phase corresponding to the bilateral Z-transform shown in FIG. 8(E"), the first delay wave 1018b is shown with the phase (−θb) and the second delay wave 1019b is shown with the phase (−θc) in the odd symmetry in the negative polarity region of the time t.

In the actual environment, the rotation direction of each phase has its own direction. The direction is determined by the imaginary part of equation (35). Namely, the frequency component with positive phase in the positive region and negative phase in the negative region on the frequency axis rotates counterclockwise in the complex space, and the frequency component with negative phase in the positive region and positive phase in the negative region on the frequency axis rotates clockwise in the complex space. In one model, if the phase polarity is reversed in the positive and negative directions on the frequency axis, the phase rotations are all reversed. At this time, the frequency characteristics and the delay profile are the same, but the correlation is significantly reduced. As a result, it is possible to remove interference from other signals by the maximum likelihood detector (MLD) of the reception unit and extract the desired signal.

By adopting the values of the spectral intensity parameter of FIG. 8(D") to the previous example, the Z-transform equation becomes following equation (36).

$$H_D(z) = 0.25z^2 + 0.5z + 1 + 0.5z^{-1} + 0.25z^{-2} \qquad (36)$$

$$\therefore H_D(e^{j\omega T}) = 0.25(e^{j2\omega T} + e^{-j2\omega T}) + 0.5(e^{j\omega T} + e^{-j\omega T}) + 1 =$$

$$1 + \cos\omega T + \frac{1}{2}\cos 2\omega T$$

Figure 9:
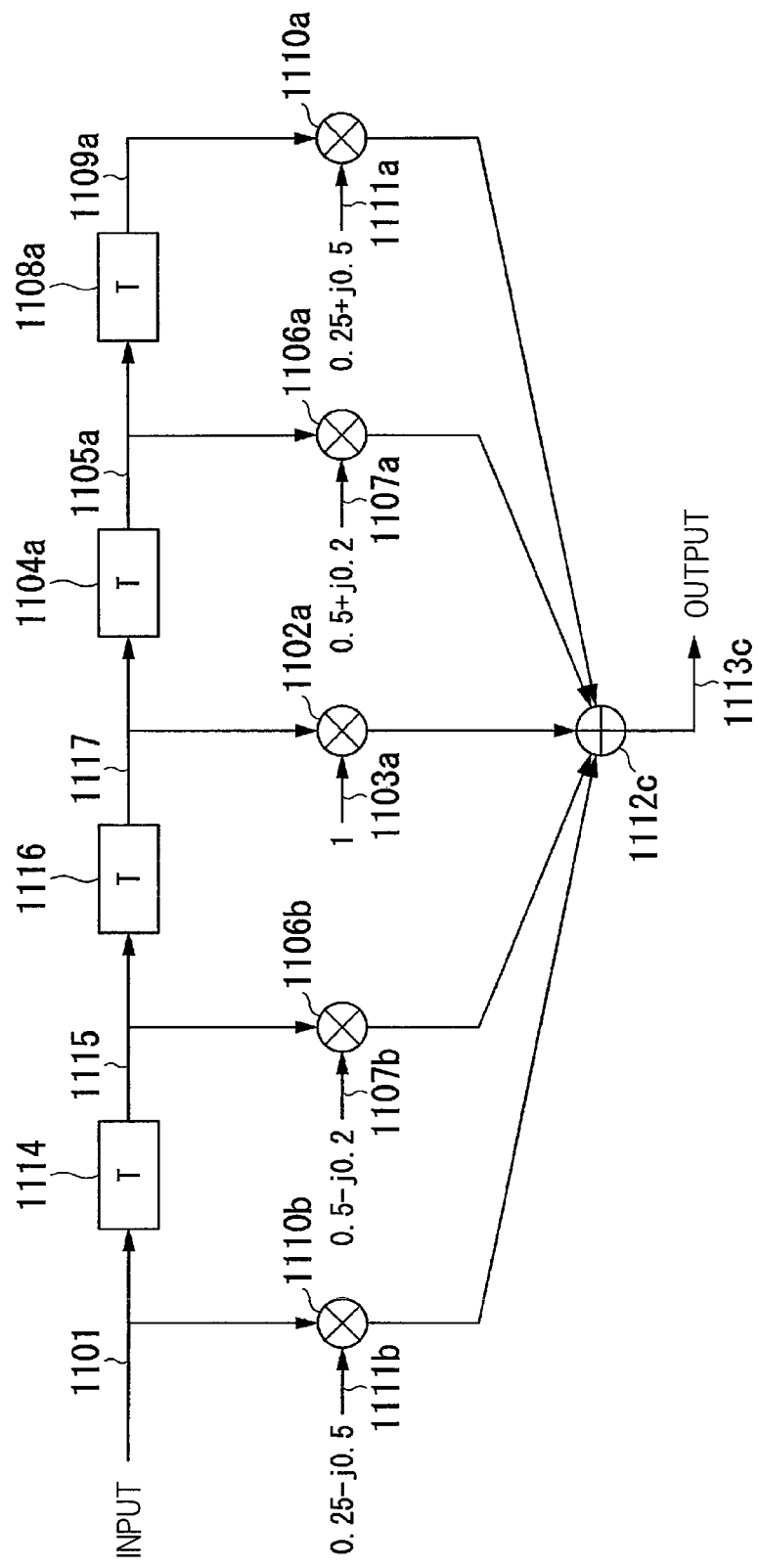
FIG. 9 is a diagram showing bilateral Z-transform replaced from FIG. 6 configured as unilateral Z-transform.

Specifically, FIG. 9 shows the bilateral Z-transform, and the characteristics are obtained and compared. FIG. 9 shows the bilateral Z-transform replaced from FIG. 6 configured as unilateral Z-transform. Also, the phase of the delay wave is given symmetrically on both sides.

The input 1101 is multiplied by a first coefficient input 1111b in a first multiplier 1110b. At the same time, the input 1101 is delayed by a first delay device 1114 to be a first delay signal 1115, and the first delay signal 1115 is multiplied by a second coefficient input 1107b in a second multiplier 1106b. At the same time, the first delay signal 1115 is delayed by a second delay device 1116 to be a second delay signal 1117, and the second delay signal 1117 is multiplied by a third coefficient input 1103a in a third multiplier 1102a. The second delay signal 1117 is delayed by a third delay device 1104a to be a third delay signal 1105a, and the third delay signal 1105a is multiplied by a fourth coefficient input 1107a in a fourth multiplier 1106a.

At the same time, the third delay signal 1105a is delayed by a fourth delay device 1108a to be a fourth delay signal 1109a, and the fourth delay signal 1109a is multiplied by a fifth coefficient input 1111a in a fifth multiplier 1110a. The outputs of all multipliers are added by an adder 1112c to be an output 1113c. The bilateral Z-transform equation derived from FIG. 9 is the following equation (30a).

$$\left.\begin{array}{l} a = 0.25 - j0.5 \\ b = 0.5 - j0.2 \\ c = 1 \\ d = 0.5 + j0.2 \\ e = 0.25 + j0.5 \\ n_1 T = T \\ n_2 T = 2T \\ n_3 T = 3T \\ n_4 T = 4T \end{array}\right\} \quad (30a)$$

Figure 10:
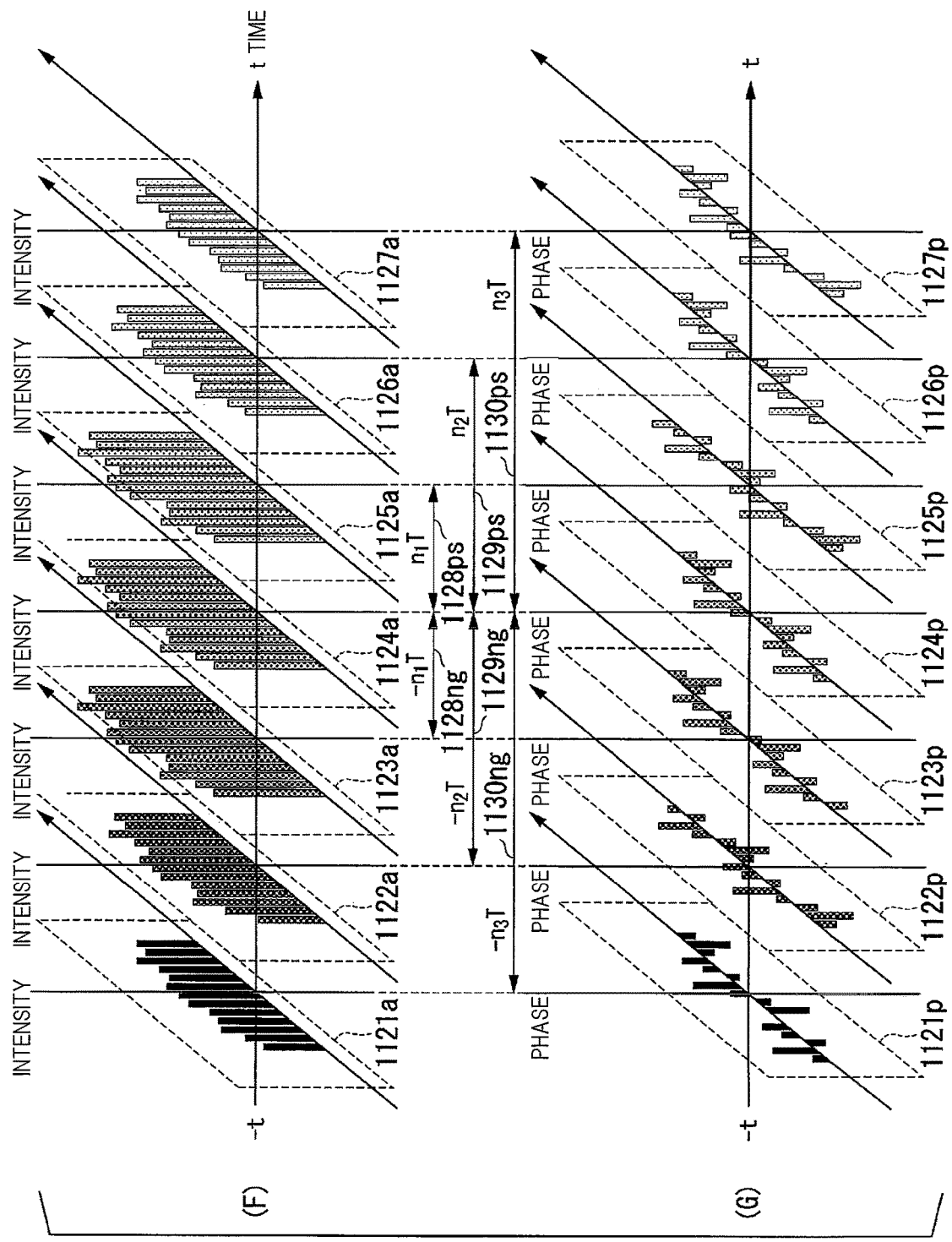
FIG. 10 is a diagram showing an overall image in a frequency band regarding propagation path characteristics of a wireless propagation path.

FIG. 10 is a diagram showing an overall image in a frequency band regarding propagation path characteristics of a wireless propagation path. FIG. 10(F) shows the spectral intensity for each frequency component on the frequency axis and time axis, and FIG. 10(G) shows the phase for each frequency component on the frequency axis and time axis. FIG. 10(F) shows the state of the bilateral Z-transform for the entire OFDMA wave and shows the change for all subcarriers in the system band unlike FIG. 5 and FIG. 8 in which one subcarrier frequency is shown.

Namely, the incoming first wave is represented by 1121a, the subsequent first delay wave is represented by 1122a, the second delay wave is represented by 1123a, the third delay wave is represented by 1124a, the fourth delay wave is represented by 1125a, the fifth delay wave represented by 1126a, and the sixth delay wave is represented by 1127a. However, because of the bilateral Z-transform, the wave 1124a at the center is the original first wave. Based on the first wave 1124a, the time to the first delay wave group 1123a on the negative side is represented by 1128ng and the time to the first delay wave group 1125a on the positive side is represented by 1128ps, respectively. Similarly, the time to the second delay wave group 1122a on the negative side is represented by 1129ng and the time to the second delay wave group 1126a on the positive side is represented by 1129ps, respectively.

Similarly, the time to the third delay wave group 1121a on the negative side is represented by 1130ng and the time to the third delay wave group 1127a on the positive side is represented by 1130ps, respectively. Also, as to the phase information shown in FIG. 10(G), the phase group of the incoming first wave is represented by 1121p, the phase group of the subsequent first delay wave is represented by 1122p, the phase group of the second delay wave is represented by 1123p, the phase group of the third delay wave is represented by 1124p, the phase group of the fourth delay wave is represented by 1125p, the phase group of the fifth delay wave is represented by 1126p, and the phase group of the sixth delay wave is represented by 1127p. It has been shown that the pseudo delay profile intended by this application needs to be widely recognized as shown in FIG. 10.

Next, a method for generating, based on a pseudo propagation path characteristic model generated from actual propagation path characteristics, a different pseudo propagation path characteristic model having low correlation degree thereto will be described. The actual propagation path is accompanied by a time change, and the spectral intensity and phase information at each time is measured. Also in the pseudo propagation path characteristics, it is effective to apply phase rotation with a change close to the symbol period. It is possible to configure at least two types of propagation paths by making the direction of phase rotation, rotation inversion, and the like symmetrical. Next, basically, the propagation path characteristics orthogonal to the propagation path characteristics represented by equation (34) are defined as $H_{INV}(e^{j\omega T})$, and a generation method is shown. The pseudo propagation path characteristics $H_{INV}(e^{j\omega T})$ orthogonal to equation (34) in terms of frequency and phase can be represented by equation (37).

$$H_{INV}(e^{j\omega T}) = R(\omega) - jX(\omega) = 1 + \frac{1}{4}\cos \omega T + \cos 2\omega T + j(\frac{1}{4}\sin \omega T + \sin 2\omega T) \quad (37)$$

These two propagation path characteristics, that is, $H(e^{j\omega T})$ and $H_{INV}(e^{j\omega T})$ both become the following equation (38) when viewed as electric power and show the same frequency characteristics, and thus fulfill the intended purpose.

$$|H(e^{j\omega T})|^2 = |H_{INV}(e^{j\omega T})|^2 = (R(\omega))^2 + (X(\omega))^2 \quad (38)$$

Figure 11:
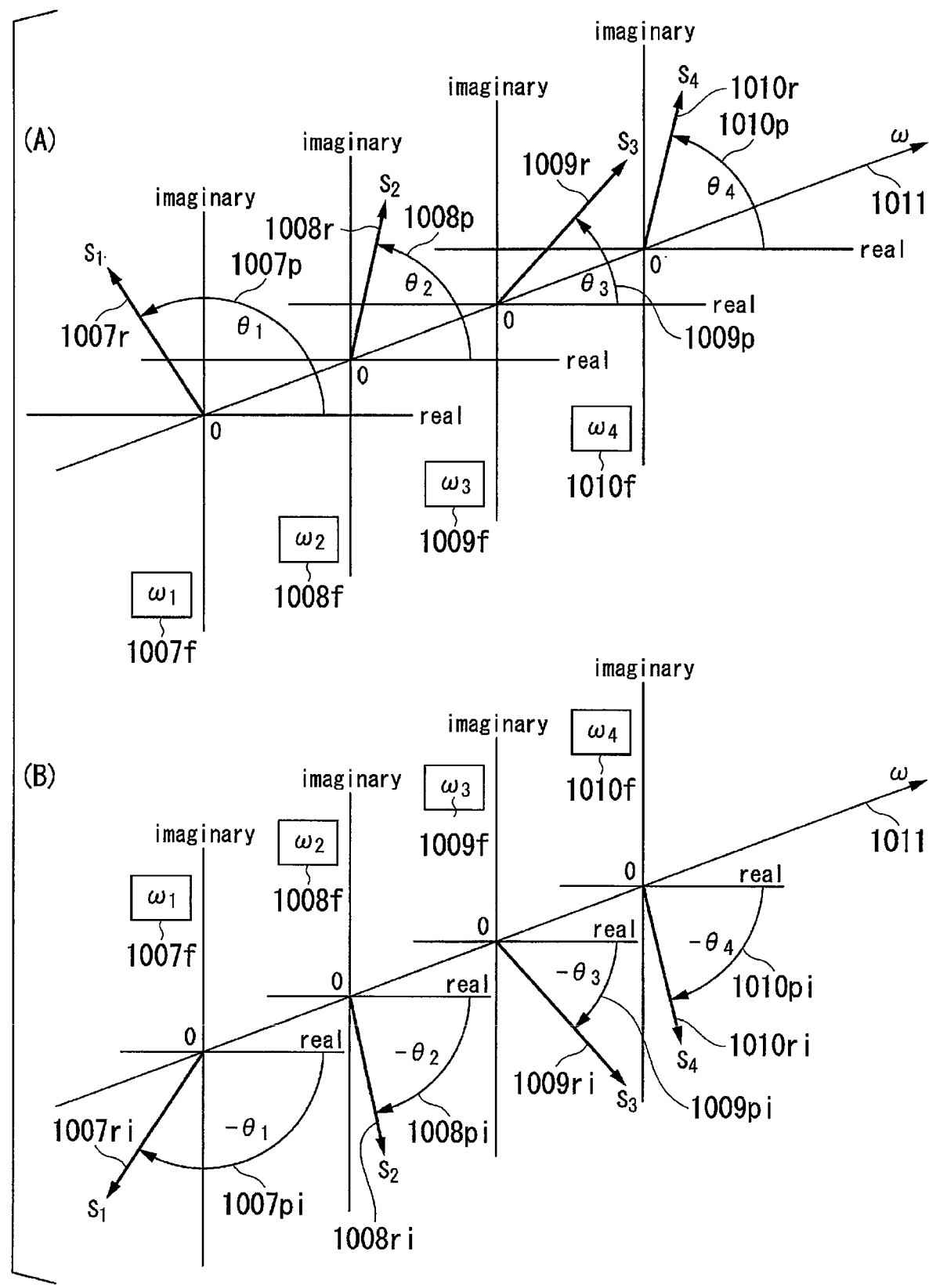
FIG. 11 is a diagram showing a relationship in a complex frequency space between propagation path characteristics $H_{INV}(e^{j\omega T})$ shown by equation (37) and propagation path characteristics $H(e^{j\omega T})$ used as a basis.

Here, FIG. 11 shows the relationship in the complex frequency space between the propagation path characteristics $H_{INV}(e^{j\omega T})$ represented by the equation (37) and the propagation path characteristics $H(e^{j\omega T})$ used as a basis. Note that only one frequency is shown here.

FIG. 11(A) schematically shows frequency characteristics, that is, the spectral intensity and the phase characteristics, of the equation (35) of the pseudo propagation path frequency characteristics $H(e^{j\omega T})$ derived from the direct wave shown in FIG. 5(D) and the phase information shown in FIG. 5(E). FIG. 11(A) shows the spectral intensities $s_1$, $s_2$, $s_3$, and $s_4$ denoted by 1007r, 1008r, 1009r, and 1010r at angular frequencies $\omega_1$, $\omega_2$, $_3$, and $\omega_4$ denoted by 1007f, 1008f, 1009f, and 1010f, respectively, and shows the spectral phases $\theta_1$, $\theta_2$, $\theta_3$, and $\theta_4$ denoted by 1007p, 1008p, 1009p, and 1010p, respectively. The phase is assumed to rotate, and the rotation directions are all counterclockwise in this example.

On the other hand, FIG. 11(B) schematically shows frequency characteristics, that is, the spectral intensity and the phase characteristics, of the equation (37) of the pseudo propagation path frequency characteristics $H_{INV}(e^{j\omega T})$ in which the phase has polarity reverse to that of the pseudo propagation path frequency characteristics $H(e^{j\omega T})$ for each frequency. FIG. 11(B) shows the spectral intensities $s_1$, $s_2$, $s_3$, and $s_4$ denoted by 1007ri, 1008ri, 1009ri, and 1010ri at angular frequencies $\omega_1$, $\omega_2$, $\omega_3$, and $\omega_4$ denoted by 1007f, 1008f, 1009f, and 1010f, respectively, and shows the spectral phases $-\theta_1$, $-\theta_2$, $-\theta_3$, and $-\theta_4$ denoted by 1007pi, 1008pi, 1009pi, and 1010pi, respectively. The phase is assumed to rotate, and the rotation directions are all clockwise in this example. Because of being orthogonal to FIG. 11(A), the rotation directions are all clockwise in this example.

Figure 12:
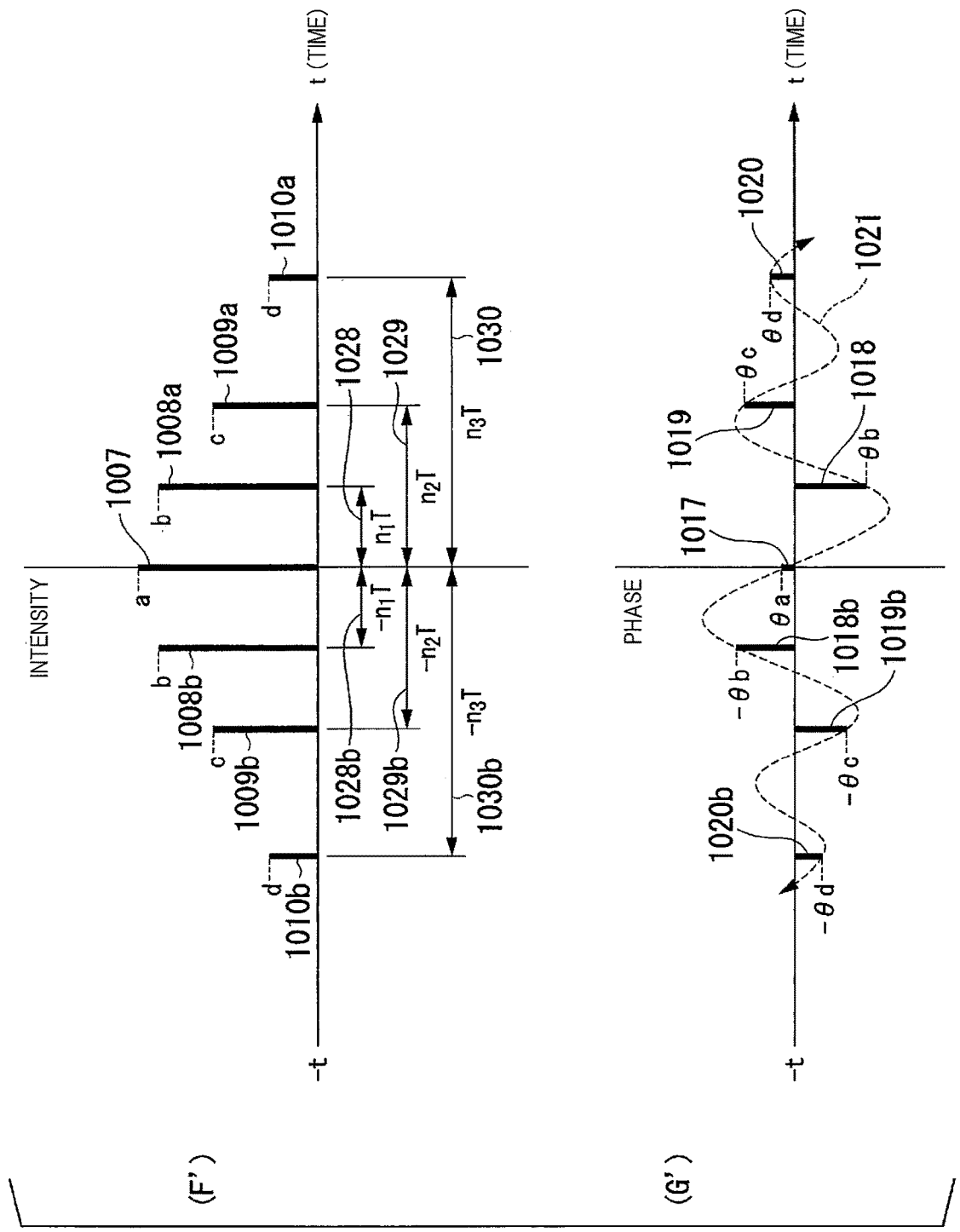
FIG. 12 is a diagram showing an example of an outline of first pseudo propagation path characteristics.
Figure 13:
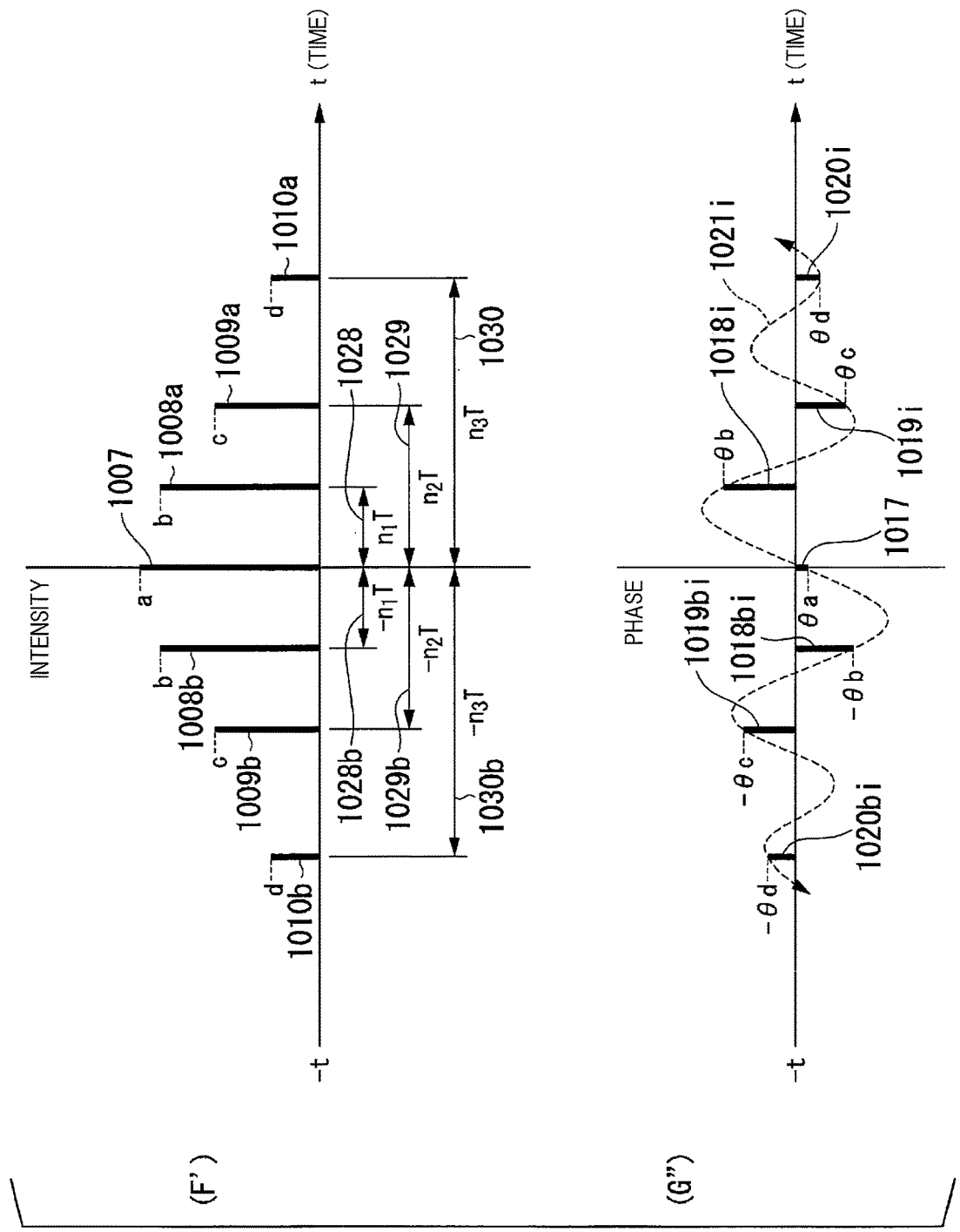
FIG. 13 is a diagram showing an example of an outline of second pseudo propagation path characteristics.

This state can be shown in FIGS. 12 and 13 when expressed on the time axis from the viewpoint of complex frequency. FIG. 12 shows FIG. 5(D) and FIG. 5(E) as the bilateral Z-transform. FIGS. 12 and 13 are expressed by positive and negative time axes in the form of taking the bilateral Z-transform into account. The reference numbers in FIG. 12 are based on those of FIG. 5, but are added with a suffix a on the side of the positive time axis from the first wave and a suffix b on the side of the negative time axis because of performing the bilateral Z-transform. FIG. 12(G') shows the phase information in the bilateral Z-transform, and shows the odd symmetry between the positive time side and the negative time side in the case where the phase of the first wave is zero.

FIG. 14(H) shows that the second pseudo propagation path characteristics $H_{INV}(e^{j\omega T})$ orthogonal to the first pseudo propagation path characteristics $H(e^{j\omega T})$ are transformed according to Hilbert transform, the phases rotate clockwise, and the polarities of all phases are reverse to those in FIG. 12(G'). The diagram showing the spectral intensity is the same as FIG. 12(F'), but the rotation direction of each phase when viewed in the entire frequency domain is determined by the sign of the phase and has its own direction. The direction is determined by the imaginary part of equation (36).

It can be seen that if the phase rotation direction is made to have reverse polarity with the use of the characteristics of the equation (33), the equation (39) is obtained, that is, it becomes conjugate with the equation (33). The frequency characteristics are equivalent to the equation (33), but are completely reverse in phase rotation, and the propagation path characteristics are orthogonal.

$$H_{INV}(e^{j\omega T}) = H(e^{j\omega T})|_{T \to -T} = \qquad (39)$$
$$1 + \frac{1}{4}\cos(-\omega T) + \cos(-2\omega T) - j\left(\frac{1}{4}\sin(-\omega T) + \sin(-2\omega T)\right) =$$
$$1 + \frac{1}{4}\cos(\omega T) + \cos(2\omega T) + j\left(\frac{1}{4}\sin(\omega T) + \sin(2\omega T)\right) =$$
$$H^*(e^{j\omega T})$$

From the above, by sending the propagation path characteristics $H(e^{j\omega T})$ and the propagation path characteristics $H_{INV}(e^{j\omega T})$ to the reception unit of the transmission destination in advance as the pseudo propagation path characteristic information, the data $d_1$ can be extracted by performing the correlation calculation with the propagation path characteristics $H(e^{j\omega T})$ and the data $d_2$ can be extracted by performing the correlation calculation with the propagation path characteristics $H_{INV}(e^{j\omega T})$ from the reception wave in which the data $d_1$ multiplied by the propagation path characteristics $H(e^{j\omega T})$ and the data $d_2$ multiplied by the propagation path characteristics $H_{INV}(e^{j\omega T})$ are modulated with the same carrier frequency and which is received through the wireless transmission. Namely, at least two independent data series can be sent by a single wireless propagation path.

Next, the third pseudo propagation path characteristics $H_{REV}(e^{j\omega T})$ are represented by equation (40).

$$H_{REV}(e^{j\omega(-T)})=R(\omega(-T))+jX(\omega(-T)) \qquad (40)$$

As is apparent in the equation (40), the third pseudo propagation path characteristics $H_{REV}(e^{j\omega T})$ are obtained by replacing the variable T with the reverse polarity −T. This state will be described with reference to FIG. 14. As is apparent from the equation (40) and FIG. 14, the third pseudo propagation path characteristics $H_{REV}(e^{j\omega T})$ are obtained by inverting the array on the time axis with respect to the first pseudo propagation path characteristics $H(e^{j\omega T})$. The times $n_0T$ denoted by 1031ua and 1031ub give a time equal to or more than the time resolution except the case where the corresponding phases 1020upa and 1020upb are zero at the same time.

The reference characters are based on those of FIG. 5 and FIG. 12, but are added with a suffix u because the time direction changes. Further, on the time axis, the times of 1032ua and 1032ub, 1033ua and 1033ub, and 1034ua and 1034ub are defined based on the first wave 1007ua or 1007ub. In the phase of FIG. 14(l), the suffix indicating the positive domain on the time axis is upa and the suffix indicating the negative domain is upb.

It is apparent that if the correlation calculation on the time axis is performed, the correlation of the third pseudo propagation path characteristics $H_{REV}(e^{j\omega T})$ with both the first pseudo propagation path characteristics $H(e^{j\omega T})$ and the second pseudo propagation path characteristics $H_{REV}(e^{j\omega T})$ becomes zero. Next, the fourth pseudo propagation path characteristics $H_{DL}(e^{j\omega(T-n\tau)})$ are represented by equation (41).

$$H_{DL}(e^{j\omega(T-n\tau)})=R(\omega(T-n\tau))+jX(\omega(T-n\tau)) \qquad (41)$$

Figure 15:
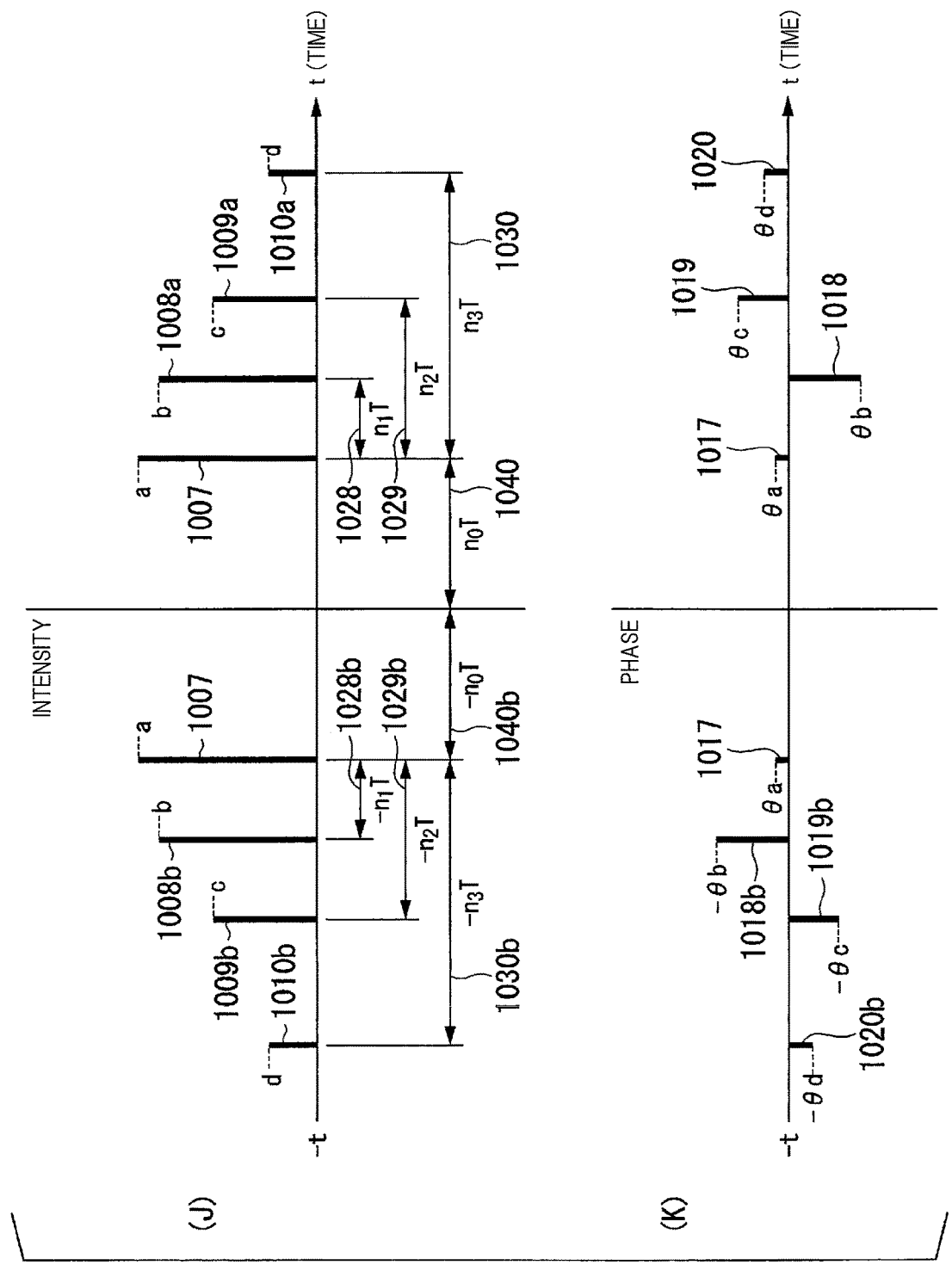
FIG. 15 is a diagram showing an example of an outline of fourth pseudo propagation path characteristics.

As is apparent in equation (41), a delay is provided to the variable T in the fourth pseudo propagation path characteristics $H_{DL}(e^{j\omega(T-n\tau)})$. This state will be described with reference to FIG. 15. All the incoming waves in FIG. 15 are delayed by delay time $n_0T$ denoted by 1040 and 1040b as compared with FIG. 12. If all the arrival times of the incoming waves in FIG. 12 do not match with the arrival times of the incoming waves in FIG. 15 or if the time $n_0T$ is set to exceed the maximum time of the incoming waves in FIG. 12, the two independent transmission data sent by the respective pseudo propagation path characteristics can be received independently.

As is apparent from the equation (40) and FIG. 15, the fourth pseudo propagation path characteristics $H_{DL}(e^{j\omega(T-n\tau)})$ are obtained by delaying the first pseudo propagation path characteristics $H(e^{j\omega T})$ on the time axis. It is apparent that if the correlation calculation on the time axis is performed, the correlation of the fourth pseudo propagation path characteristics $H_{DL}(e^{j\omega(T-n\tau)})$ with the first pseudo propagation path characteristics $H(e^{j\omega T})$, the second pseudo propagation path characteristics $H_L(e^{j\omega T})$, and the third pseudo propagation path characteristics $H_{INV}(e^{j\omega T})$ becomes zero. FIG. 16 shows a simple example.

Figure 16A:
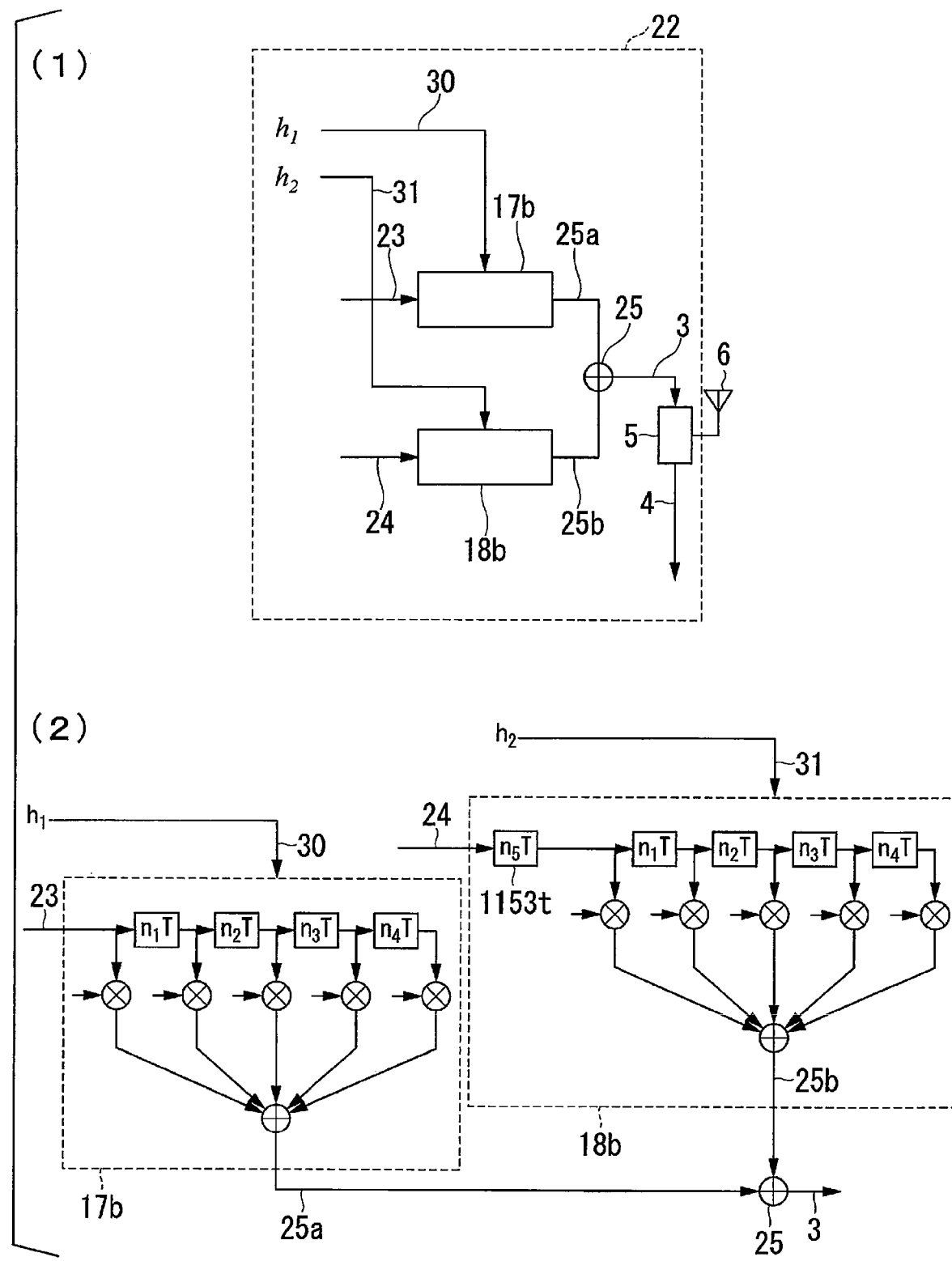
FIG. 16A is a diagram showing an example of a configuration that generates pseudo propagation path characteristics on a transmitting side.

In FIG. 16A, (1) shows a related part of the transmission system, and in FIG. 16B, (3) shows a related part of the reception system. They are basically the same as those of FIG. 3. In FIG. 16A, (2) shows a specific configuration of the carrier processing units 17b and 18b in the time domain in FIG. 16A(2), and in FIG. 16B, (4) shows a specific configuration of the correlation calculation units 41f and 42f in the time domain in FIG. 16B(3).

In (2) of FIG. 16A, two types of pseudo propagation path characteristics h1 and h2 are provided as the outputs 30 and 31 from the propagation path parameter management unit 29, and two similar FIR filters are configured. In the carrier processing unit 17b in the first time domain, an FIR equalizer according to the Z-transform based on the delay profile is formed, and in the carrier processing unit 18b in the second time domain, the configuration equivalent to that of the FIR filter according to the Z-transform based on the delay profile in the first time domain is formed except that a delay device 1153t exceeding the delay time between FIG. 12 and FIG. 15 is inserted. Outputs from each of them are synthesized by the synthesizer 25 to perform the transmission process.

In the reception unit of FIG. 16B(4) that receives the wireless information, two similar FIR equalizers shown in FIG. 16B(4) are configured in the correlation calculation units 41f and 42f in the first time domain based on the pseudo propagation path characteristic information h1 and h2 generated by the pseudo propagation path characteristic management unit 45. This equalizer has the configuration equivalent to that of the FIR filter on the transmitting side. If the equalizer has the same configuration, the total value of the propagation path characteristics increases in the crests and troughs of the frequency characteristics, but the deterioration in the frequency band to which the resource block is given is not severe. On the other hand, if this equalizer is configured as an equalization type with reverse characteristics, the frequency characteristics basically become flat and a great improvement can be obtained in the reception characteristics.

In the two correlation calculation units 41f and 42f in the time domain, the configuration equivalent to that of the FIR filter according to the Z-transform based on the delay profile in the first time domain is formed except that a delay device 1153r exceeding the delay time between FIG. 12 and FIG. 15 is inserted, and outputs are obtained from each of them and are provided to the FFT units on the next stage. From the above, it is apparent that it is possible to generate and use the secondary pseudo propagation path characteristic model in the case of providing delay to the delay profile.

Next, the fifth pseudo propagation path characteristics $H_{DL-ODD}(e^{j\omega(T-n\tau)})$ are represented by equation (42).

$$H_{DL-ODD}(e^{j\omega(T-n\tau)})=R(\omega(-T++n\tau))+jX(\omega(-T+n\tau)) \quad (42)$$

As is apparent in the equation (42), the fifth pseudo propagation path characteristics $H_{DL-ODD}(e^{j\omega(T-n\tau)})$ are obtained by inverting the array and providing the delay of the variable T. This state will be described with reference to FIG. 17A. As is apparent from the equation (42) and FIG. 17A, the fifth pseudo propagation path characteristics $H_{DL-ODD}(e^{j(T-n\tau)})$ are obtained by inverting the array of the first pseudo propagation path characteristics $H(e^{j\omega T})$ on the time axis and further providing the delay on the time axis. The times $n_0T$ denoted by 1051va and 1051vb give the time required to reduce the correlation. The reference characters are based on those of FIG. 14, but the suffix u is changed to suffix v because the delay time changes.

Figure 14:
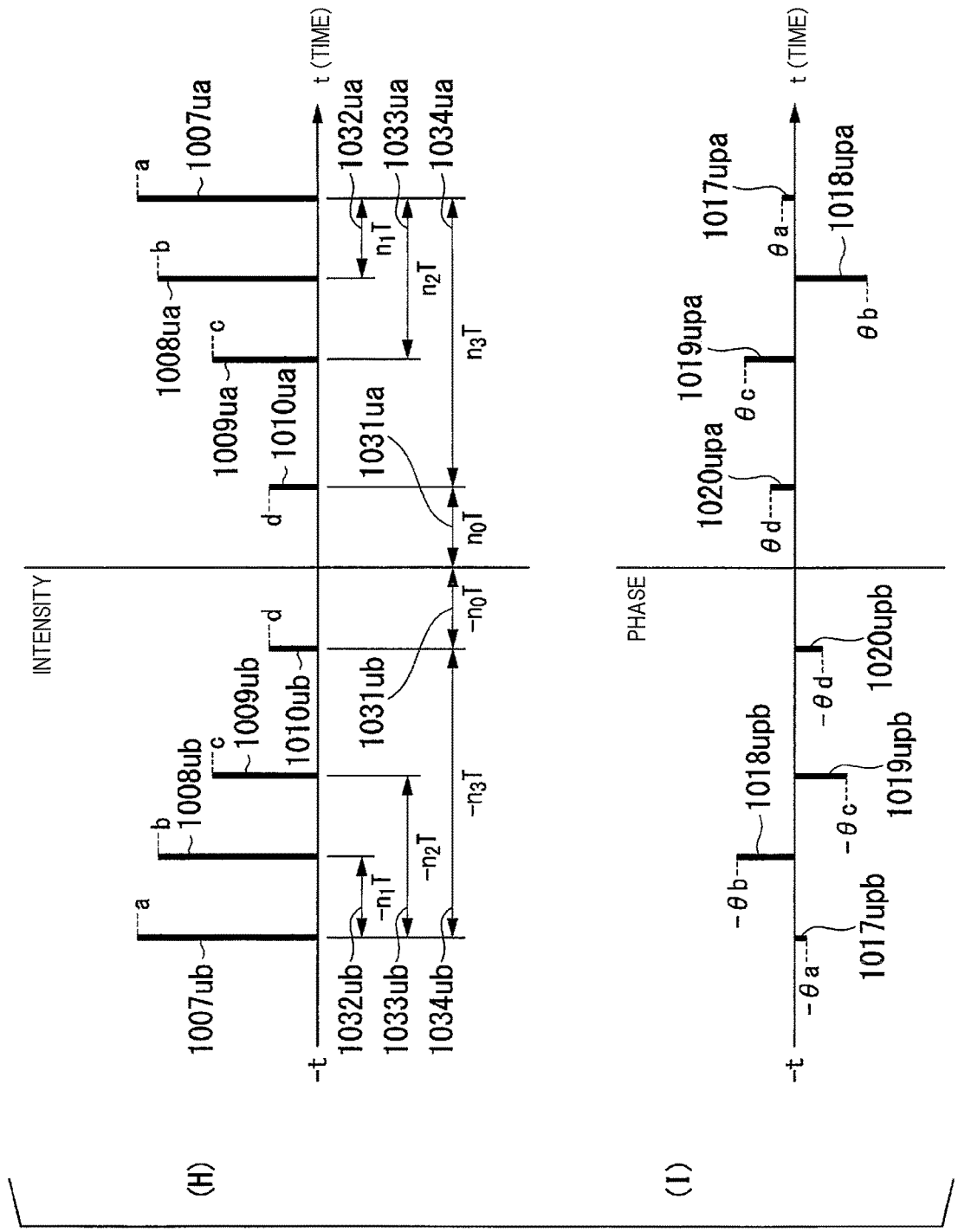
FIG. 14 is a diagram showing an example of an outline of third pseudo propagation path characteristics.
Figure 17A:
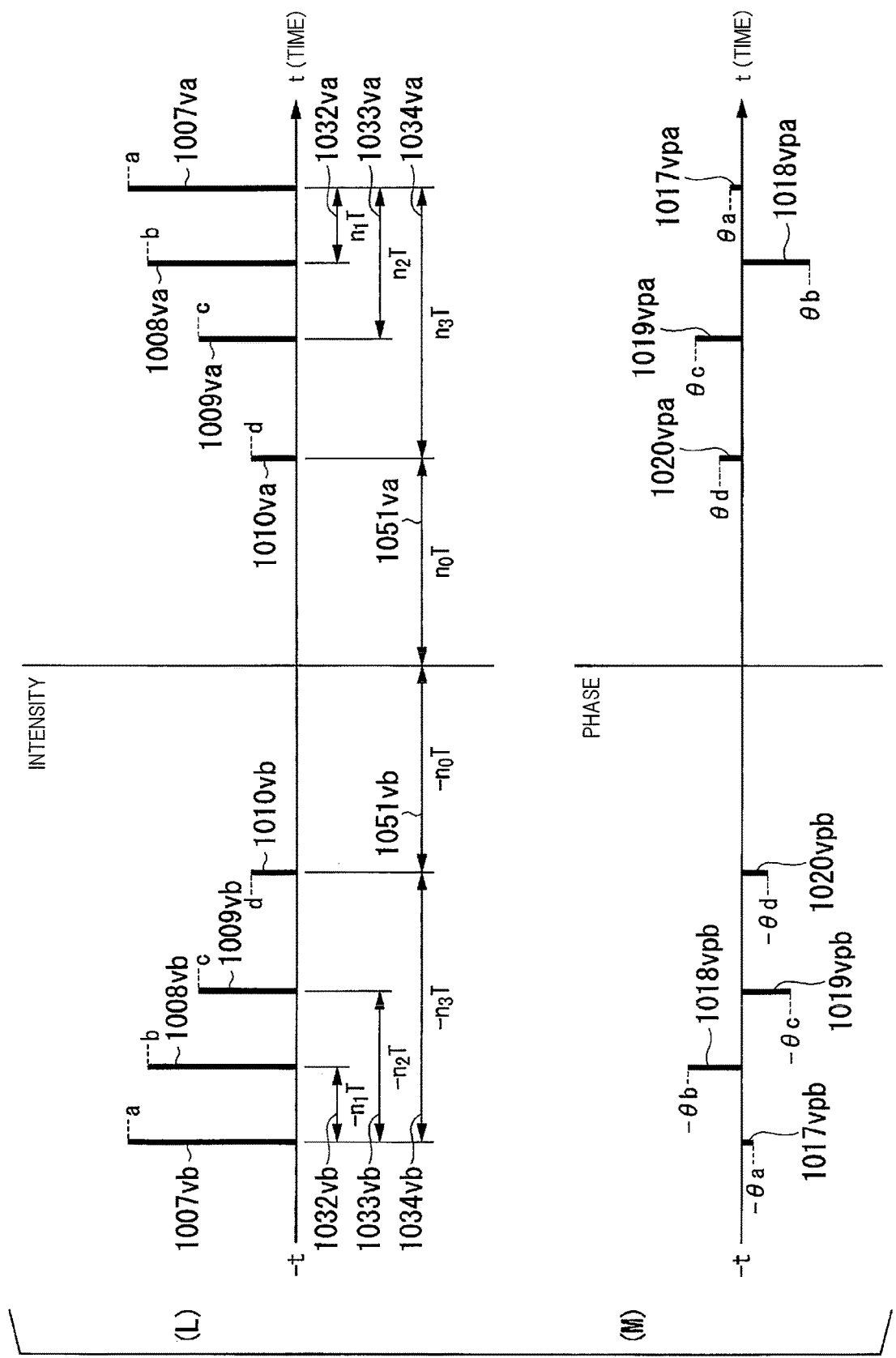
FIG. 17A is a diagram showing an example of a concept of fifth pseudo propagation path characteristics.

All the incoming waves in FIG. 17A are delayed by delay time $n_0T$ denoted by 1051va and 1051vb as compared with FIG. 14. If all the arrival times of the incoming waves in FIG. 14 do not match with the arrival times of the incoming waves in FIG. 17A or if the time $n_0T$ is set to exceed the maximum time of the incoming waves in FIG. 14, the two independent transmission data sent by the respective pseudo propagation path characteristics can be received independently. The signal discriminator shown in FIG. 16 can be used.

Also, it is apparent that if the correlation calculation on the time axis is performed, the correlation of the fifth pseudo propagation path characteristics $H_{DL-ODD}(e^{j\omega(T-n\tau)})$ with the first pseudo propagation path characteristics $H(e^{j\omega T})$, the second pseudo propagation path characteristics $H_L(e^{j\omega T})$, the third pseudo propagation path characteristics $H_{INV}(e^{j\omega T})$, and the fourth pseudo propagation path characteristics $H_{DL}(e^{j\omega(T-n\tau)})$ becomes zero. Further, in all of the pseudo propagation path models shown above, the delay time from the first wave to the delay wave of the delay profile is derived from the basic propagation path model based on the actual propagation path characteristics.

However, if the frequency characteristics of the propagation paths are the same, the intensity, the delay time, and the phase of the first wave and the delay wave do not need to be restricted. FIG. 17B shows an idea of a pseudo propagation path characteristic model having a delay profile different from that of the basic delay wave model in FIG. 17B(F'). In FIG. 17B, each wave clearly differs in intensity and position on the time axis from FIG. 17B(F'). The orders of the intensity also differ. Naturally, the phase relationship also differs, but it is omitted in the drawing. As will be described later, the delay profile model having different configuration is transformed to the frequency domain and compared with the reference frequency domain model to confirm that there is no significant difference. If there is a large difference, this is notified to the model formation unit and the model is modified.

Figure 18:
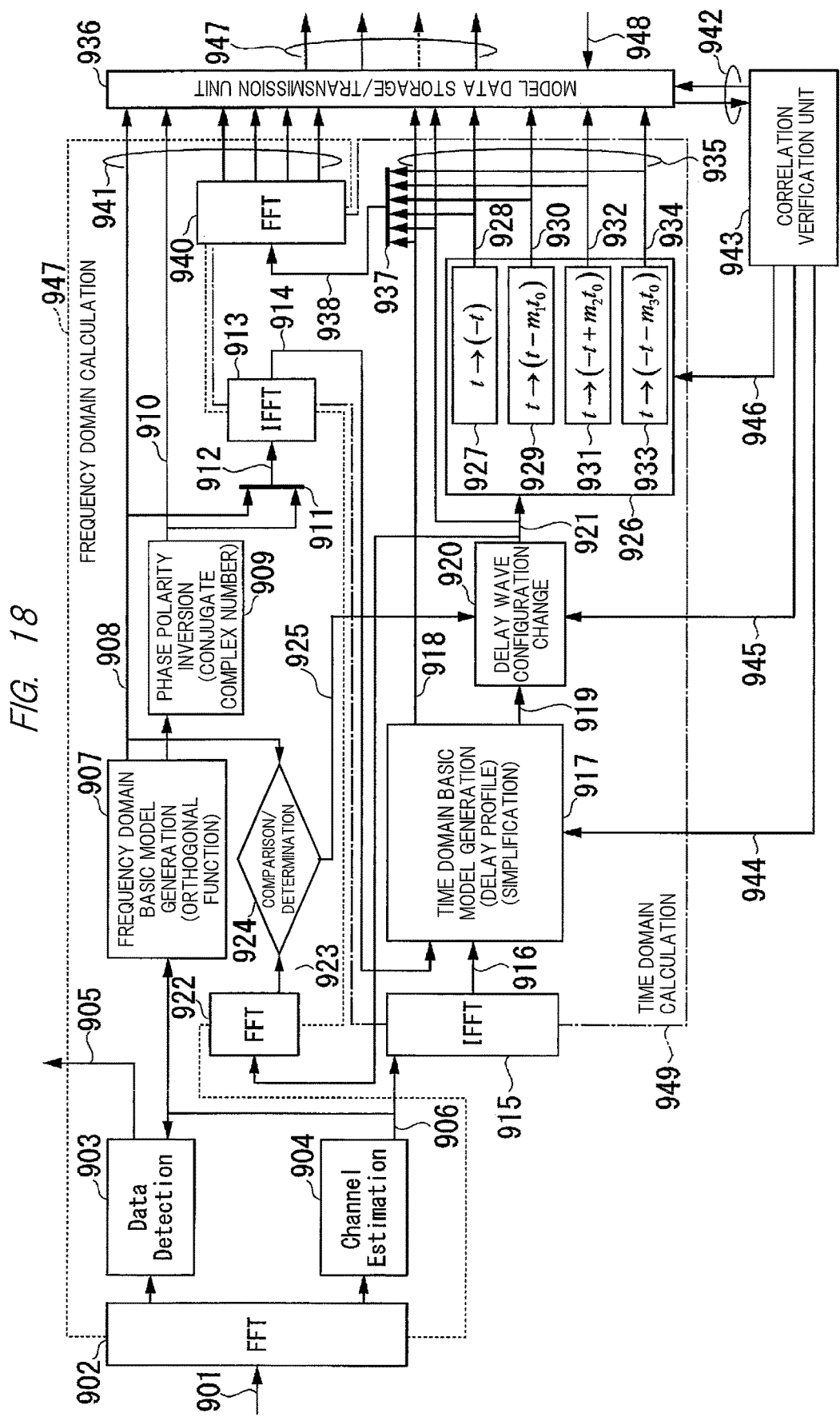
FIG. 18 is a schematic diagram showing an inside of a propagation path parameter management unit 29 that generates a plurality of pseudo propagation path characteristics.

FIG. 18 is a schematic diagram showing an inside of the propagation path parameter management unit 29 that generates the plurality of pseudo propagation path characteristics described above. FIG. 18 shows a system for generating and operating the pseudo propagation path characteristic models in the transmission system. In FIG. 18, the frequency characteristic information obtained by a FFT unit 902 of the reception system is provided to a propagation path characteristic estimation unit 904 and a data detection system 903, and the data detection system 903 takes out the data 905.

The output of the propagation path characteristic estimation unit 904 is provided to a frequency domain basic model generation unit 907 for generating the basic model. The frequency domain basic model generation unit 907 generates a frequency domain basic model 908. The frequency domain basic model 908 is provided to a phase polarity inverting unit 909, and the phase polarity inverting unit 909 generates a model whose phase becomes a conjugate complex number with respect to the frequency domain basic model.

On the other hand, frequency domain information 906 which is the result of the propagation path estimation of the propagation path characteristic estimation unit 904 becomes time domain information, that is, the delay profile model 916 in an inverse IFFT unit 915. The delay profile model 916 is input to a time domain basic model generation unit 917, and the time domain basic model generation unit 917 generates a time domain basic model 918 by simplifying the delay profile.

The time domain basic model and accompanying information are sent to a delay wave configuration changing unit 920 as an output 919, and a secondary model 921 having different intensity, phase, time axis position, and intensity order in the delay profile from the time domain basic model 918 is generated. However, in order to confirm whether or not the secondary model 921 has the frequency characteristics similar to those of the frequency domain basic model, the secondary model 921 is provided to the second FFT unit 922 to generate a frequency domain model 923, and it is compared with the frequency domain basic model 908 in a comparison/determination unit 924. When the difference is small according to a result 925 thereof, the delay wave configuration changing unit 920 provides the time domain secondary model 921 as an output to be used, and when the difference is large, the secondary model is generated again.

The time domain model group thus obtained is provided to a time domain parameter transform unit 926, and a plurality of time domain pseudo propagation path model groups 935 are obtained through a time-axis direction inversion unit 927, a delay time insertion unit 929, a time inversion/positive delay insertion unit 931, and a time inversion/negative delay insertion unit 933. The plurality of time domain pseudo propagation path model groups 935 are sent to a third FFT unit 940 via a selection unit 937 and become a frequency domain model group 941.

Storage and transmission for use of the frequency domain model group 941 and the time domain model group 942 are performed in the model data storage and transmission unit 936, and the frequency domain model group 941 and the time domain model group 942 are sent to a correlation verification unit 943 for confirming the correlation between each model data and the degree of correlation between models is calculated. As for the model determined to have a high correlation as a result of the calculation, instructions 944, 945, and 946 are sent to the time domain basic model generation unit 917, the delay wave configuration changing unit 920, and the time domain parameter transform unit 926 to generate the model again. From the above, it is apparent that a plurality of pseudo propagation path characteristic models can be secured.

FIG. 19 shows the functions of the FFT unit 43 (44) and the correlation calculation unit 41*b* (42*b*) of the reception system 7 (see FIG. 3) of the subscriber terminal. The function of the FFT unit 43 can be represented by the following equation (43).

$$R(\omega,\theta)\int_{-T}^{T} r(\omega,t) e^{-j\omega t} dt \qquad (43)$$

Also, the function of the correlation calculation unit 41*b* can be represented by the following equation (44).

$$G_i(T) = \int_{-\pi}^{\pi} R(\omega,\theta) \cdot H_{h_{p1}}(\omega,\theta) \cdot H_{hi}(\omega,\theta) d\omega \qquad (44)$$

$G_i(T)$ indicates a correlation calculation output.

FIG. 20 shows the concept of calculation in the FFT unit 41 of the reception system 7 of the subscriber terminal for generating resource blocks. The pseudo propagation path characteristic model supplied from the pseudo propagation path characteristic management unit 45 includes 1191 indicating the intensity information in FIG. 20(*a*) and 1192 indicating the phase information in FIG. 20(*b*). When the pseudo propagation path characteristic model is provided in the form of a delay profile in the time axis domain, transform into the frequency domain is performed by FFT, whereby FIG. 20(*c*) corresponding to the intensity information 1193 in the frequency domain and FIG. 20(*d*) corresponding to the phase information 1194 are obtained. A resource block 1003*a* or a resource block 1004*a* is assigned in the spectrum portion having significant intensity characteristics.

The spectral characteristics are $H_{h1}(\omega, \theta)$ shown in the correlation calculation unit 41*b* in FIG. 19. When the reception signal is represented by $R(\omega, \theta)$ and the actual propagation path characteristics are $H_{h1}(\omega, \theta)$, the correlation calculation is given by the equation (45) described later. The limit of the number of generations of the pseudo propagation path model is shown below.

According to the fourth-generation mobile communication LTE standard 3GPP TS 36.211, the guard intervals in the resource blocks of OFDMA, that is, the Cyclic Prefix have the types shown in Table 1 below. Note that Table 1 shows the definition of resource blocks of the downlink.

TABLE 1

Physical resource blocks parameters
(Table 6.2.3.1 3GPP TS 136.211)

| Configuration | | $N^{RB}_{SC}$ | $N^{DL}_{symb}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

Here, Δf denotes the subcarrier spacing, $N^{RB}_{SC}$ denotes the number of subcarriers for forming one resource block, and $N^{RB}_{symb}$ denotes the number of symbols for forming one resource block. Here, the case of the standard state in Table 1, that is, the normal cyclic prefix is considered. There are 12 subcarriers per resource block and the number of symbols is 7. Next, the SRS (sounding resource signal) for measuring propagation path characteristics for each frequency width of OFDMA will be described with reference to FIG. 21. As shown in FIG. 21, even if a given resource block is only one block, the SRS issues reference signals for all bands to measure the frequency characteristics of all bands. The quality of the link is measured by the SRS.

FIG. 21(*a*) shows the resource block, the SRS, and the control signal PUCCH (Physical Uplink Control Channel) on the frequency axis and the time axis. In FIG. 21(*a*), 1201 denotes the SRS. 1202 denotes the time spacing of SRS. 1203 denotes the frequency range of SRS, 1204 denotes one subframe, and 1205 denotes the frequency width of one resource block. 1206 denotes the control signal PUCCH. In FIG. 21(*b*), 1207 denotes a symbol period. Also, FIG. 21(*b*) shows the position of the SRS on the time axis. The SRS is normally placed in the last slot of the subframe.

As described above, the wireless base station receives communication with the frequency width of the resource block shown in FIG. 21 from the subscriber terminal, and obtains the frequency information of the entire bandwidth including the SRS signal placed in the last slot of the subframe and the control signal PUCCH. This allows the wireless base station to measure the frequency characteristics of the entire bandwidth, that is, the propagation path characteristics.

FIG. 22 shows a functional configuration for generating the SRS. 1301 denotes an SRS signal, 1302 denotes another transmission information input, 1303 denotes a multiplexer that selects these inputs based on a control signal 1304, 1305 denotes FFT (DFT: discrete Fourier transform) for transforming the time-series SRS signal 1301 into a frequency sequence, 1306 denotes the SRS signal that has become a signal element on the frequency axis, 1307 denotes IFFT (inverse fast Fourier transform) that receives the SRS signal 1306 and transforms it into a single carrier, 1308 denotes a control signal for performing timing control and frequency control of the IFFT, 1309 denotes a block for inserting the CP (cyclic prefix) in a frame, and 1310 denotes a transmission signal of a subscriber terminal.

In FIG. 22, the SRS signal 1301 is assigned on the frequency axis by the FFT (DFT) 1305, and becomes the assigned signals 1306. Thereafter, the signals 1306 assigned on the frequency axis while being controlled by the control signal 1205 in accordance with the final slot 1304 of the subframe shown in FIG. 21 are transformed into a time axis signal by the IFFT 1307, and it becomes the transmission signal 1310 after being subjected to the CP insertion.

As a result, the time resolution of the delay profile of the wireless propagation path from the subscriber terminal measured by the wireless base station is normally 0.2 μs, which is the reciprocal of 5 [MHz]. This corresponds to 60 [m] in terms of distance. Here, it is necessary to consider the definition of the delay time of the delay wave. FIG. 23 shows the CP for accommodating delay waves in the frame structure.

In FIG. 23, 1410 denotes an OFDMA frame, 1411 denotes a preceding OFDMA frame, 1412 denotes a succeeding OFDMA frame, 1413 and 1414 denote CPs (cyclic prefixes) for accommodating the delay waves between the OFDMA frame and each of the preceding OFDMA frame and the succeeding OFDMA frame, and 1415 denotes an OFDMA frame repetition period composed of the CP and the OFDMA frame 1410.

As described above, the CP section 1413 or 1414 is designed so that the FFT integration can be collectively performed to the delay wave group that arrives later than the main wave, and the values in Table 2 are specified in the LTE standard.

TABLE 2

OFDM parameters in 5 MHz size of LTE

| | | |
|---|---|---|
| Transmission bandwidth | | 5 MHz |
| Subframe time spacing | | 0.5 ms |
| Subcarrier frequency spacing | | 15 kHz |
| Sampling frequency | | 15.36 MHz |
| | | (=4 × 3.84 MHz) |
| FFT size | | 512 |
| Subcarrier occupation number | | 301 |
| Number of OFDM symbols per subframe | | 7 (Short CP), |
| | | 6 (Long CP) |
| CP length | Short | (4.69/72) × 6 |
| (µs/sample) | | (5.21/80) × 1 |
| | Long | (16.67/256) |

On the other hand, the guard interval (CP section) is 4.69µ [seconds], which corresponds to 1,407 [m] in terms of distance. It will double further in the extended specifications. Namely, the number of delay wave arrangement points that can be provided in the CP section is about 23 points by the distance resolution. It is apparent that it is possible to generate a model that matches the actual wireless propagation path characteristics by combining the 23 delay wave positions. In addition to this, it can be easily inferred that at least 10 or more kinds of pseudo propagation models can be provided by combining phase inversion, time shift, position inversion, and the like. For example, a combination of extracting any 3 from 23 is represented in equation (45).

$$N = \frac{23!}{3!(23-3)!} = \frac{21 \times 22 \times 23}{1 \times 2 \times 3} = 7 \times 11 \times 23 = 1,771 \quad (45)$$

Since the number of resource blocks in the 5 [MHz] band is 25 from Table 3, if propagation models that match the frequency characteristics of 25 locations are provided from the above combinations, about 70 models per resource block will be obtained. It is not difficult to establish 10 models per resource block by selecting those having high orthogonality and independence from them.

TABLE 3

Number of resource blocks for bandwidth

| Band type | Bandwidth | Number of resource blocks |
|---|---|---|
| 1.4 MHz | 1.08 MHz | 6 |
| 3 MHz | 2.70 MHz | 15 |
| 5 MHz | 4.50 MHz | 25 |
| 10 MHz | 9.00 MHz | 50 |
| 15 MHz | 13.5 MHz | 75 |
| 20 MHz | 18.0 MHz | 100 |

FIG. 24 is a diagram showing a wireless communication system using three types of pseudo propagation path models realized by this application. The respective reference characters are based on the first embodiment, and the three columns of communication systems are distinguished by suffixes a, b and c, respectively.

FIG. 25 is a diagram showing an example of OFDMA frames using three types of pseudo propagation path models. FIG. 25 shows the pilot signals in the case of using three types of pseudo propagation path models, and three types of pilot signals in which the characteristics of the three types of pseudo propagation path models are arranged are provided in the front part of the frames. On the receiving side, the characteristics in the form of product in which characteristics of the actual wireless propagation path are added to the propagation characteristics of the pseudo propagation path model are received. In this method, by detecting the propagation path characteristics by the propagation path estimation unit, the extraction of the desired signal from the reception signal is realized.

On the other hand, it is also possible to send three types of pseudo propagation path characteristics in advance in the form of data, perform normal propagation path estimation, and extract signals in MMSE and MLD using propagation path parameters based on the combination of both.

In the OFDMA system, it is specified that the propagation path characteristics are measured at least in units of resource block and sent to the other party, and the change is surely implemented in the existing system. FIG. 26A shows a conceptual diagram of performing three-layer data transmission from a wireless base station to a subscriber terminal or from a subscriber terminal to a wireless base station with the use of three types of pseudo propagation path characteristics. If the three types of pseudo propagation path characteristics have low correlation with each other, both the wireless base station and the subscriber terminal each having one antenna can achieve the higher data transmission rate aimed in this application.

Further, since this application is based on the fact that the propagation path characteristics are different for each resource block, different pseudo propagation path characteristics are generated and used for each resource block and the frequency bands do not overlap, so that interference between resource blocks is considered to be very low. In FIG. 26A, 1501 denotes a wireless base station. 1502 denotes a subscriber terminal.

1503 denotes a resource block selected and set between the wireless base station 1501 and the subscriber terminal 1502. 1503a and 1504 denote propagation path characteristics that are the basis of the selection of the resource block. 1509, 1510, and 1511 denote propagation paths between the wireless base station 1501 and the subscriber terminal 1502. It is assumed that the propagation path 1510 is reflected by a reflector 1512 and the propagation path 1511 is reflected by a reflector 1513.

The propagation path characteristics are determined by the superposition of radio waves from these three types of propagation paths 1509, 1510, and 1511, and the case where the portion indicated by 1503a has a high spectral intensity is assumed. According to the means of this application, it becomes possible to carry individual data by the three transmission layers 1506, 1507, and 1508 having three types of pseudo propagation path characteristics that are approximate to the spectral characteristics 1503a, and the higher transmission rate by triple multiplexing can be realized in the example of FIG. 26A.

Next, a process flow of the transmission/reception system S will be described. FIG. 26B is a sequence diagram showing an example of the process flow of the transmission/reception system S. Hereinafter, the case where the wireless base station (transmission device) and the subscriber terminal (reception device) communicate with each other in the transmission/reception system S by FDD will be described. The subscriber terminal (reception device) fixes the phases of all subcarriers in the band in the resource block and generates a pilot signal having a constant amplitude (step S100). The subscriber terminal transmits the generated pilot signal (step S102).

The wireless base station receives the pilot signal arrived by the propagation of the transmission signal transmitted from the subscriber terminal through the communication propagation path (step S104). The wireless base station measures the actual propagation path characteristics between the wireless base station and the subscriber terminal based on the received pilot signal (step S106). The wireless base station generates a plurality of pseudo propagation path characteristics similar to the actual propagation path characteristics based on the measurement result of the actual propagation path characteristics (step S108).

At this time, for example, the wireless base station generates the plurality of pseudo propagation path characteristics so as to ensure the low mutual correlation by combining the following four methods. (1) All phase polarities on the positive and negative frequency axes of the pseudo propagation path characteristics are inverted. (2) A plurality of pseudo propagation path characteristics are generated by inverting all orders of the delay profiles on the positive and negative time axes of the pseudo propagation path characteristics. (3) Delay is applied to the delay profiles on the positive and negative time axes of the pseudo propagation path characteristics. (4) A transmission device generates a plurality of pseudo propagation path characteristics by changing the time position, intensity, and phase of the delay wave forming the delay profiles on the positive and negative time axes of the pseudo propagation path characteristics.

The wireless base station generates a data group including a plurality of parallel and independent data in the same number as the plurality of pseudo propagation path characteristics in the baseband on the transmitting side (step S110). The wireless base station generates the transmission signal by synthesizing a plurality of superimposed data generated by superimposing each of the pseudo propagation path characteristics on the generated data one by one (step S112). The wireless base station generates a plurality of pseudo propagation path characteristic information regarding a plurality of pseudo propagation path characteristics and transmits the plurality of pseudo propagation path characteristic information and the transmission signal (step S114).

At this time, for example, the wireless base station adds the pilot signal of the pseudo propagation path characteristic information to the front portion of the frame of each data for each resource block and transmits a plurality of data (data group). Next, the subscriber terminal receives the communication signal arrived by the propagation of the transmission signal transmitted from the wireless base station through the communication propagation path (step S116).

The subscriber terminal receives the plurality of pseudo propagation path characteristic information transmitted antecedently and the communication signal transmitted subsequently, and obtains a plurality of data by individually extracting the plurality of data in which the plurality of pseudo propagation path characteristics are superimposed, based on the plurality of pseudo propagation path characteristic information (step S118). At this time, the subscriber terminal also extracts, from the received communication signal, the signal in the form of product in which the characteristics of the actual wireless propagation path are added, other than the data in which the pseudo propagation path characteristics are superimposed. The subscriber terminal measures the actual propagation path characteristics in units of resource block based on the extracted signal. As described above, in the OFDMA system, the propagation path characteristics are measured at least in units of resource block and sent to the other party, and thus the steps S100 to S106 described above can be regarded as the steps in which the wireless base station acquires the information of the actual propagation path characteristics transmitted from the subscriber terminal through a series of the data transmission and reception.

The transmission/reception system S described above exemplifies the case of communication by FDD. However, when the wireless base station (transmission device) and the subscriber terminal (reception device) communicate by TDD, the measurement of the state of frequency selective multipath fading may be basically performed only on the side of the wireless base station. Therefore, in the transmission/reception system S that performs the TDD communication, the steps S100 to S106 described above may be replaced with the steps in which the wireless base station measures the actual propagation path characteristics.

As described above, in the fourth-generation mobile communication system, it is possible to provide a method and means for improving the spectral efficiency in the resource block of the OFDMA (Orthogonal Frequency Division Multiple Access) which is the core technology thereof, and it is apparent that the transmission rate used by the subscriber can be at least doubled as compared with the conventional one. In the above-mentioned configuration, the case of the downlink from the wireless base station to the subscriber terminal has been shown, but it is apparent that the transmission rate can be doubled even in the case where the modulation is performed in parallel using the pseudo propagation path characteristic information S1 and the pseudo propagation path characteristic information S2 and wireless transmission is performed from one subscriber terminal antenna to one wireless base station antenna.

Furthermore, it is apparent that the transmission rate can be increased almost n times by preparing three or more pieces of pseudo propagation path characteristic information $S_n$ (n>2) having no correlation. The MIMO scheme that utilizes the difference in the actual propagation path characteristics cannot always secure a propagation path with a low degree of correlation. On the other hand, according to this application, since it is possible to provide propagation path characteristics whose degree of correlation can be theoretically determined and the pseudo propagation path characteristics can be shared in advance by the transmission and reception ends, stable multiplexed communication can be realized.

At the same time, the multiple antennas required by the MIMO scheme can be reduced, so that there are great advantages in product design such as size reduction and weight reduction. Note that, although the SRS is transmitted from the subscriber terminal in the above-described embodiments, this is the case of frequency division duplex (FDD) communication in which the frequencies of the downlink and the uplink are different. In the case of time division duplex (TDD) communication, the frequencies of the downlink and the uplink are common and the subscriber terminal does not have to transmit the SRS. Therefore, when generating or verifying the pseudo propagation path characteristics, the wireless base station or the subscriber terminal can use the propagation path characteristics acquired by each reception unit, and though the system configuration has a difference in this part, it is apparent that the transmission multiplexing using the pseudo propagation path characteristics aimed in this application can be applied.

Namely, the applicable range of this application is not limited to wireless communication and wired communication. Furthermore, although this application has described the OFDM mainly used in the fourth-generation mobile communication and the wireless LAN (Local Area Network) system, it is sufficiently applicable also to the single carrier system as in the case of using the SC-FDMA of single carrier instead of multicarrier in the uplink of the fourth-generation mobile communication. Therefore, it is apparent that this application can be used also in the spread spectrum communication of the third-generation mobile communication. Further, it can also be used in various wireless systems using the OFDM. In addition, this application may be applied not only to bidirectional wireless communication but also to broadcasting of television and radio.

Also, in the above embodiments, the case of the wireless communication using radio waves has been described, but it is apparent that this application has a beneficial effect to the optical fiber communication path and the metal communication line in which frequency resources and usable frequency domain have less degree of freedom and improvement in spectral efficiency is required.

In the foregoing, the mode for implementing the present invention has been described with reference to the embodiments, but the present invention is not limited to these embodiments. Although the present invention is not limited by the above-described exemplary embodiments, it is obvious that various modifications can be made without departing from the scope of the present invention that has been already described. For example, although the exemplary embodiments have described the present invention as a hardware configuration, the present invention is not limited to this. The present invention may be realized by causing a CPU (Central Processing Unit) to execute an arbitrary process on a computer program. In this case, the program can be stored using various types of non-transitory computer readable media and supplied to the computer.

Examples of the non-transitory computer readable media include magnetic recording media (for example, flexible disk, magnetic tape, hard disk drive), magneto-optical recording media (for example, magneto-optical disk), CD (registered trademark)-ROM (Read Only Memory), CD-R (compact disc recordable (registered trademark)), CD-R/W (compact disc rewritable (registered trademark)), DVD (Digital Versatile Disc), BD (Blu-ray (registered trademark) Disc), and semiconductor memory (for example, mask ROM, PROM (Programmable ROM), EPROM (Erasable PROM), flash ROM, and RAM (Random Access Memory)). Further, the program may be supplied to the computer by various types of transitory computer readable media. Examples of the transitory computer readable media include electrical signals, optical signals, and electromagnetic waves. The transitory computer readable media can be used to supply the programs to the computer via a wired communication path (such as electric wires and optical fibers) or a wireless communication path.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A transmission/reception method in a transmission/reception system comprising: a transmission device and a reception device communicating with each other,
    wherein the reception device measures propagation path characteristics of a communication propagation path,
    wherein the transmission device generates, based on a measurement result of the propagation path characteristics, a plurality of pseudo propagation path characteristics having propagation path characteristics similar to the propagation path characteristics to an extent that frequency characteristics can be approximated,
    wherein, for pseudo propagation path characteristics determined to have high mutual correlation among the plurality of pseudo propagation path characteristics, the transmission device generates the pseudo propagation path characteristics again so as to have low mutual correlation, thereby generating the plurality of pseudo propagation path characteristics having low mutual correlation,
    wherein the transmission device generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal, and
    wherein the reception device receives the plurality of pseudo propagation path characteristic information transmitted antecedently from the transmission device and a communication signal transmitted subsequently, and individually extracts the plurality of data from the communication signal based on the plurality of pseudo propagation path characteristic information.

2. The transmission/reception method according to claim 1,
    wherein the transmission device generates the plurality of pseudo propagation path characteristic information by inverting all of phase polarities on positive and negative frequency axes of the pseudo propagation path characteristics.

3. The transmission/reception method according to claim 1,
    wherein the transmission device generates the plurality of pseudo propagation path characteristics by inverting all of orders of delay profiles on positive and negative time axes of the pseudo propagation path characteristics.

4. The transmission/reception method according to claim 1,
    wherein the transmission device generates the plurality of pseudo propagation path characteristics by delaying delay profiles on positive and negative time axes of the pseudo propagation path characteristics.

5. The transmission/reception method according to claim 1,
    wherein the transmission device generates the plurality of pseudo propagation path characteristics by changing time position, intensity, and phase of delay waves forming delay profiles on positive and negative time axes of the pseudo propagation path characteristics.

6. The transmission/reception method according to claim 2,
    wherein the transmission device generates the plurality of pseudo propagation path characteristics by inverting all of orders of delay profiles on positive and negative time axes of the pseudo propagation path characteristics.

7. The transmission/reception method according to claim 2,
wherein the transmission device generates the plurality of pseudo propagation path characteristics by delaying delay profiles on positive and negative time axes of the pseudo propagation path characteristics.

8. The transmission/reception method according to claim 3,
wherein the transmission device generates the plurality of pseudo propagation path characteristics by delaying delay profiles on positive and negative time axes of the pseudo propagation path characteristics.

9. The transmission/reception method according to claim 2,
wherein the transmission device generates the plurality of pseudo propagation path characteristics by changing time position, intensity, and phase of delay waves forming delay profiles on positive and negative time axes of the pseudo propagation path characteristics.

10. The transmission/reception method according to claim 3,
wherein the transmission device generates the plurality of pseudo propagation path characteristics by changing time position, intensity, and phase of delay waves forming delay profiles on positive and negative time axes of the pseudo propagation path characteristics.

11. The transmission/reception method according to claim 4,
wherein the transmission device generates the plurality of pseudo propagation path characteristics by changing time position, intensity, and phase of delay waves forming delay profiles on positive and negative time axes of the pseudo propagation path characteristics.

12. A transmission/reception system comprising: a transmission device and a reception device which communicate with each other,
the transmission device including:
a generation unit which generates, based on a measurement result of propagation path characteristics of a communication propagation path measured by the reception device, a plurality of pseudo propagation path characteristics having propagation path characteristics similar to the propagation path characteristics to an extent that frequency characteristics can be approximated, and for pseudo propagation path characteristics determined to have high mutual correlation among the plurality of pseudo propagation path characteristics, generates the pseudo propagation path characteristics again so as to have low mutual correlation, thereby generating the plurality of pseudo propagation path characteristics having low mutual correlation; and
a transmission unit which generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal, and
the reception device including:
a measurement unit which measures the propagation path characteristics of the communication propagation path;
a reception unit which receives the plurality of pseudo propagation path characteristic information transmitted antecedently from the transmission device and a communication signal transmitted subsequently; and
a data decoding unit which individually extracts the plurality of data from the communication signal based on the plurality of pseudo propagation path characteristic information.

13. A transmission/reception method in a transmission/reception system comprising: a transmission device and a reception device communicating with each other,
wherein the transmission device measures propagation path characteristics of a communication propagation path and generates, based on a measurement result of the propagation path characteristics, a plurality of pseudo propagation path characteristics having propagation path characteristics similar to the propagation path characteristics to an extent that frequency characteristics can be approximated,
wherein, for pseudo propagation path characteristics determined to have high mutual correlation among the plurality of pseudo propagation path characteristics, the transmission device generates the pseudo propagation path characteristics again so as to have low mutual correlation, thereby generating the plurality of pseudo propagation path characteristics having low mutual correlation,
wherein the transmission device generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal, and
wherein the reception device receives the plurality of pseudo propagation path characteristic information transmitted antecedently from the transmission device and a communication signal transmitted subsequently, and individually extracts the plurality of data from the communication signal based on the plurality of pseudo propagation path characteristic information.

14. A transmission/reception system comprising: a transmission device and a reception device which communicate with each other,
wherein the transmission device measures propagation path characteristics of a communication propagation path and generates, based on a measurement result of the propagation path characteristics, a plurality of pseudo propagation path characteristics having propagation path characteristics similar to the propagation path characteristics to an extent that frequency characteristics can be approximated,
wherein, for pseudo propagation path characteristics determined to have high mutual correlation among the plurality of pseudo propagation path characteristics, the transmission device generates the pseudo propagation path characteristics again so as to have low mutual correlation, thereby generating the plurality of pseudo propagation path characteristics having low mutual correlation,
wherein the transmission device generates a data group including a plurality of parallel and independent data in the same number as the plurality of pseudo propagation path characteristics in a baseband on a transmitting side, obtains a transmission signal by synthesizing a plurality of superimposed data generated by superimposing the pseudo propagation path characteristics on the data one by one, and transmits a plurality of pseudo propagation path characteristic information relating to the plurality of pseudo propagation path characteristics and the transmission signal, and wherein the reception device receives the plurality of pseudo propagation path characteristic information transmitted antecedently from the transmission device and a communication signal transmitted subsequently, and individually extracts the plurality of data from the communication signal based on the plurality of pseudo propagation path characteristic information.

* * * * *